United States Patent
Lert, Jr. et al.

(10) Patent No.: US 12,006,149 B2
(45) Date of Patent: Jun. 11, 2024

(54) STORAGE AND RETRIEVAL SYSTEM

(71) Applicant: Walmart Apollo, LLC, Bentonville, AR (US)

(72) Inventors: John G. Lert, Jr., Wakefield, MA (US); William J. Fosnight, Windham, NH (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/843,124

(22) Filed: Jun. 17, 2022

(65) Prior Publication Data

US 2022/0315333 A1 Oct. 6, 2022

Related U.S. Application Data

(60) Continuation of application No. 16/594,647, filed on Oct. 7, 2019, now Pat. No. 11,365,049, which is a division of application No. 15/171,802, filed on Jun. 2, 2016, now Pat. No. 10,435,241.

(60) Provisional application No. 62/169,615, filed on Jun. 2, 2015.

(51) Int. Cl.
*B65G 1/04* (2006.01)
*B65G 1/137* (2006.01)

(52) U.S. Cl.
CPC ......... *B65G 1/0492* (2013.01); *B65G 1/0478* (2013.01); *B65G 1/1378* (2013.01)

(58) Field of Classification Search
CPC .. B65G 1/0478; B65G 1/0492; B65G 1/1375; B65G 1/1378
See application file for complete search history.

(56) References Cited

U.S. PATENT DOCUMENTS

| | | |
|---|---|---|
| 3,927,773 A | 12/1975 | Bright |
| 4,007,843 A | 2/1977 | Lubbers et al. |
| 4,221,076 A | 9/1980 | Ozawa |
| 4,415,975 A | 11/1983 | Burt |
| 4,428,708 A | 1/1984 | Burt |

(Continued)

FOREIGN PATENT DOCUMENTS

| | | |
|---|---|---|
| DE | 3624033 | 8/1987 |
| DE | 102012100354 | 7/2013 |

(Continued)

OTHER PUBLICATIONS

Office Action dated Jun. 18, 2021 in U.S. Appl. No. 15/903,993.

(Continued)

*Primary Examiner* — James Keenan
(74) *Attorney, Agent, or Firm* — Fitch, Even, Tabin & Flannery LLP

(57) ABSTRACT

A system and method for storage and retrieval are provided. The system includes a multi-level storage structure, and mobile robots configured to pick, transport and place one or more tote, container, or object. This system and method can be used in order-fulfillment applications in which one or more workstations accommodate a picker that transports one or more eaches from a tote on one of the autonomous mobile robots to a put location, and an input/output interface induct material into the system and discharge fulfilled orders from the system. The mobile robots are further configured to move from level to level in the multi-level storage structure via inclined or vertical tracks without requiring a vertical lift or vertical conveyor.

18 Claims, 66 Drawing Sheets

(56) References Cited

U.S. PATENT DOCUMENTS

| | | |
|---|---|---|
| 5,143,246 A | 9/1992 | Johnson et al. |
| 5,179,329 A | 1/1993 | Nishikawa et al. |
| 5,433,293 A | 7/1995 | Sager |
| 5,472,309 A | 12/1995 | Bernard et al. |
| 5,501,295 A | 3/1996 | Muller et al. |
| 5,526,940 A | 6/1996 | Shea et al. |
| 5,551,823 A | 9/1996 | Maruyama |
| 5,595,264 A | 1/1997 | Trotta, Jr. |
| 5,636,966 A | 6/1997 | Yon et al. |
| 5,642,976 A | 7/1997 | Konstant |
| 5,890,136 A | 3/1999 | Kipp |
| 5,953,234 A | 9/1999 | Singer et al. |
| 5,996,316 A | 12/1999 | Kirschner |
| 6,289,260 B1 | 9/2001 | Bradley et al. |
| 6,325,586 B1 | 12/2001 | Loy |
| 6,494,313 B1 | 12/2002 | Trescott |
| 6,539,876 B1 | 4/2003 | Campbell et al. |
| 6,671,580 B2 | 12/2003 | Campbell et al. |
| 6,729,836 B2 | 5/2004 | Stingel, III et al. |
| 6,744,436 B1 | 6/2004 | Chirieleison, Jr. et al. |
| 6,805,526 B2 | 10/2004 | Stefani |
| 6,895,301 B2 | 5/2005 | Mountz |
| 7,054,832 B1 | 5/2006 | Vallabh |
| 7,101,139 B1 | 9/2006 | Benedict |
| 7,110,855 B2 | 9/2006 | Leishman |
| 7,139,637 B1 | 11/2006 | Waddington et al. |
| 7,246,706 B1 | 7/2007 | Shakes et al. |
| 7,255,525 B2 | 8/2007 | Smith et al. |
| 7,381,022 B1 | 6/2008 | King |
| 7,532,947 B2 | 5/2009 | Waddington et al. |
| 7,591,630 B2 | 9/2009 | Lert |
| 7,603,299 B1 | 10/2009 | Dewey, Jr. et al. |
| 7,640,863 B2 | 1/2010 | Minges |
| 7,751,928 B1 | 7/2010 | Antony et al. |
| 7,861,844 B2 | 1/2011 | Hayduchok et al. |
| 7,894,932 B2 | 2/2011 | Mountz et al. |
| 7,894,933 B2 | 2/2011 | Mountz et al. |
| 7,896,243 B2 | 3/2011 | Herskovitz |
| 7,931,431 B2 | 4/2011 | Benedict et al. |
| 7,938,324 B2 | 5/2011 | Tamarkin et al. |
| 7,991,505 B2 | 8/2011 | Ert et al. |
| 8,104,601 B2 | 1/2012 | Hayduchok et al. |
| 8,201,737 B1 | 6/2012 | Palacios Durazo et al. |
| 8,276,740 B2 | 10/2012 | Hayduchok et al. |
| 8,311,902 B2 | 11/2012 | Mountz et al. |
| 8,327,609 B2 | 12/2012 | Krizmanic et al. |
| 8,425,173 B2 | 4/2013 | Lert et al. |
| 8,447,665 B1 | 5/2013 | Schoenharl et al. |
| 8,483,869 B2 | 7/2013 | Wurman et al. |
| 8,527,325 B1 | 9/2013 | Atreya et al. |
| 8,579,574 B2 | 11/2013 | Hanel |
| 8,594,835 B2 | 11/2013 | Lert et al. |
| 8,622,194 B2 | 1/2014 | DeWitt et al. |
| 8,626,335 B2 | 1/2014 | Wurman et al. |
| 8,628,289 B1 | 1/2014 | Benedict |
| 8,639,531 B2 | 1/2014 | Hasan et al. |
| 8,690,510 B1 | 4/2014 | Razumov |
| 8,694,152 B2 | 4/2014 | Cyrulik et al. |
| 8,718,814 B1 | 5/2014 | Clark et al. |
| 8,721,250 B2 | 5/2014 | Razumov |
| 8,721,251 B1 | 5/2014 | Razumov |
| 8,734,079 B1 | 5/2014 | Razumov |
| 8,738,177 B2 | 5/2014 | Van Ooyen et al. |
| 8,740,538 B2 | 6/2014 | Lert et al. |
| 8,831,984 B2 | 9/2014 | Hoffman et al. |
| 8,892,240 B1 | 11/2014 | Vliet et al. |
| 8,965,562 B1 | 2/2015 | Wurman et al. |
| 8,972,045 B1 | 3/2015 | Mountz et al. |
| 8,983,647 B1 | 3/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,010,517 B2 | 4/2015 | Hayduchok et al. |
| 9,020,632 B2 | 4/2015 | Naylor |
| 9,037,286 B2 | 5/2015 | Lert |
| 9,051,120 B2 | 6/2015 | Lert et al. |
| 9,096,375 B2 | 8/2015 | Lert et al. |
| 9,111,251 B1 | 8/2015 | Brazeau |
| 9,120,622 B1 | 9/2015 | Elazary et al. |
| 9,129,250 B1 | 9/2015 | Sestini et al. |
| 9,139,363 B2 | 9/2015 | Lert |
| 9,147,208 B1 | 9/2015 | Argue et al. |
| 9,181,030 B2 | 11/2015 | Zombori |
| 9,216,857 B1 | 12/2015 | Kalyan et al. |
| 9,242,798 B2 | 1/2016 | Guan |
| 9,242,799 B1 | 1/2016 | O'Brien et al. |
| 9,260,245 B2 | 2/2016 | Este et al. |
| 9,321,591 B2 | 4/2016 | Lert et al. |
| 9,330,373 B2 | 5/2016 | Mountz et al. |
| 9,334,113 B2 | 5/2016 | Naylor |
| 9,334,116 B2 | 5/2016 | DeWitt et al. |
| 9,378,482 B1 | 6/2016 | Pikler et al. |
| 9,409,664 B1 | 8/2016 | Vliet et al. |
| 9,409,728 B2 | 8/2016 | Bastian, II |
| 9,423,796 B2 | 8/2016 | Sullivan et al. |
| 9,428,295 B2 | 8/2016 | Vliet et al. |
| 9,466,045 B1 | 10/2016 | Kumar |
| 9,487,356 B1 | 11/2016 | Aggarwal |
| 9,522,781 B2 | 12/2016 | Hortig |
| 9,550,624 B2 | 1/2017 | Khodl et al. |
| 9,558,472 B1 | 1/2017 | Tubilla Kuri |
| 9,626,709 B2 | 4/2017 | Koch et al. |
| 9,630,777 B2 | 4/2017 | Yamashita |
| 9,733,646 B1 | 8/2017 | Nusser et al. |
| 9,751,693 B1 | 9/2017 | Battles et al. |
| 9,796,527 B1 | 10/2017 | Kaukl |
| 9,815,625 B2 | 11/2017 | DeWitt et al. |
| 9,821,959 B2 | 11/2017 | Hognaland |
| 9,827,683 B1 | 11/2017 | Hance et al. |
| 9,852,396 B2 | 12/2017 | Jones et al. |
| 9,978,036 B1 | 5/2018 | Eller |
| 10,127,514 B2 | 11/2018 | Napoli |
| 10,189,641 B2 | 1/2019 | Hognaland |
| 10,192,195 B1 | 1/2019 | Brazeau |
| 10,229,385 B2 | 3/2019 | Evers et al. |
| 10,336,543 B1 | 7/2019 | Sills et al. |
| 10,360,531 B1 | 7/2019 | Stallman et al. |
| 10,482,421 B1 | 11/2019 | Ducrou et al. |
| 10,579,965 B2 | 3/2020 | Meurer |
| 2002/0059121 A1 | 5/2002 | Schneider et al. |
| 2002/0143669 A1 | 10/2002 | Scheer |
| 2003/0110104 A1 | 6/2003 | King et al. |
| 2003/0197061 A1 | 10/2003 | Din |
| 2004/0010337 A1 | 1/2004 | Mountz |
| 2004/0010339 A1 | 1/2004 | Mountz |
| 2004/0024730 A1 | 2/2004 | Brown et al. |
| 2004/0111337 A1 | 6/2004 | Feeney et al. |
| 2004/0249497 A1 | 12/2004 | Saigh et al. |
| 2004/0254825 A1 | 12/2004 | Hsu et al. |
| 2005/0035694 A1 | 2/2005 | Stevens |
| 2005/0043850 A1 | 2/2005 | Stevens et al. |
| 2005/0047895 A1 | 3/2005 | Lert, Jr. |
| 2005/0060246 A1 | 3/2005 | Lastinger et al. |
| 2005/0096936 A1 | 5/2005 | Lambers |
| 2005/0108114 A1 | 5/2005 | Kaled |
| 2005/0149226 A1 | 7/2005 | Stevens et al. |
| 2005/0182695 A1 | 8/2005 | Lubow et al. |
| 2005/0256787 A1 | 11/2005 | Wadawadigi et al. |
| 2005/0267791 A1 | 12/2005 | LaVoie et al. |
| 2005/0278062 A1 | 12/2005 | Janert et al. |
| 2006/0020366 A1 | 1/2006 | Bloom |
| 2006/0108419 A1 | 5/2006 | Som |
| 2006/0182548 A1 | 8/2006 | Gretsch et al. |
| 2006/0257236 A1 | 11/2006 | Stingel, III et al. |
| 2007/0011053 A1 | 1/2007 | Yap |
| 2007/0016496 A1 | 1/2007 | Bar et al. |
| 2007/0127691 A1 | 6/2007 | Lert, Jr. |
| 2007/0162353 A1 | 7/2007 | Borders et al. |
| 2007/0210164 A1 | 9/2007 | Conlon et al. |
| 2007/0244758 A1 | 10/2007 | Xie |
| 2007/0276535 A1 | 11/2007 | Haag |
| 2007/0293978 A1 | 12/2007 | Wurman et al. |
| 2007/0294029 A1 | 12/2007 | D'Andrea et al. |
| 2008/0040244 A1 | 2/2008 | Ricciuti et al. |

(56) References Cited

U.S. PATENT DOCUMENTS

| | | |
|---|---|---|
| 2008/0041947 A1 | 2/2008 | Hollister et al. |
| 2008/0131241 A1 | 6/2008 | King |
| 2008/0131255 A1 | 6/2008 | Hessler et al. |
| 2008/0181753 A1 | 7/2008 | Bastian et al. |
| 2008/0215180 A1 | 9/2008 | Kota |
| 2009/0074545 A1 | 3/2009 | Lert |
| 2009/0149985 A1 | 6/2009 | Chirnomas |
| 2009/0157472 A1 | 6/2009 | Burazin et al. |
| 2009/0249749 A1 | 10/2009 | Schill et al. |
| 2009/0276264 A1 | 11/2009 | Pandit et al. |
| 2010/0010902 A1 | 1/2010 | Casey |
| 2010/0060455 A1 | 3/2010 | Frabasile |
| 2010/0076591 A1 | 3/2010 | Lert |
| 2010/0114790 A1 | 5/2010 | Strimling et al. |
| 2010/0234980 A1 | 9/2010 | Apre |
| 2010/0262278 A1 | 10/2010 | Winkler |
| 2010/0310344 A1 | 12/2010 | Hinnen et al. |
| 2010/0316468 A1 | 12/2010 | Lert et al. |
| 2010/0316469 A1 | 12/2010 | Lert et al. |
| 2010/0316470 A1 | 12/2010 | Lert et al. |
| 2010/0322746 A1 | 12/2010 | Lert et al. |
| 2010/0322747 A1 | 12/2010 | Lert et al. |
| 2011/0008138 A1 | 1/2011 | Yamashita |
| 2011/0238207 A1 | 9/2011 | Bastian, II et al. |
| 2011/0243707 A1 | 10/2011 | Dumas et al. |
| 2011/0320034 A1 | 12/2011 | Dearlove et al. |
| 2012/0029683 A1 | 2/2012 | Keller et al. |
| 2012/0029685 A1 | 2/2012 | Keller et al. |
| 2012/0101627 A1 | 4/2012 | Lert |
| 2012/0143427 A1 | 6/2012 | Hoffman et al. |
| 2012/0150340 A1 | 6/2012 | Suess et al. |
| 2012/0173351 A1 | 7/2012 | Hanson et al. |
| 2012/0186942 A1 | 7/2012 | Toebes et al. |
| 2012/0195720 A1 | 8/2012 | Sullivan et al. |
| 2012/0219397 A1 | 8/2012 | Baker |
| 2012/0298688 A1 | 11/2012 | Stiernagle |
| 2012/0330458 A1 | 12/2012 | Weiss |
| 2013/0087610 A1 | 4/2013 | Shin et al. |
| 2013/0181586 A1 | 7/2013 | Hognaland |
| 2013/0226718 A1 | 8/2013 | Ascarrunz et al. |
| 2013/0235206 A1 | 9/2013 | Smith et al. |
| 2013/0246229 A1 | 9/2013 | Mountz et al. |
| 2013/0310967 A1 | 11/2013 | Olson et al. |
| 2013/0317642 A1 | 11/2013 | Asaria et al. |
| 2013/0346204 A1 | 12/2013 | Wissner-Gross et al. |
| 2014/0003727 A1 | 1/2014 | Lortz et al. |
| 2014/0040075 A1 | 2/2014 | Perry et al. |
| 2014/0052498 A1 | 2/2014 | Marshall et al. |
| 2014/0062699 A1 | 3/2014 | Heine et al. |
| 2014/0088758 A1 | 3/2014 | Lert et al. |
| 2014/0100769 A1 | 4/2014 | Wurman et al. |
| 2014/0100999 A1 | 4/2014 | Mountz et al. |
| 2014/0136218 A1 | 5/2014 | Bolene et al. |
| 2014/0143099 A1 | 5/2014 | Wilkins |
| 2014/0156553 A1 | 6/2014 | Leach et al. |
| 2014/0212249 A1 | 7/2014 | Kawano |
| 2014/0244026 A1 | 8/2014 | Neiser |
| 2014/0257555 A1 | 9/2014 | Bastian et al. |
| 2014/0271063 A1 | 9/2014 | Lert et al. |
| 2014/0279294 A1 | 9/2014 | Field-Darragh et al. |
| 2014/0288696 A1 | 9/2014 | Lert |
| 2014/0308098 A1 | 10/2014 | Lert et al. |
| 2014/0324491 A1 | 10/2014 | Banks et al. |
| 2014/0330603 A1 | 11/2014 | Corder et al. |
| 2014/0336814 A1 | 11/2014 | Moore et al. |
| 2014/0343717 A1 | 11/2014 | Dorval et al. |
| 2014/0350715 A1 | 11/2014 | Gopalakrishnan et al. |
| 2014/0351101 A1 | 11/2014 | Danelski |
| 2014/0365341 A1 | 12/2014 | MacLaurin et al. |
| 2015/0032252 A1 | 1/2015 | Galluzzo et al. |
| 2015/0051994 A1 | 2/2015 | Ward et al. |
| 2015/0071743 A1 | 3/2015 | Lert |
| 2015/0134490 A1 | 5/2015 | Collin |
| 2015/0154535 A1 | 6/2015 | Wappler et al. |
| 2015/0170256 A1 | 6/2015 | Pettyjohn et al. |
| 2015/0178671 A1 | 6/2015 | Jones et al. |
| 2015/0178673 A1 | 6/2015 | Penneman |
| 2015/0220896 A1 | 8/2015 | Carr et al. |
| 2015/0266672 A1 | 9/2015 | Lert et al. |
| 2015/0286967 A1 | 10/2015 | Lert et al. |
| 2015/0291357 A1 | 10/2015 | Razumov |
| 2015/0294333 A1 | 10/2015 | Avegliano et al. |
| 2015/0307279 A1 | 10/2015 | Almada et al. |
| 2015/0310447 A1 | 10/2015 | Shaw |
| 2015/0375938 A9 | 12/2015 | Lert et al. |
| 2016/0016733 A1 | 1/2016 | Lert |
| 2016/0031644 A1 | 2/2016 | Schubilske |
| 2016/0055452 A1 | 2/2016 | Qin |
| 2016/0063604 A1 | 3/2016 | Shaffer et al. |
| 2016/0075512 A1 | 3/2016 | Lert |
| 2016/0101940 A1 | 4/2016 | Grinnell et al. |
| 2016/0107838 A1 | 4/2016 | Swinkels et al. |
| 2016/0110702 A1 | 4/2016 | Anders, Jr. et al. |
| 2016/0129592 A1 | 5/2016 | Saboo et al. |
| 2016/0140488 A1 | 5/2016 | Lindbo |
| 2016/0145045 A1 | 5/2016 | Mountz et al. |
| 2016/0167227 A1 | 6/2016 | Wellman et al. |
| 2016/0171592 A1 | 6/2016 | Pugh et al. |
| 2016/0194151 A1 | 7/2016 | Lindbo et al. |
| 2016/0223339 A1 | 8/2016 | Pellow et al. |
| 2016/0236867 A1 | 8/2016 | Brazeau et al. |
| 2016/0244262 A1 | 8/2016 | O'Brien et al. |
| 2016/0253740 A1 | 9/2016 | Goulart |
| 2016/0260158 A1 | 9/2016 | High et al. |
| 2016/0299782 A1 | 10/2016 | Jones et al. |
| 2016/0304281 A1 | 10/2016 | Elazary et al. |
| 2016/0311617 A1 | 10/2016 | Van Den Berk |
| 2016/0314431 A1 | 10/2016 | Quezada |
| 2016/0325933 A1 | 11/2016 | Stiernagle et al. |
| 2016/0327941 A1 | 11/2016 | Stiernagle et al. |
| 2016/0347545 A1 | 12/2016 | Lindbo et al. |
| 2016/0355337 A1 | 12/2016 | Lert et al. |
| 2016/0364786 A1 | 12/2016 | Wankhede |
| 2016/0371650 A1 | 12/2016 | Schmidt et al. |
| 2017/0036798 A1 | 2/2017 | Prahlad et al. |
| 2017/0043953 A1 | 2/2017 | Battles et al. |
| 2017/0066592 A1 | 3/2017 | Bastian, II et al. |
| 2017/0068973 A1 | 3/2017 | Sinkel |
| 2017/0088360 A1 | 3/2017 | Brazeau et al. |
| 2017/0113910 A1 | 4/2017 | Becchi et al. |
| 2017/0132559 A1 | 5/2017 | Jones et al. |
| 2017/0137222 A1 | 5/2017 | Ert, Jr. |
| 2017/0137223 A1 | 5/2017 | Lert, Jr. |
| 2017/0158430 A1 | 6/2017 | Raizer |
| 2017/0166356 A1 | 6/2017 | Tubilla Kuri |
| 2017/0166399 A1 | 6/2017 | Stubbs et al. |
| 2017/0185933 A1 | 6/2017 | Adulyasak et al. |
| 2017/0185955 A1 | 6/2017 | Hufschmid et al. |
| 2017/0200108 A1 | 7/2017 | Au et al. |
| 2017/0206480 A1 | 7/2017 | Naumann et al. |
| 2017/0213186 A1 | 7/2017 | Grifoni |
| 2017/0220995 A1 | 8/2017 | Paulweber et al. |
| 2017/0228701 A1 | 8/2017 | Wosk et al. |
| 2017/0260008 A1 | 9/2017 | DeWitt et al. |
| 2017/0267452 A1 | 9/2017 | Goren et al. |
| 2017/0269607 A1 | 9/2017 | Fulop |
| 2017/0278047 A1 | 9/2017 | Welty et al. |
| 2017/0285648 A1 | 10/2017 | Welty et al. |
| 2017/0297820 A1 | 10/2017 | Grinnell et al. |
| 2017/0301004 A1 | 10/2017 | Chirnomas |
| 2017/0313514 A1 | 11/2017 | Lert, Jr. et al. |
| 2017/0316233 A1 | 11/2017 | Kherani et al. |
| 2017/0320102 A1 | 11/2017 | McVaugh et al. |
| 2017/0322561 A1 | 11/2017 | Stiernagle |
| 2017/0323250 A1 | 11/2017 | Lindbo et al. |
| 2017/0330142 A1 | 11/2017 | Kanellos et al. |
| 2017/0330270 A1 | 11/2017 | Kanellos et al. |
| 2017/0334646 A1 | 11/2017 | High et al. |
| 2017/0369244 A1 | 12/2017 | Battles et al. |
| 2018/0005173 A1 | 1/2018 | Elazary et al. |
| 2018/0005174 A1 | 1/2018 | Dixon et al. |
| 2018/0029797 A1 | 2/2018 | Hance et al. |
| 2018/0032949 A1 | 2/2018 | Galluzzo et al. |
| 2018/0130015 A1 | 5/2018 | Jones et al. |

(56) References Cited

U.S. PATENT DOCUMENTS

| | | | |
|---|---|---|---|
| 2018/0137452 A1 | 5/2018 | Khatravath et al. |
| 2018/0182054 A1 | 6/2018 | Yao et al. |
| 2018/0211203 A1 | 6/2018 | Greenberg |
| 2018/0237221 A1 | 8/2018 | Lindbo et al. |
| 2018/0237222 A1 | 8/2018 | Issing et al. |
| 2018/0300680 A1 | 10/2018 | Undernehr et al. |
| 2018/0314991 A1 | 11/2018 | Grundberg |
| 2018/0319590 A1 | 11/2018 | Lindbo et al. |
| 2018/0342031 A1 | 11/2018 | Tada et al. |
| 2019/0139637 A1 | 5/2019 | Ceh |
| 2019/0197451 A1 | 6/2019 | Balasingham |
| 2019/0389659 A1 | 12/2019 | Grinnell et al. |
| 2021/0032034 A1 | 2/2021 | Kalouche |
| 2022/0274776 A1 | 9/2022 | Lert, Jr. |

FOREIGN PATENT DOCUMENTS

| | | | |
|---|---|---|---|
| EP | 0302205 A2 | 2/1989 |
| EP | 1348646 A2 | 10/2003 |
| EP | 2650237 B1 | 11/2014 |
| EP | 2995579 | 3/2016 |
| EP | 2651786 B1 | 5/2016 |
| EP | 2651787 B1 | 5/2016 |
| EP | 3056454 | 8/2016 |
| JP | H0642810 U | 6/1994 |
| JP | H1135107 | 2/1999 |
| JP | 2002160813 | 6/2002 |
| JP | 2007246226 | 9/2007 |
| WO | 0068856 | 11/2000 |
| WO | 2005097550 A2 | 10/2005 |
| WO | WO 2007043129 | 4/2007 |
| WO | 2007067868 | 6/2007 |
| WO | 2010100513 A2 | 9/2010 |
| WO | 20100118412 A1 | 10/2010 |
| WO | 20141666640 A2 | 10/2014 |
| WO | 2015005873 A1 | 1/2015 |
| WO | 2016172793 A1 | 11/2016 |
| WO | 2016199033 A1 | 12/2016 |
| WO | 2017064401 A1 | 4/2017 |

OTHER PUBLICATIONS

Notice of Allowance and Fee(s) Due dated May 26, 2021 in U.S. Appl. No. 15/591,956.
Notice of Allowance and Fee(s) Due dated Jun. 4, 2021 in U.S. Appl. No. 15/591,956.
Notice of Allowance and Fee(s) Due dated Jun. 9, 2021 in U.S. Appl. No. 15/816,832.
Decision for Final Rejection dated May 27, 2021, and English language translation thereof, in Japanese Patent Application No. 2019-548543.
Response to Office Action filed Jun. 15, 2021, and English language machine translation thereof, in Chinese Patent Application No. 201780042943.2.
Preliminary Amendment dated Dec. 20, 2019 in U.S. Appl. No. 16/594,647.
Restriction Requirement dated Nov. 30, 2020 in U.S. Appl. No. 16/594,647.
Response to Restriction Requirement dated Jan. 26, 2021 in U.S. Appl. No. 16/594,647.
Office Action dated Mar. 23, 2021 in U.S. Appl. No. 16/594,647.
Response to Office Action dated Aug. 23, 2021 in U.S. Appl. No. 16/594,647.
Final Office Action dated Oct. 20, 2021 in U.S. Appl. No. 16/594,647.
Response to Final Office Action dated Apr. 20, 2022 in U.S. Appl. No. 16/594,647.
Notice of Allowance and Fee(s) Due dated May 2, 2022 in U.S. Appl. No. 16/594,647.
Office Action dated Jun. 21, 2019 in U.S. Appl. No. 15/867,373.
Notice of Allowance dated Mar. 20, 2019 in U.S. Appl. No. 15/421,208.
Response to Office Action filed Mar. 22, 2019 in U.S. Appl. No. 15/816,832.
Office Action dated Apr. 15, 2019 in U.S. Appl. No. 15/816,832.
Notice of Allowance and Fee(s) Due dated Jan. 29, 2019 in U.S. Appl. No. 15/171,802.
Notice of Allowance dated Jan. 17, 2019 in U.S. Appl. No. 15/421,208.
Notice of Allowance and Fee(s) Due dated Oct. 9, 2018 in U.S. Appl. No. 15/171,802.
Final Office Action dated Nov. 2, 2018 in U.S. Appl. No. 15/816,832.
Response to Office Action filed Nov. 13, 2018 in U.S. Appl. No. 15/421,208.
Notice of Allowance and Fee(s) Due dated Jan. 16, 2018 in U.S. Appl. No. 15/699,700.
Notice of Allowance and Fee(s) Due dated Jan. 19, 2018 in U.S. Appl. No. 15/421,239.
Notice of Allowance and Fee(s) Due dated Dec. 8, 2017 in U.S. Appl. No. 15/421,209.
International Search Report for International Application No. PCT/US2017/062423 dated Feb. 5, 2018.
International Search Report for International Application No. PCT/US2018/013203 dated Apr. 5, 2018.
International Search Report for International Application No. PCT/US2018/19537 dated Apr. 13, 2018.
Office Action dated May 4, 2018 in U.S. Appl. No. 15/816,832.
U.S. Appl. No. 15/699,700, filed Sep. 8, 2017.
Notice of Allowance and Fee(s) Due dated Oct. 5, 2017 in U.S. Appl. No. 15/421,239.
Response to Office Action filed Sep. 11, 2017 in U.S. Appl. No. 15/421,208.
Supplemental Response to Office Action filed Oct. 12, 2017 in U.S. Appl. No. 15/421,208.
International Search Report and Written Opinion dated Sep. 6, 2017 in International Patent Application No. PCT/US2017/032171.
U.S. Appl. No. 15/816,832, filed Nov. 17, 2017.
English language Abstract for WO2017064401 published Apr. 20, 2017.
Notice of Allowance and Fee(s) Due dated May 20, 2015 in U.S. Patent Application No. 14/213,187.
Non-final Rejection dated Sep. 3, 2014 in U.S. Appl. No. 14/213,187.
Amendment dated Feb. 27, 2015 in U.S. Patent Application No. 14/213,187.
Office Action dated Apr. 10, 2017 in U.S. Appl. No. 15/421,208.
Non-Final Rejection dated Jul. 20, 2016 in U.S. Appl. No. 14/860,410.
Non-Final Rejection dated Jan. 12, 2016 in U.S. Appl. No. 14/860,410.
Amendment dated Sep. 27, 2016 in U.S. Appl. No. 14/860,410.
Amendment dated Apr. 8, 2016 in U.S. Appl. No. 14/860,410.
International Search Report for International Application No. PCT/US2016/035547, dated Oct. 7, 2016.
Notice of Allowance in U.S. Appl. No. 14/860,410 dated Nov. 10, 2016.
U.S. Appl. No. 15/826,045, filed Nov. 29, 2017.
Requirement for Restriction/Election dated Nov. 3, 2017 in U.S. Appl. No. 15/171,802.
Response to Restriction Requirement filed Nov. 20, 2017 in U.S. Appl. No. 15/171,802.
Office Action dated Feb. 12, 2018 in U.S. Appl. No. 15/171,802.
Response to Office Action filed May 9, 2018 in U.S. Appl. No. 15/171,802.
Final Office Action dated Aug. 7, 2018 in U.S. Appl. No. 15/171,802.
Response to Office Action filed Sep. 12, 2018 in U.S. Appl. No. 15/171,802.
Response to Office Action filed Aug. 2, 2018 in U.S. Appl. No. 15/816,832.
Notice of Allowance and Fee(s) Due dated Aug. 31, 2018 in U.S. Appl. No. 15/978,423.
Response to Office Action filed Sep. 23, 2019 in European Patent Application No. 16804451.9.
Response to Office Action filed Oct. 21, 2019 in U.S. Appl. No. 15/867,373.
Response to Office Action filed Oct. 29, 2019 in U.S. Appl. No. 15/826,045.
Final Office Action dated Nov. 1, 2019 in U.S. Appl. No. 15/816,832.
Office Action dated Nov. 20, 2019 in U.S. Appl. No. 15/826,045.

(56) References Cited

OTHER PUBLICATIONS

Office Action dated Dec. 5, 2019 in U.S. Appl. No. 15/867,373.
Response to Office Action filed Mar. 5, 2020 in U.S. Appl. No. 15/867,373.
Office Action dated Dec. 5, 2022 in Japanese Patent Application No. 2021-156451.
Office Action dated Nov. 18, 2019 in U.S. Appl. No. 15/903,993.
Response to Office Action filed Apr. 16, 2020 in U.S. Appl. No. 15/903,993.
Notice of Allowance and Fee(s) Due dated May 15, 2020 in U.S. Appl. No. 15/903,993.
Qi Xu, "Improving Responsiveness of Supply Chain through RFID Visibility Technology", 2009 IEEE/INFORMS International Conference on Service Operations, Logistics and Informatics, Chicago, IL, Jul. 22-24, 2009, pp. 513-517.
Harrison et al., "Intelligent distribution and logistics", IEE Proceedings—Intelligent Transport Systems, vol. 153, No. 2, pp. 167-180, Jun. 2006.
N. Viswanadham, "The past, present, and future of supply-chain automation", IEE Robotics & Automation Magazine, vol. 9, No. 2, pp. 48-56, Jun. 2002.
C. Prasse et al., "How IoT will change the design and operation of logistics systems", 2014 International Conference on the Internet of Things (IOT), Oct. 6-8, 2014, pp. 55-60.
Leung et al., "Design of a Case-Based Multi-Agent Wave Picking Decision Support System for Handling E-Commerce Shipments", 2016 Portland International Conference on Management of Engineering and Technology (PICMET), Sep. 4-8, 2016, pp. 2248-2256.
Final Office Action dated Jun. 18, 2020 in U.S. Appl. No. 15/826,045.
Office Action dated Mar. 20, 2020 in U.S. Appl. No. 15/867,373.
Extended European Search Report dated Mar. 13, 2020 in European Patent Application No. 19217215.3.
Final Office Action dated Mar. 24, 2020 in U.S. Appl. No. 15/951,956.
Response to Office Action filed Mar. 30, 2020 in U.S. Appl. No. 15/816,832.
Office Action dated Apr. 30, 2020 in U.S. Appl. No. 15/816,832.
Response to Office Action filed Apr. 15, 2020 in U.S. Appl. No. 15/826,045.
Response to Office Action filed Apr. 17, 2020 in European Patent Application No. 18709235.8.
Response to Office Action filed Mar. 6, 2020 in European Patent Application No. 18702006.0.
Response to Office Action filed Jul. 20, 2020 in U.S. Appl. No. 15/867,373.
Office Action dated Aug. 11, 2020 in Japanese Patent Application No. 2018-515183.
Notice of Allowance and Fee(s) Due dated Aug. 19, 2020 in U.S. Appl. No. 15/867,373.
Office Action dated Aug. 20, 2020 in U.S. Appl. No. 16/121,212.
Response to Office Action filed Agusut 31, 2020 in U.S. Appl. No. 15/816,832.
Response to Office Action filed Aug. 24, 2020 in U.S. Appl. No. 15/591,956.
Response to Office Action filed Aug. 21, 2020, with English translation of claims as amended therein, in Chinese Patent Application No. 20168004385.X.
Office Action dated Sep. 14, 2020 in U.S. Appl. No. 15/591,956.
Office Action dated Sep. 14, 2020 in U.S. Appl. No. 15/903,993.
International Search Report and Written Opinion dated Sep. 4, 2020 in International Patent Application No. PCT/US2020/033250.
English language Abstract for DE3624033 published Aug. 6, 1987.
Office Action filed Oct. 19, 2020 in U.S. Appl. No. 15/816,832.
Response to Office Action filed Nov. 2, 2020, with English machine translation, in Chinese Patent Application No. 201780042943.2.
Response to Office Action filed Dec. 18, 2020, with English language translation of claims as amended, in Japanese Patent Application No. 2018-515183.
Office Action dated Dec. 24, 2020, with English language translation, in Japanese Patent Application No. 2020-038556.
Office Action dated Nov. 25, 2020, with English language translation, in Japanese Patent Application No. 2019-526569.
Office Action dated Dec. 24, 2020 in U.S. Appl. No. 16/273,449.
Notice of Allowance and Fee(s) Due dated Feb. 11, 2021 in U.S. Appl. No. 15/903,993.
C. Wurll, "Mixed Case Palletizing with Industrial Robots," Proceedings of ISR 2016: 47st International Symposium on Robotics, Munich, Germany, pp. 1-6, Jun. 21-22, 2016.
Notice of Allowance and Fee(s) Due dated Apr. 1, 2021 in U.S. Appl. No. 15/816,832.
Extended European Search Report dated May 12, 2021 in European Patent Application No. 21163777.2.
Response to Office Action filed May 17, 2021 in U.S. Appl. No. 16/273,449.
Supplemental Response to Office Action filed May 26, 2021 in U.S. Appl. No. 16/273,449.
Office Action dated Sep. 14, 2022 in Japanese Patent Application No. 2019-546194.
Office Action dated Mar. 13, 2023 in U.S. Appl. No. 17/745,627.
Office Action dated Apr. 19, 2023 in U.S. Appl. No. 17/240,777.
Office Action dated Feb. 2, 2023 in U.S. Appl. No. 17/223,714.
Final Office Action dated Mar. 24, 2020 in U.S. Appl. No. 15/591,956.
Response to Office Action filed Jan. 24, 2020 in U.S. Appl. No. 15/591,956.

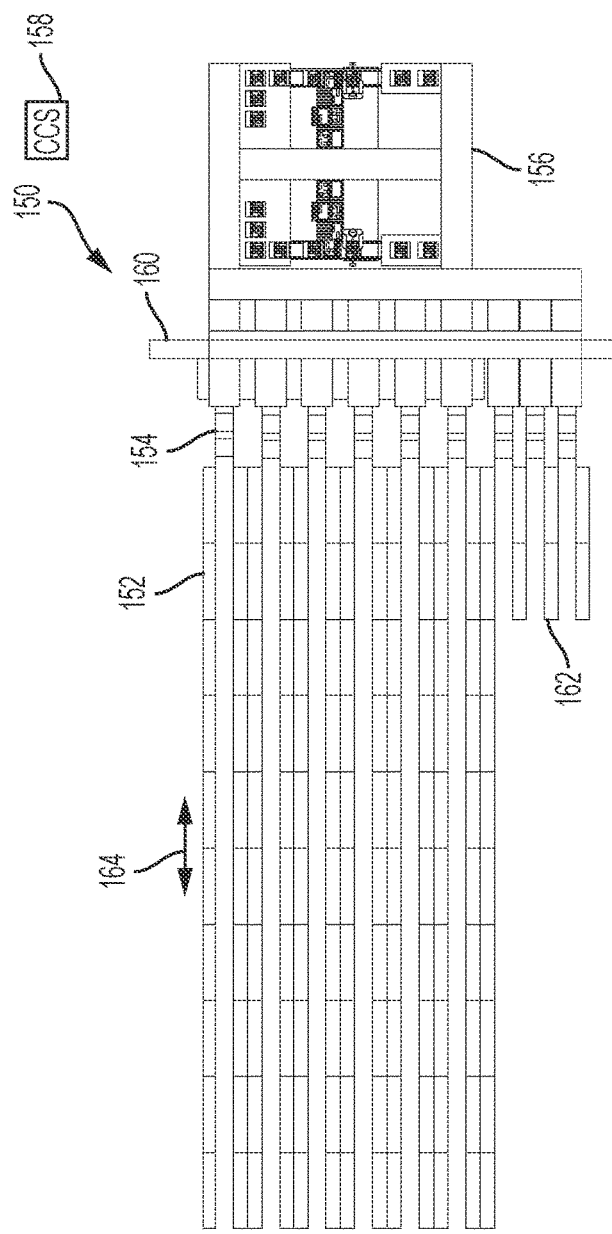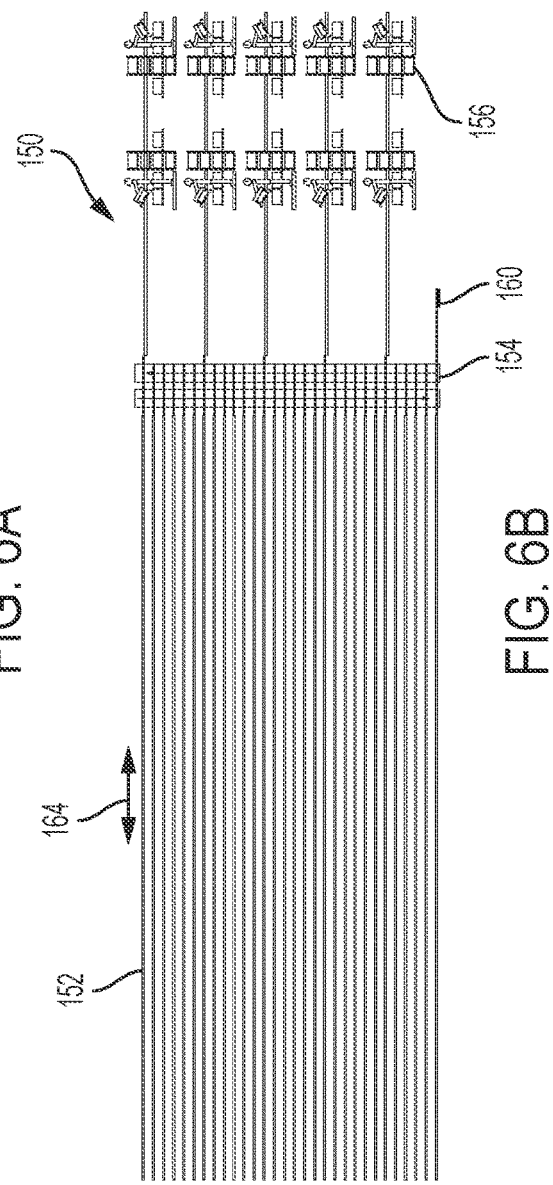

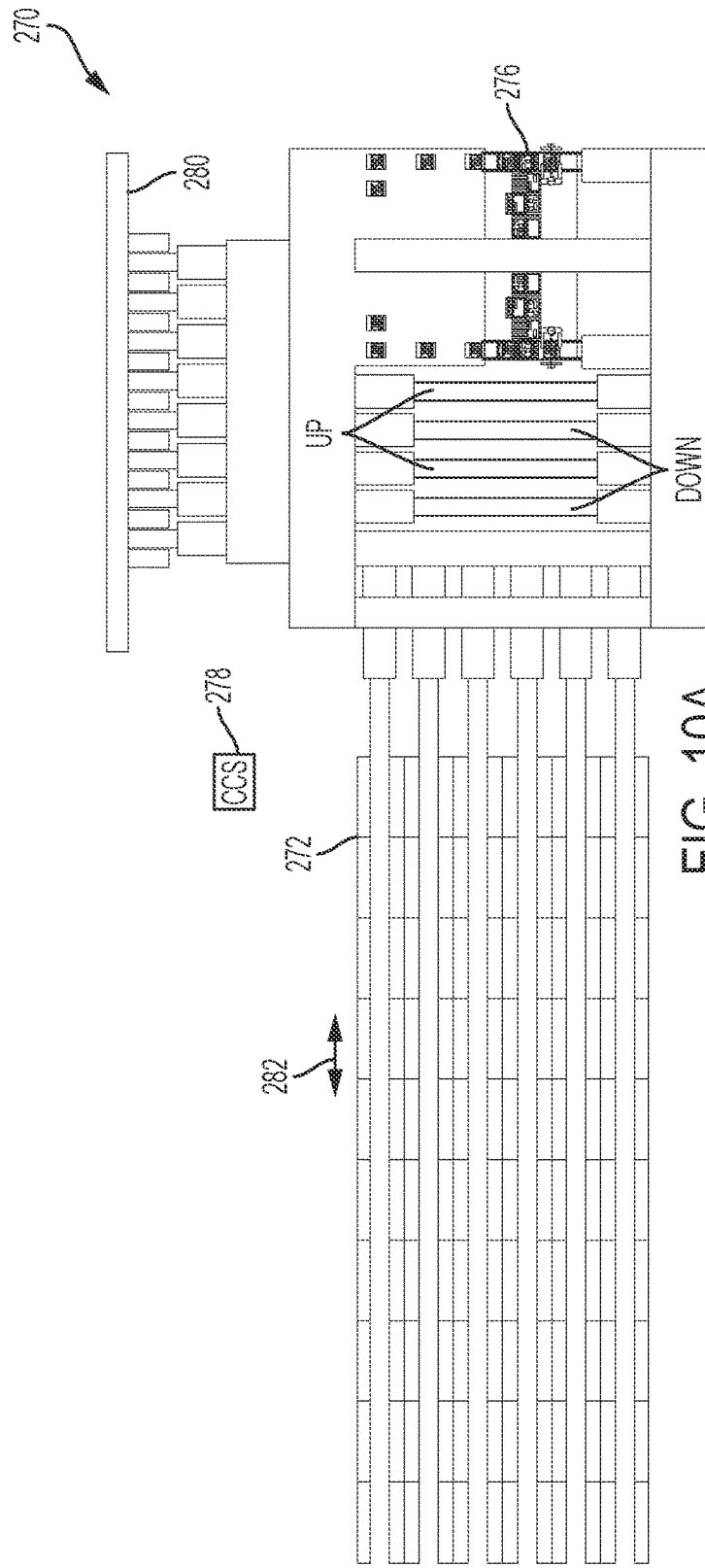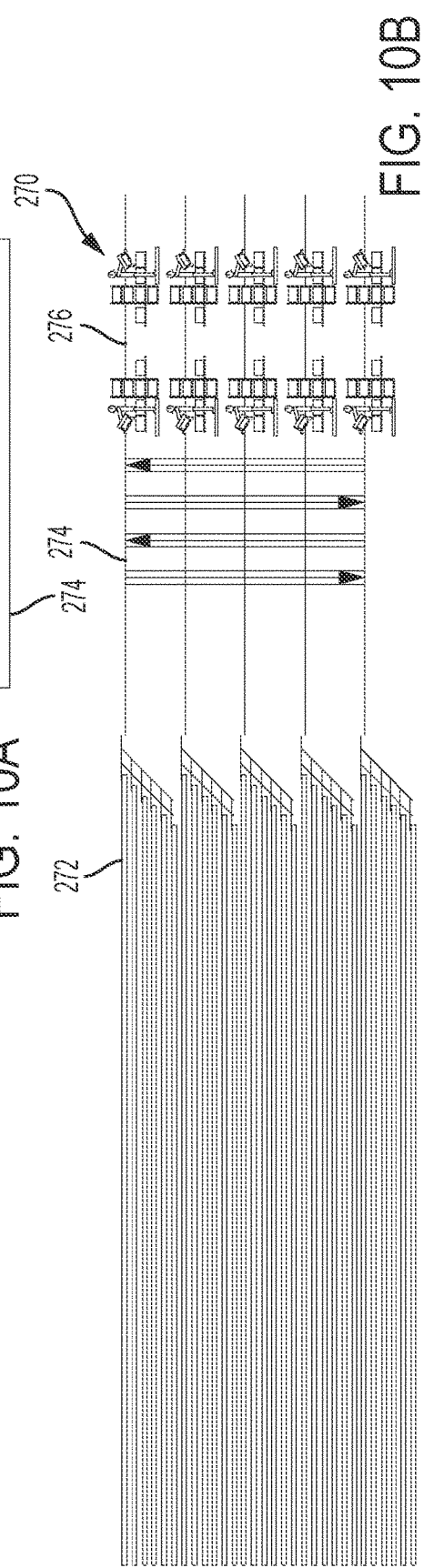

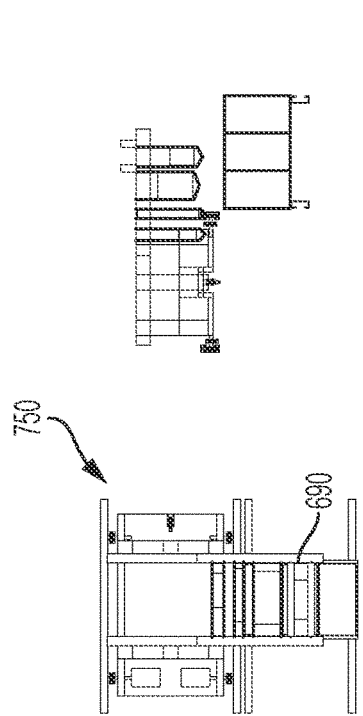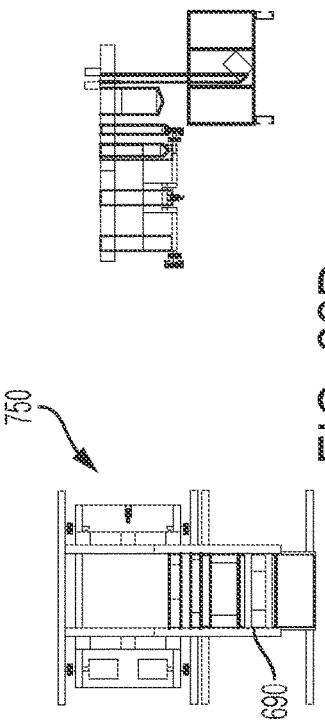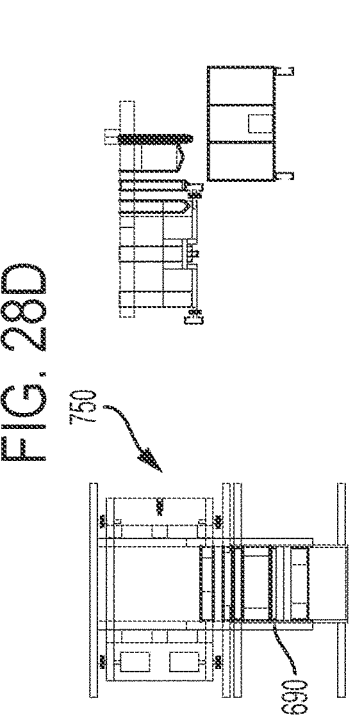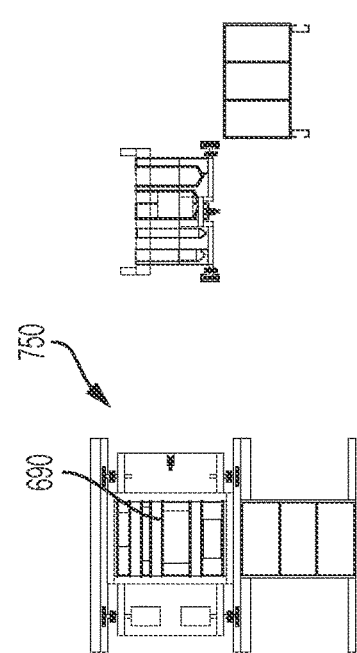
FIG. 28A  FIG. 28B  FIG. 28C  FIG. 28D  FIG. 28E  FIG. 28F

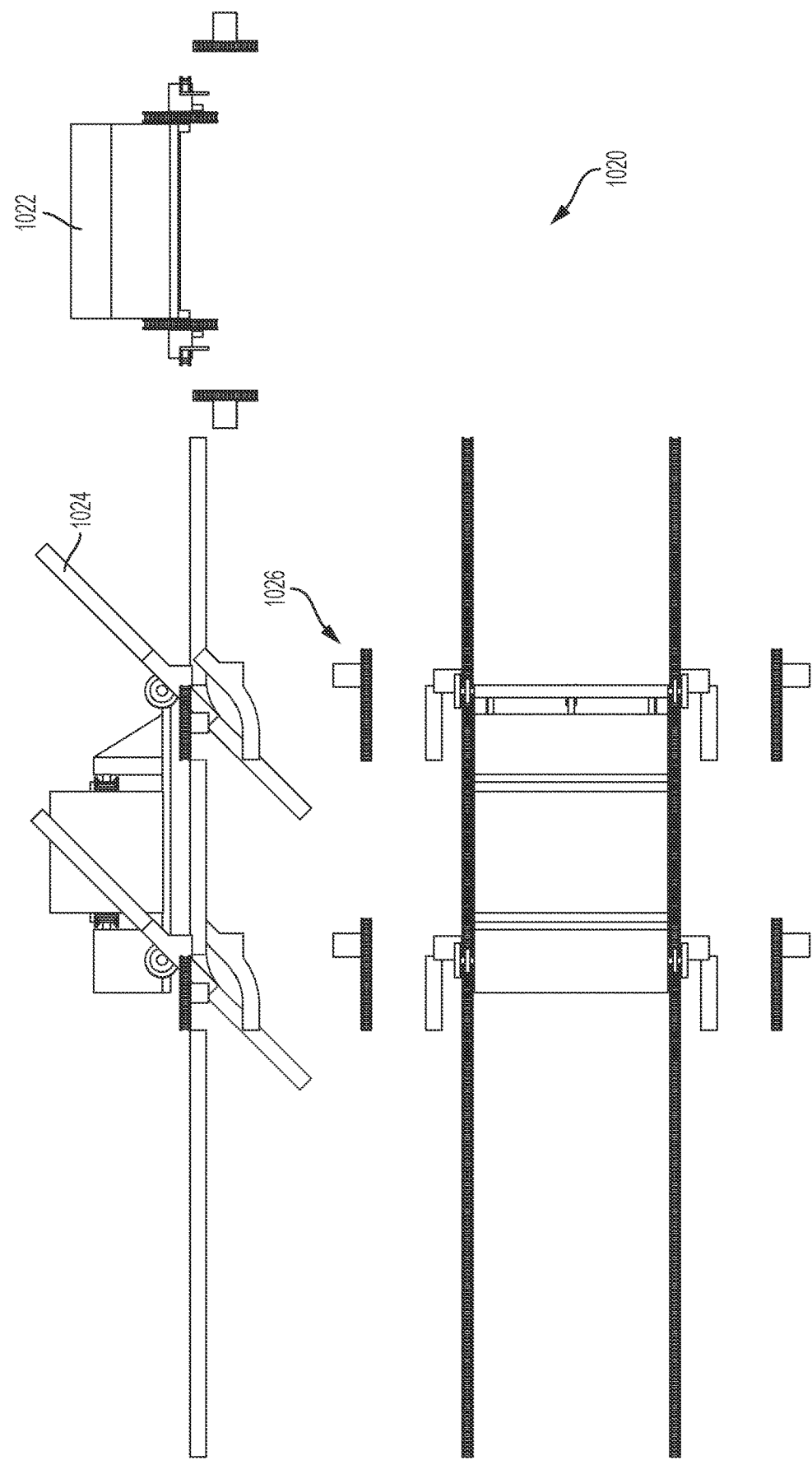

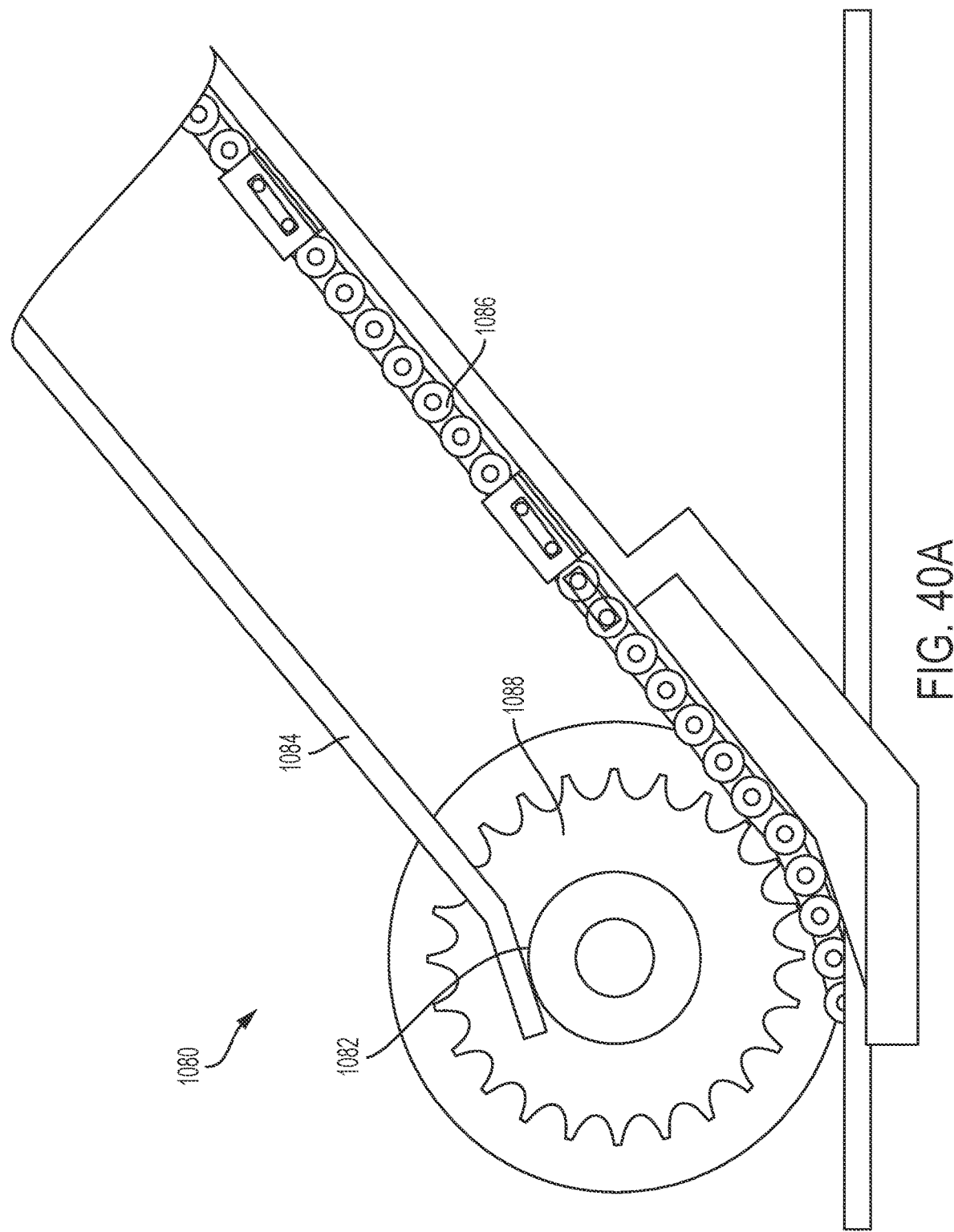

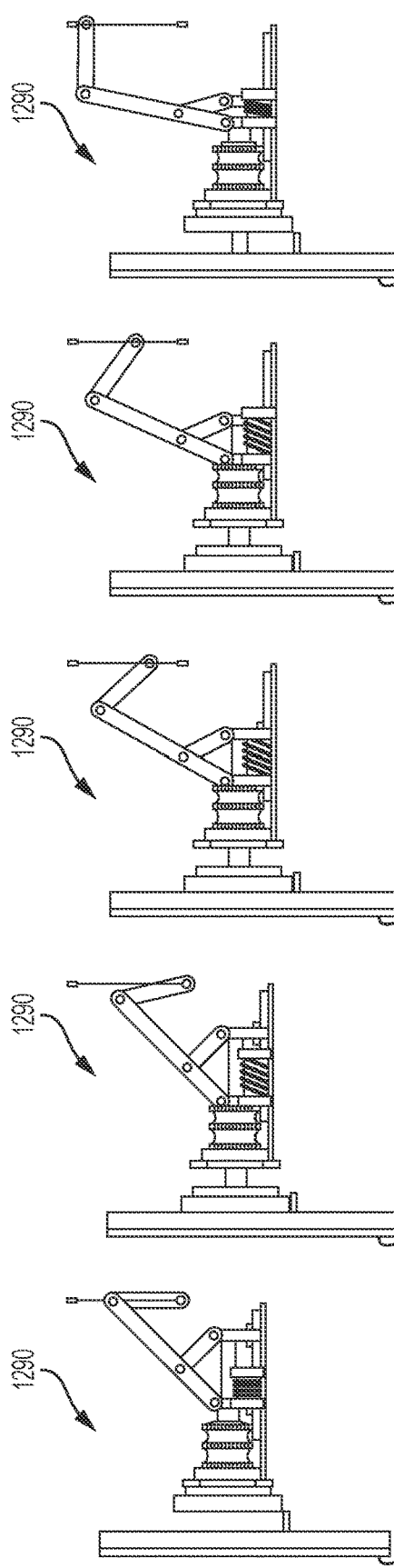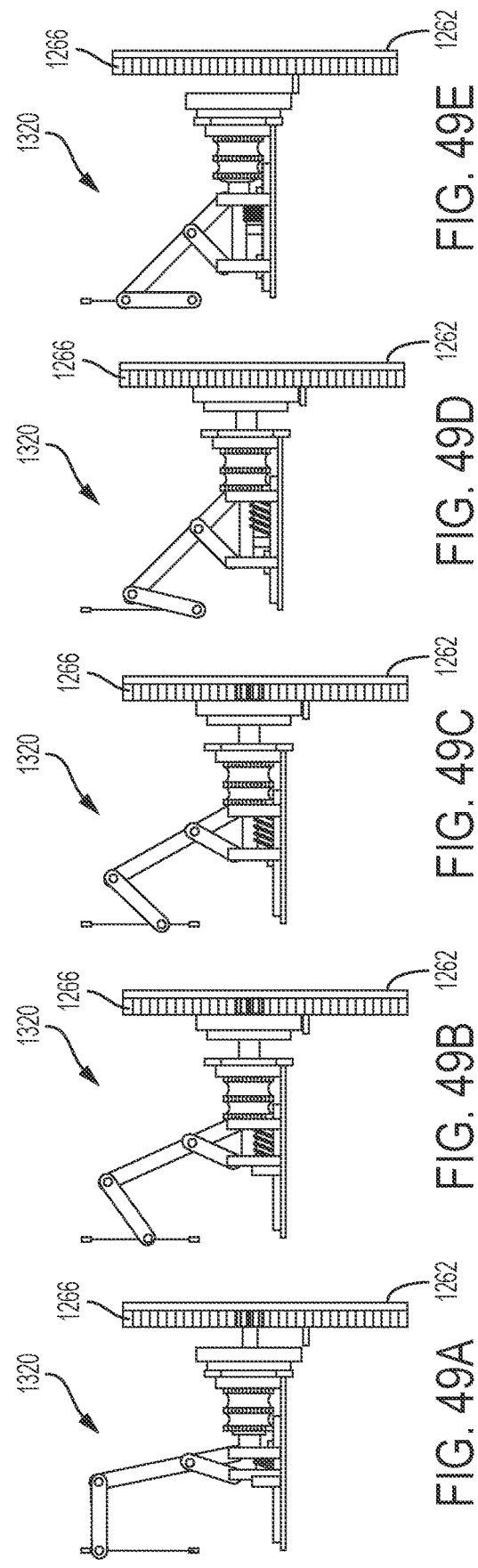

STORAGE AND RETRIEVAL SYSTEM

CROSS-REFERENCE TO RELATED APPLICATION(S)

This application is a continuation of U.S. patent application Ser. No. 16/594,647 filed Oct. 7, 2019, to be issued as U.S. Pat. No. 11,365,049, which application is a divisional of U.S. patent application Ser. No. 15/171,802 filed Jun. 2, 2016, to be issued as U.S. Pat. No. 10,435,241, which application claims priority to U.S. Provisional Patent Application No. 62/169,615 filed Jun. 2, 2015, which applications are incorporated by reference herein in their entirety.

FIELD OF THE INVENTION

The exemplary and non-limiting embodiments described herein relate generally to a storage and retrieval system, and more particularly to an order fulfillment system for use in supply chains in accordance with one illustrative embodiment.

BACKGROUND

Storage and retrieval of objects is a process that is carried out in many ways for many purposes. A specific use of storage and retrieval, namely, order-fulfillment, is a core process performed within virtually all supply chains, especially retail supply chains. Manufacturers generally store and retrieve pallets containing cases of products within their distributions to fill orders for products placed by retailers. Retailers store and retrieve both the cases and the individual product items, or "eaches", within their own distribution centers in order to fill orders placed by their stores for case-quantities and less-than-case quantities of products. Increasingly, with the rise of e-commerce, retailers are also faced with the necessity of filling orders for eaches placed directly by individual consumers.

Conventional order-fulfillment processes within retail distribution centers use manual storage and retrieval systems and methods in which cases or totes containing eaches are stored in stationary locations and human pickers move to selected locations to pick ordered cases or eaches, respectively. However, the labor efficiency of such "picker-to-goods" processes is typically quite low because the pickers spend much more time traveling to the locations than actually picking the ordered items.

The most successful solutions for improving labor efficiency in order-fulfillment processes use some form of automated storage and retrieval system and method in a "goods-to-picker" process in which the containers are delivered by mechanized means to a workstation, where a picker (human or robotic) either places the cases on pallets for delivery to stores or transfers eaches from the product containers to order containers for delivery to stores or individual customers.

SUMMARY

There is a need for an automated storage and retrieval system, such as could be implemented for an order fulfillment system among other implementations, that is highly cost-efficient and effective in units per order-line and order-lines per SKU, but to provide design flexibility that allows the configuration to be optimized for the application based on operational metrics. The present invention is directed toward further solutions to address this need, in addition to having other desirable characteristics. Specifically, a storage and retrieval system is provided. In accordance with an example embodiment utilized to demonstrate utility of the storage and retrieval system, an order fulfillment system includes a tote storage structure stores totes and supports mobile robots operating therein. The mobile robots travel in three dimensions: horizontally (forward, backward, left, and right) on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations are disposed at multiple elevations where human or robotic pickers remove eaches from product totes and place them into either order totes or a mobile robot, depending on the system configuration. A central control system includes software, computers, and network equipment. The central control system manages system resources. An input/output interface supplies totes entering the system and discharges totes leaving the system.

The following summary is merely intended to be exemplary. The summary is not intended to limit the scope of the claims. Specifically, the invention is directed to an automated storage and retrieval system. The system can be well-utilized in the illustrative role of an order fulfillment system as described herein, but is not limited to order fulfillment. Rather, the system and method of the present invention can be utilized as a general item or object storage and retrieval system, as would be appreciated by one of skill in the art with the benefit of the description and figures disclosed herein.

In accordance with an example embodiment of the present invention, a mobile robot includes one or more horizontal drives that propel the mobile robot in at least one direction along at least two horizontal dimensions. One or more vertical drives propel the mobile robot in at least one direction along at least one vertical dimension. The one or more horizontal drives are configured to engage with horizontal tracks of a multi-level storage structure, and the one or more vertical drives are configured to engage with inclined or vertical tracks of the multi-level storage structure. The mobile robot is configured to propel itself horizontally along levels of the multi-level storage structure, and to propel itself vertically from level to level of the multi-level storage structure using the inclined or vertical tracks of the multi-level storage structure while maintaining a horizontal attitude.

In accordance with aspects of the present invention, the mobile robot can further include a drive axle to which the one or more horizontal drives and one or more vertical drives are coupled. The drive axle can be extendable and retractable to selectively engage or disengage the one or more horizontal drives and one or more vertical drives with a desired track of a horizontal orientation, or with a desired track of an inclined or vertical orientation. The drive axle can be extendable and retractable to selectively engage or disengage the one or more horizontal drives and one or more vertical drives with a desired track of a horizontal orientation, or with a desired track of an inclined orientation or vertical orientation, in such a way that enables the mobile robot to select a desired track of the horizontal orientation or a desired track of the inclined or vertical orientation without requiring an active track switch.

In accordance with aspects of the present invention, the one or more horizontal drives can include one or more wheels. The one or more vertical drives can include one or more gear wheels. A container transfer mechanism can be disposed on a chassis of the mobile robot. The mobile robot can be configured to be in communication with, and receive control commands from, a centralized control system. The mobile robot can include an onboard control computer system, including a wireless communication interface. The mobile robot can include one or more sensors configured to indicate location, navigation, or payload transfers. The mobile robot can include an adjustable-width each-handler comprising a plurality of flexible load carriers. The mobile robot can include means enabling transition between the horizontal tracks and the inclined or vertical tracks at horizontal track and vertical track intersections by selectively driving and positioning the one or more horizontal drives and/or the one or more vertical drives to engage or disengage a desired horizontal track or a desired vertical track.

In accordance with an example embodiment of the present invention, an automated storage-and-retrieval system includes a multi-level storage structure including a plurality of rack modules separated by aisles, each rack module having a set of horizontal supports configured to store objects at a plurality of storage levels within each aisle and a set of horizontal tracks associated with each of the storage levels, and at least one set of inclined or vertical tracks disposed between and connecting levels of the multi-level storage structure. At least one mobile robot includes one or more horizontal drives that propel the at least one mobile robot in at least one direction along at least one horizontal dimension, and one or more vertical drives that propel the at least one mobile robot in at least one direction along at least one vertical dimension. The one or more horizontal drives engage with the set of horizontal tracks of the multi-level storage structure, and the one or more vertical drives engage with the inclined or vertical tracks of the multi-level storage structure. The at least one mobile robot propels itself horizontally along the aisles of the multi-level storage structure, and propels itself vertically from level to level of the multi-level storage structure using the inclined or vertical tracks of the multi-level storage structure.

In accordance with aspects of the present invention, at least one set of inclined or vertical tracks can further include moveable segments that selectively engage the one or more vertical drives of the at least one mobile robot by being moved from a non-engaging position to an engaging position. The at least one set of inclined or vertical tracks can be passive and the at least one mobile robot can selectively engage the at least one set of inclined or vertical tracks by moving the one or more vertical drives from a non-engaging position to an engaging position.

In accordance with aspects of the present invention, the one or more horizontal drives can include extendable wheels and the one or more vertical drives comprise extendable gear wheels. The at least one set of inclined or vertical tracks can be positioned adjacent to the set of horizontal tracks. The at least one mobile robot can extend the wheels of the one or more horizontal drives and retract the gear wheels of the one or more vertical drives when traveling on the set of horizontal tracks, and extend the gear wheels of the one or more vertical drives and retracts the wheels of the one or more horizontal drives when traveling on the at least one set of inclined or vertical tracks.

In accordance with aspects of the present invention, the system can further include at least one picking station contiguous to at least one aisle, wherein at least one of the at least one mobile robot can deliver a stored object to a picker at the at least one picking station. At least one horizontal transit deck can be contiguous to at least two aisles, the at least one horizontal transit deck enabling the at least one mobile robot to enter and exit the at least two aisles from and to the at least one horizontal transit deck, and travel horizontally to any other location also contiguous to the at least one transit deck.

In accordance with aspects of the present invention, the at least one set of inclined or vertical tracks can further include moveable segments that selectively engage the one or more vertical drives of the at least one mobile robot by being moved from a non-engaging position to an engaging position.

In accordance with aspects of the present invention, the at least one set of inclined or vertical tracks can be passive and the at least one mobile robot can selectively engage the at least one set of inclined or vertical tracks by moving the one or more vertical drives from a non-engaging position to an engaging position. The one or more horizontal drives can include extendable wheels and the one or more vertical drives comprise extendable gear wheels. The at least one set of inclined or vertical tracks can be positioned adjacent to the set of horizontal tracks. The at least one mobile robot can extend the wheels of the one or more horizontal drives and retracts the gear wheels of the one or more vertical drives when traveling on the set of horizontal tracks, and extend the gear wheels of the one or more vertical drives and retracts the wheels of the one or more horizontal drives when traveling on the at least one set of inclined or vertical tracks.

In accordance with aspects of the present invention, the system can further include at least one workstation contiguous to the at least one horizontal transit deck, wherein at least one of the at least one mobile robot can deliver at least one stored object to an operator at the at least one workstation. The at least one stored object can include containers of items and the at least one mobile robot delivers a plurality of containers to the at least one workstation in such a way that the operator can transfer items between the containers.

In accordance with an example embodiment of the present invention, a transfer mechanism can include at least one flexible load carrier having a support frame, a first horizontal support bar slidably coupled with the support frame, a second horizontal support bar slidably coupled with the support frame, a flexible sheet coupled at a first end with the first horizontal support bar and at a second end, opposite the first end, with the second horizontal support bar, and a handle coupled with the flexible sheet. The transfer mechanism can further include at least one manipulator having first and second linear motion motors that propel the first horizontal support bar or the second horizontal support bar linearly along the support frame, a grasper device adapted to grasp the handle, and a motorized load carrier, attached by cable to the handle, and configured to extend or retract the cable to lower or raise objects into or out of the at least one flexible load carrier.

In accordance with aspects of the present invention, operation of the first and second linear motion motors operates to slide at least one of the first and second horizontal support bars along the support frame to adjust a volume of space available within the at least one flexible load carrier to carry one or more objects.

In accordance with an example embodiment of the present invention, an automated order fulfillment system includes a multi-level tote storage structure storing one or more totes. One or more mobile robots are configured to pick, transport, and place the one or more totes, propel themselves horizontally across levels of the multi-level tote storage structure, and propel themselves vertically from level to level within the multi-level tote storage structure using one or more stationary inclined or vertical tracks. One or more workstations are configured to accommodate a picker that transports one or more eaches from one of the one or more totes on one of the one or more mobile robots to a put location. An input/output interface where product is inducted into the order fulfillment system and where fulfilled orders are discharged from the order fulfillment system.

In accordance with aspects of the present invention, the one or more mobile robots can be further configured to propel themselves vertically from level to level in the order fulfillment system while maintaining a horizontal attitude. The one or more workstations can include a tilted location in such a way that the tilted location supports a mobile robot. The tilted location can support a first mobile robot and wherein a picker transfers one or more eaches from the first mobile robot to a second robot located on the tilted location.

In accordance with aspects of the present invention, the one or more mobile robots include a frame chassis. A tote transfer mechanism is coupled to the frame chassis. Four actuated wheel assemblies are coupled to the frame chassis, with each of the four actuated wheel assemblies having a traction wheel and a fixed gear wheel.

In accordance with aspects of the present invention, the fixed gear wheel can include a sprocket gear and the one or more stationary inclined or vertical tracks can include a chain that engages with the sprocket gear.

In accordance with aspects of the present invention, the system can implement a direct-put process in which eaches are transferred in a single operation from a product container instance of the one or more totes transported by one of the one or more mobile robots directly into an order container instance of the one or more totes transported by one of the one or more mobile robots.

In accordance with aspects of the present invention, the system can implement an indirect-put process in which a picked each is placed into a first of the one or more totes transported by one of the one or more mobile robots which transports the picked each to, and then puts it into, an order container instance of the one or more totes transported by one of the one or more mobile robots.

In accordance with aspects of the present invention, the one or more stationary inclined or vertical tracks can each include a counter-rail channel that engages a bearing on the one or more mobile robots to maintain engagement with the vertical tracks. The system can further include a hinged gate-switch at each entry/exit that enables the bearing on the one or more mobile robots to enter and exit the counter-rail channel when the one or more mobile robots are entering or exiting the one or more stationary inclined or vertical tracks and prevents the bearing on the one or more mobile robots from leaving the counter-rail channel when the one or more mobile robots are not entering or exiting the counter-rail channel. The one or more stationary inclined or vertical tracks can further include a pair of horizontal mobile robot rails positioned between opposing vertical tracks at each elevation at which the one or more mobile robots enter or exit the counter-rail channel, the pair of horizontal mobile robot rails connecting to mobile robot beams of each level and to each transit deck. A gap can exist in the pair of horizontal mobile robot rails immediately adjacent to each of the vertical tracks at each of the one or more stationary inclined or vertical tracks, sized, dimensioned, and configured to enable passage of fixed gear wheels of the mobile robot therethrough when the mobile robot is ascending or descending in the vertical direction.

In accordance with aspects of the present invention, the one or more stationary inclined or vertical tracks can further include powered charging rails configured to transfer charging energy to the one or more mobile robots while engaged with the one or more stationary inclined or vertical tracks. The one or more stationary inclined or vertical tracks can include switches actuated by either the one or more mobile robots or actuated with motors disposed on the one or more stationary inclined or vertical tracks. The one or more stationary inclined or vertical tracks can include switches controlled by the one or more mobile robots or by a central control system. The one or more mobile robots can include an onboard control computer system, including a wireless communication interface. The one or more mobile robots can include one or more sensors configured to indicate location, navigation, or payload transfers. The one or more mobile robots can include adjustable-width each-handler comprising a plurality of flexible load carriers.

In accordance with an example embodiment of the present invention, a mobile robot can include a frame chassis, a transfer mechanism coupled to the frame chassis, a drive axle, one or more fixed gear wheels mounted on the drive axle, and one or more cylindrical drive wheels mounted on the drive axle. The one or more fixed gear wheels can be configured to engage with a stationary track in inclined orientation, and the one or more cylindrical drive wheels can be configured to travel along a stationary track in horizontal orientation. The mobile robot can be configured to operate with a stationary track that utilizes switches to direct the mobile robot between a desired stationary track in inclined orientation or a desired stationary track in horizontal orientation.

In accordance with an example embodiment of the present invention, a mobile robot includes a frame chassis, a transfer mechanism coupled to the frame chassis, a drive axle, one or more fixed gear wheels fixed mounted on the drive axle, and one or more cylindrical drive wheels mounted on the drive axle. The one or more fixed gear wheels can be configured to engage with a stationary track in inclined orientation, and the one or more cylindrical drive wheels can be configured to travel along a stationary track in horizontal orientation. The drive axle can be extendable and retractable to engage or disengage the one or more fixed gear wheels and the one or more cylindrical drive wheels with a desired stationary track of the inclined orientation or a desired stationary track of the horizontal orientation.

In accordance with an example embodiment of the present invention, a mobile robot includes a frame chassis, a transfer mechanism coupled to the frame chassis, a drive axle, one or more fixed gear wheels mounted on the drive axle, and one or more cylindrical drive wheels mounted on the drive axle. The one or more fixed gear wheels can be configured to engage with a stationary track in vertical orientation, and the one or more cylindrical drive wheels can be configured to travel along a stationary track in horizontal orientation. The drive axle can be extendable and retractable to engage or disengage the one or more fixed gear wheels and the one or more cylindrical drive wheels with either a track of vertical orientation or a track of horizontal orientation in such a way that enables the mobile robot to select a desired stationary track of the vertical orientation or a desired stationary track of horizontal orientation without requiring an active track switch.

In accordance with an example embodiment of the present invention, an automated order fulfillment system includes a multi-level tote storage structure for storing one or more totes. One or more mobile robots are configured to pick, transport, and place the one or more totes, move horizontally across levels of the multi-level tote storage structure, and move vertically between levels from level to level within the multi-level tote storage structure using one or more stationary inclined or vertical tracks. One or more workstations are configured to accommodate a picker that transports one or more eaches from one of the one or more totes on one of the one or more mobile robots to a put location. An input/output interface is provided where product is inducted into the order fulfillment system and where fulfilled orders are discharged from the order fulfillment system.

In accordance with one embodiment of the present invention, a mobile robot includes one or more horizontal drives having wheels that propel the mobile robot in at least one direction along at least one horizontal dimension. One or more vertical drives have wheels that propel the mobile robot in at least one direction along at least one vertical dimension. The one or more horizontal drives are configured to engage with horizontal tracks of a multi-level storage structure, and the one or more vertical drives are configured to engage with inclined or vertical tracks of the multi-level storage structure. The wheels of the one or more horizontal drives and/or the wheels of the one or more vertical drives are moveable such that the robot can selectively engage with the horizontal tracks and with the inclined or vertical tracks.

In accordance with aspects of the present invention, wheels of the one or more horizontal drives and the wheels of the one or more vertical drives can be coaxial. Alternatively, the wheels of the one or more horizontal drives and the wheels of the one or more vertical drives can be on separate axles.

In accordance with an example embodiment of the present invention, a mobile robot includes horizontal drive means configured to propel the mobile robot on a horizontal track. Vertical drive means are configured to propel the mobile robot on an inclined or vertical track. Means of the robot enable transition between the horizontal track and the inclined or vertical track at intersections thereof by selectively driving and positioning the horizontal drive means and/or the vertical drive means to engage or disengage a desired horizontal track or a desired inclined or vertical track.

In accordance with an example embodiment, an order fulfillment apparatus is provided comprising a multi-level tote storage structure, one or more mobile robots configured to pick, transport and place one or more tote; one or more workstations configured to accommodate a picker that transports one or more eaches from a tote on one of the mobile robots to a "put" location, and an input/output interface where material is inducted into the order fulfillment apparatus and where fulfilled orders are discharged from the order fulfillment apparatus wherein the mobile robots are further configured to move from level to level in the order fulfillment apparatus via stationary verticals or stationary ramps.

In accordance with another example embodiment, an order fulfillment apparatus is provided comprising a multi-level tote storage structure, one or more mobile robots configured to pick, transport and place one or more tote; one or more workstations configured to accommodate a picker that transports one or more eaches from a tote on one of the mobile robots to a "put" location, and an input/output interface where material is inducted into the order fulfillment apparatus and where fulfilled orders are discharged from the order fulfillment apparatus wherein the mobile robots are further configured to move from level to level in the order fulfillment apparatus via stationary verticals or stationary ramps and wherein the mobile robots are further configured to move from level to level in a horizontal attitude.

In accordance with another example embodiment, an order fulfillment workstation is provided comprising a tote support and a tilted location adjacent the tote support; wherein the tilted location supports a mobile robot and wherein a picker transfers one or more eaches from the mobile robot to a tote located on the tote support.

In accordance with another example embodiment, an order fulfillment workstation is provided comprising a tote support and a tilted location adjacent the tote support; wherein the tilted location supports an first mobile robot and wherein a picker transfers one or more eaches from the first mobile robot to a second mobile robot located on the tilted location.

In accordance with another example embodiment, an order fulfillment workstation is provided comprising a product support; a tilted location adjacent the tote support; a machine vision subsystem; a target illuminator and a picker interface; wherein the tilted location supports a mobile robot and wherein a picker transfers one or more eaches from the mobile robot to the product support and wherein the machine vision subsystem follows movement of the picker and wherein the target illuminator illuminates eaches to be picked and locations where eaches are to be placed and wherein the picker interface provides information to the picker.

In accordance with another example embodiment, a mobile robot is provided comprising a frame chassis; a transfer mechanism coupled to the frame; two traction drives coupled to a first end of the frame; two wheels coupled to a second end of the frame and a caster coupled to the frame; wherein the two traction drives and the caster engage a common surface when the mobile robot is supported by a deck and wherein the two traction drives and the two wheels engage tracks when the mobile robot is supported by tracks.

In accordance with another example embodiment, a mobile robot is provided comprising a frame chassis; a transfer mechanism coupled to the frame; four actuated wheel assemblies coupled to the frame, each of the four actuated wheel assemblies having a traction wheel and a sprocket.

In accordance with one example embodiment, an order vending machine, includes a multi-level container storage structure. A mobile robot is operable within the multi-level container storage structure to store and retrieve containers, the mobile robot having direct access to all container storage locations. A customer access port is provided. The mobile robot positions the container for access by a customer at the customer access port.

In accordance with aspects of the present invention, the access port is configurable in such a way that all or only a portion of the container is accessible by the customer at the customer access port.

While the primary focus of application of the present invention is in retail supply chains, where the stored objects are containers of products, which can include pallets, cases, or bins (also called "totes"), the invention can also readily be applied to automating the storage and retrieval of other objects.

BRIEF DESCRIPTION OF THE FIGURES

These and other characteristics of the present invention will be more fully understood by reference to the following detailed description in conjunction with the attached drawings, in which:

FIG. 6A is a top view of an example order fulfillment system in accordance with aspects of the disclosed embodiment;

FIG. 6B is a side view of an example order fulfillment system in accordance with aspects of the disclosed embodiment;

FIG. 10A is a top view of an example order fulfillment system in accordance with aspects of the disclosed embodiment;

FIG. 10B is a side view of an example order fulfillment system in accordance with aspects of the disclosed embodiment;

FIG. 28A is a top and side view of a vehicle in accordance with aspects of the disclosed embodiment;

FIG. 28B is a top and side view of a vehicle in accordance with aspects of the disclosed embodiment;

FIG. 28C is a top and side view of a vehicle in accordance with aspects of the disclosed embodiment;

FIG. 28D is a top and side view of a vehicle in accordance with aspects of the disclosed embodiment;

FIG. 28E is a top and side view of a vehicle in accordance with aspects of the disclosed embodiment;

FIG. 28F is a top and side view of a vehicle in accordance with aspects of the disclosed embodiment;

FIG. 38A is a side, end and top view of a vehicle with a ramp in accordance with aspects of the disclosed embodiment;

FIG. 40A is a side schematic view of a transmission in accordance with aspects of the disclosed embodiment;

FIG. 48A is an end view of an orthogonal drive unit in accordance with aspects of the disclosed embodiment;

FIG. 48B is an end view of an orthogonal drive unit in accordance with aspects of the disclosed embodiment;

FIG. 48C is an end view of an orthogonal drive unit in accordance with aspects of the disclosed embodiment;

FIG. 48D is an end view of an orthogonal drive unit in accordance with aspects of the disclosed embodiment;

FIG. 48E is an end view of an orthogonal drive unit in accordance with aspects of the disclosed embodiment;

FIG. 49A is an end view of an orthogonal drive unit in accordance with aspects of the disclosed embodiment;

FIG. 49B is an end view of an orthogonal drive unit in accordance with aspects of the disclosed embodiment;

FIG. 49C is an end view of an orthogonal drive unit in accordance with aspects of the disclosed embodiment;

FIG. 49D is an end view of an orthogonal drive unit in accordance with aspects of the disclosed embodiment;

FIG. 49E is an end view of an orthogonal drive unit in accordance with aspects of the disclosed embodiment;

FIG. 50D is an isometric view of an orthogonal drive unit in accordance with aspects of the disclosed embodiment; and FIG. 50E is an isometric view of an orthogonal drive unit.

DETAILED DESCRIPTION

Figure 1:
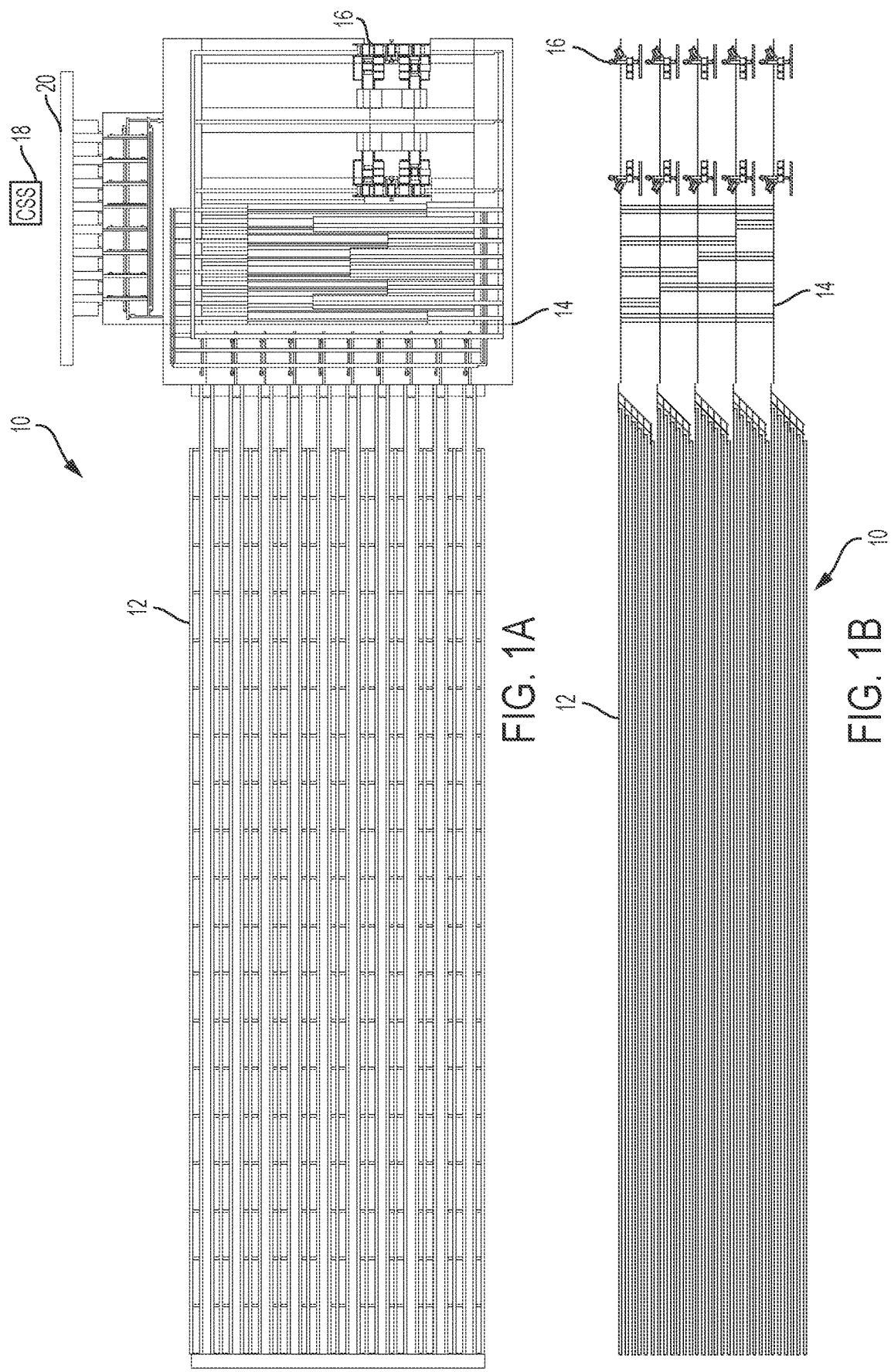
FIG. 1A is a top view of an example order fulfillment system in accordance with aspects of the disclosed embodiment.
FIG. 1B is a side view of an example order fulfillment system in accordance with aspects of the disclosed embodiment.

FIGS. 1 through 50E, wherein like parts are designated by like reference numerals throughout, illustrate an example embodiment or embodiments of an order fulfillment system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

The disclosed embodiment may be described as an order-fulfillment system for use in supply chains, for example in retail supply chains. The embodiment is disclosed for fulfilling orders from retail stores for cases of products received from manufacturers or for fulfilling orders from retail stores or from individual consumers for discreet product units contained in such cases, referred to herein as "eaches" (other commonly used synonyms include "pieces", "articles", "items"), or generally any articles ordered by stores or individual consumers in less-than-case quantities. While the embodiment can be used in other applications, such as storage and retrieval of parts and work-in-process within manufacturing operations, one field of use is order-fulfillment in retail supply chains.

The embodiments may have the following major component subsystems:

(1) a multi-level rack structure that holds picking stock, generally configured to maximize space utilization by using all available cubic volume, from floor to ceiling;

(2) mobile vehicles or robots, which are autonomous or semi-autonomous vehicles that can receive control commands and perform various transfer and transport functions depending on embodiment, including handling the movement of containers of products (picking stock) between storage locations within the rack structure and workstations;

(3) in fulfillment embodiments, for example, workstations at which human or robotic pickers transfer cases or eaches either directly into order containers of some form or to intermediate robots which then transfer to order containers, depending on embodiment; and (4) a centralized control system, comprising computers, software, and communications components, which manages the operation of the entire system. An operational system may also include one or more input/output interfaces where product is inducted into the system to replenish the picking stock and completed orders are discharged from the system to be delivered eventually to customers, though the details of that interface will tend to vary across different applications.

Those of skill in the art will appreciate that the transfer mechanisms described herein can be varied depending on application and implementation, based on the particular objects that are required to be stored and retrieved. For various storage and retrieval systems, the transfer mechanisms can take some forms, while in order fulfillment embodiments, the transfer mechanisms can take other forms, such that the present invention is not limited to the specific transfer mechanisms described herein.

In the exemplary each-picking embodiments, the each is the most granular unit of handling, for example, in retail supply chains. Processes to fulfill orders for eaches, usually referred to as "each-picking" or "piece-picking", may be the most labor-intensive of all fulfillment processes, especially using the traditional "picker-to-goods" process models in which pickers move to stationary product-storage locations to pick ordered eaches. In the exemplary embodiment, the word "Tote" is a term commonly used in the field of materials handling for a container that holds materials being stored or handled, and is used hereinafter to refer to both product and order containers. Those of skill in the art will appreciate that in storage and retrieval implementations of the present invention, containers are utilized to store and convey objects using the mobile robots, and that the "tote" embodiments are specific forms of containers that are implemented in order fulfillment systems.

To maximize picker throughput and achieve a very high or even total level of automation, the disclosed embodiment implements a "goods-to-picker" process model in which mobile robotic vehicles transport containers of eaches to workstations where stationary pickers (either human or robotic) pick ordered eaches from the containers. The picked eaches may then be ultimately placed into order containers for eventual delivery to customers, either stores or individual consumers.

By way of example, two each-picking embodiments are disclosed herein, the essential difference between being the "put" process by which the eaches are transferred into the order container. In the first embodiment ("E-1"), this transfer process is the typical "direct-put" process in which the each is transferred in a single move from the product container directly into the order container. The second embodiment ("E-2") features an "indirect-put" process in which this transfer is made in two moves: the picked each is first put into another mobile robot that serves as an intermediate carrier that transports the each to, and then puts it into, the order container.

Both E-1 (direct put) and E-2 (indirect put) may include the following seven elements or subsystems:

(1) Product Totes (hereinafter referred to as "P-Totes") containing the picking stock of eaches used to fulfill orders;

(2) Order Totes (hereinafter referred to as "O-Totes") containing the eaches picked to fulfill orders;

(3) Robotic vehicles (mobile robots) that are self-propelling and self-steering, and can transfer and transport payloads, usually (but not always) Totes, hereinafter referred to as "T-Bots" (or generically as "Bots");

(4) A Tote-Storage Structure (hereinafter referred to as the "TSS"), which provides the structural support for stored Totes (both P-Totes and O-Totes) and also for the Bots operating therein;

(5) Picking Workstations where human or robotic pickers remove eaches from P-Totes and place them into either O-Totes or another T-Bot, depending on embodiment; and (6) A Central Control System (hereinafter referred to as "CCS"), consisting of software, computers, and network equipment, which manages most of the resources within the system (including all of the various robots), orchestrates the entire order-fulfillment process and all related processes, and provides status and control interfaces to human operators of the system and to external systems;

(7) Input/Output ("I/O") Interfaces at which T-Bots discharge Totes leaving the system and receive Totes entering the system.

E-2 (indirect put) further includes two additional elements or subsystems:

(8) T-Bots equipped with Each-Transfer Assemblies that receive and hold eaches picked at the Picking Workstations and then transfer them into target O-Totes (such Bots hereinafter referred to as "Each-Bots" or simply "E-Bots"); and (9) An Order-Loading Structure (hereinafter referred to as "OLS") that provides structural support for O-Totes being loading and for O-Bots and E-Bots operating therein;

These elements and their respective interoperation are described in greater detail below. It is to be understood that associated with these systems are additional ancillary equipment and subsystems, such as maintenance hoists for use in removing disabled robotic vehicles, safety features for robotic vehicle containment and safe human access, fire-suppression systems, etc.

Tracks are referred to herein throughout to refer to supports of various orientations (e.g., horizontal, inclined, or vertical) upon which mobile robots travel. The meaning of the term "track" is intended to be consistent with its generally accepted definition, and including being a course laid out to be followed, parallel rails (e.g., for use by a train or wheeled cart), singular or multiple rails engaged by wheels or rollers of a cart or the like, channels, and/or other forms of pathway indication and guidance of a moveable vehicle or cart, as would be appreciated by those of skill in the art.

Referring to FIG. 1A, there is shown a schematic top plan view of an example order fulfillment system 10. Although the present embodiment will be described with reference to the embodiments shown in the drawings, it should be understood that the present invention may be embodied in many forms of alternative embodiments. In addition, any suitable size, shape or type of materials or elements could be used. Order fulfillment system 10 and the disclosed embodiments may have features as described and/or may have in any suitable combination features as described in U.S. patent application Ser. No. 14/213,187 filed Mar. 14, 2014 and entitled "Automated Systems for Transporting Payloads" hereby incorporated by reference in its entirety. Referring also to FIG. 1B, there is shown a side view of example order fulfillment system 10. Order fulfillment system 10 may have product Totes and order Totes with mobile robots or vehicles that transfer and transport Totes. Tote storage structure 12 is shown as structural support for stored Totes and also for the mobile robots operating therein and as will be described in greater detail. Mobile robot transit structures 14 are shown whereby mobile robots travel in three dimensions: horizontally on planar transit decks that interconnect the rack structure and workstations; and vertically on vertical tracks or ramps that interconnect storage lanes and workstations at multiple elevations. Picking workstations 16 are shown arrayed at multiple elevations where human or robotic pickers remove eaches from product Totes and place them into either order Totes or a robot, depending on the system configuration. Central control system 18 is shown consisting of software, computers, and network equipment, which manages system resources as will be described, for example with respect to FIG. 19. Input/output interface 20 is shown as a conveyor with spurs where mobile robots receive Totes entering the system (filled product Totes and empty order Totes) and discharge Totes leaving the system (empty product Totes and filled order Totes) at the spurs.

Figure 2:
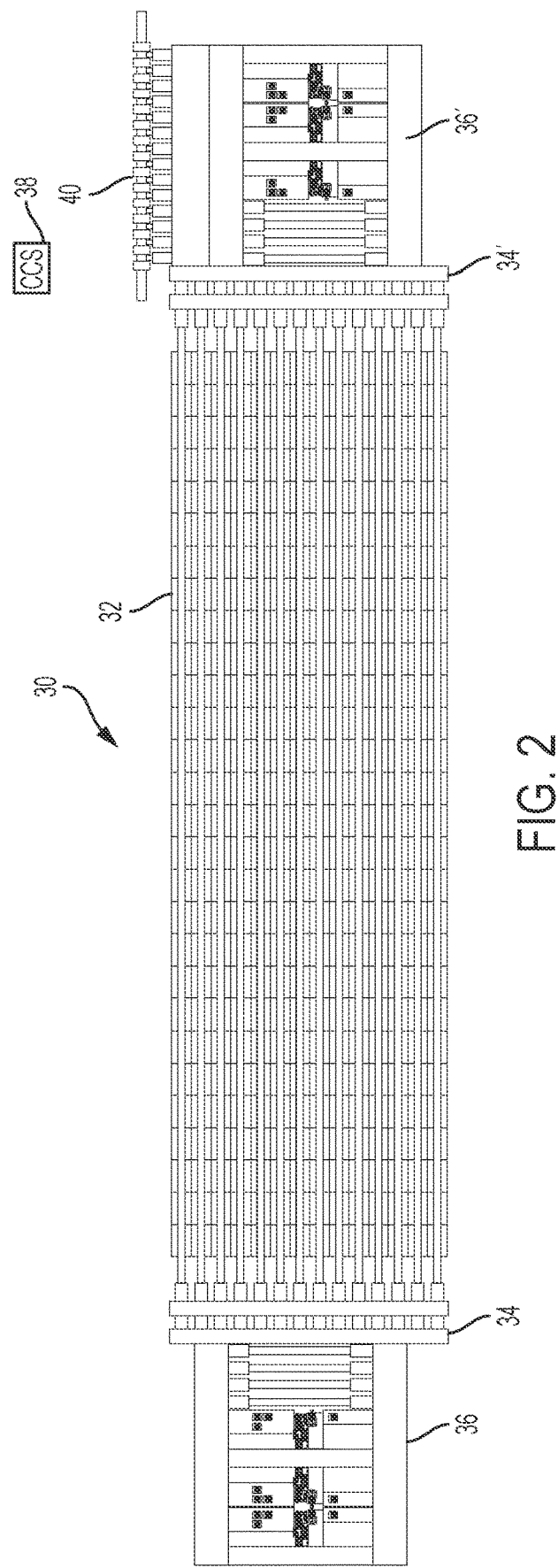
FIG. 2 is a top view of an example order fulfillment system in accordance with aspects of the disclosed embodiment.

Referring now to FIG. 2, there is shown a top view of example order fulfillment system 30. Order fulfillment system 30 is configured using aisle and transit ramps and may have product Totes and order Totes with mobile robots or vehicles that transfer and transport Totes. Multi-level tote storage structure 32 is shown as structural support for stored Totes and also for the mobile robots operating therein and as will be described in greater detail. Mobile robot transit structures 34, 34' are shown whereby mobile robots travel in three dimensions: horizontally on planar transit decks that interconnect the rack structure and workstations; and vertically on vertical tracks or ramps that interconnect storage lanes and workstations at multiple elevations. Notably, the mobile robots are configured to move vertically from level to level within the multi-level tote storage structure 32 without the requirement of a vertical lift, vertical conveyor, or other such animated mechanism provided by the multi-level tote storage structure 32. The mobile robots, instead, are configured to utilize the vertical tracks or ramps of the multi-level tote storage structure 32 to move vertically between levels. Picking workstations 36, 36' are shown arrayed at multiple elevations where human or robotic pickers remove eaches from product Totes and place them into either order Totes or a mobile robot, depending on the system configuration. Central control system 38 is shown consisting of software, computers, and network equipment, which manages system resources as will be described, for example with respect to FIG. 19. Input/output interface 40 is shown as a conveyor with spurs where mobile robots receive Totes entering the system (filled product Totes and empty order Totes) and discharge Totes leaving the system (empty product Totes and filled order Totes) at the spurs.

Figure 3:
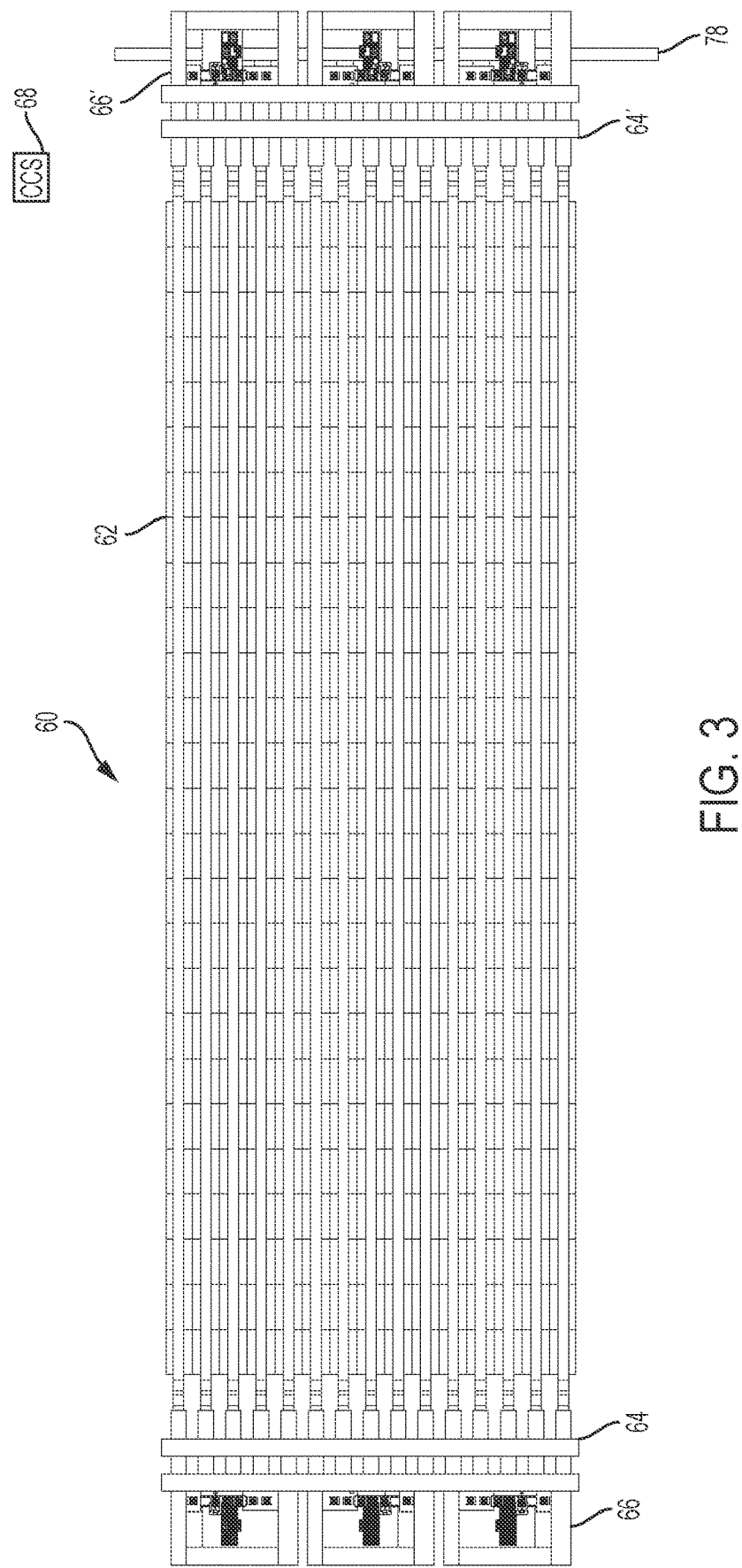
FIG. 3 is a top view of an example order fulfillment system in accordance with aspects of the disclosed embodiment.

Referring now to FIG. 3, there is shown a top view of example order fulfillment system 60. Order fulfillment system 60 is configured using mobile robot towers and may have product Totes and order Totes with mobile robots or vehicles that transfer and transport Totes. Tote storage structure 62 is shown as structural support for stored Totes and also for the mobile robots operating therein and as will be described in greater detail. Mobile robot transit structures 64, 64' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 66, 66' are shown arrayed at multiple elevations where human or robotic pickers remove eaches from product Totes and place them into either order Totes or a mobile robot, depending on the system configuration. Central control system 68 is shown consisting of software, computers, and network equipment, which manages system resources as will be described, for example with respect to FIG. 19. Input/output interface 70 is shown as a conveyor with spurs where mobile robots receive Totes entering the system (filled product Totes and empty order Totes) and discharge Totes leaving the system (empty product Totes and filled order Totes) at the spurs. System 60 may utilize vertical tracks or towers allowing the system I/O 70 to have its own deck.

Figure 4:
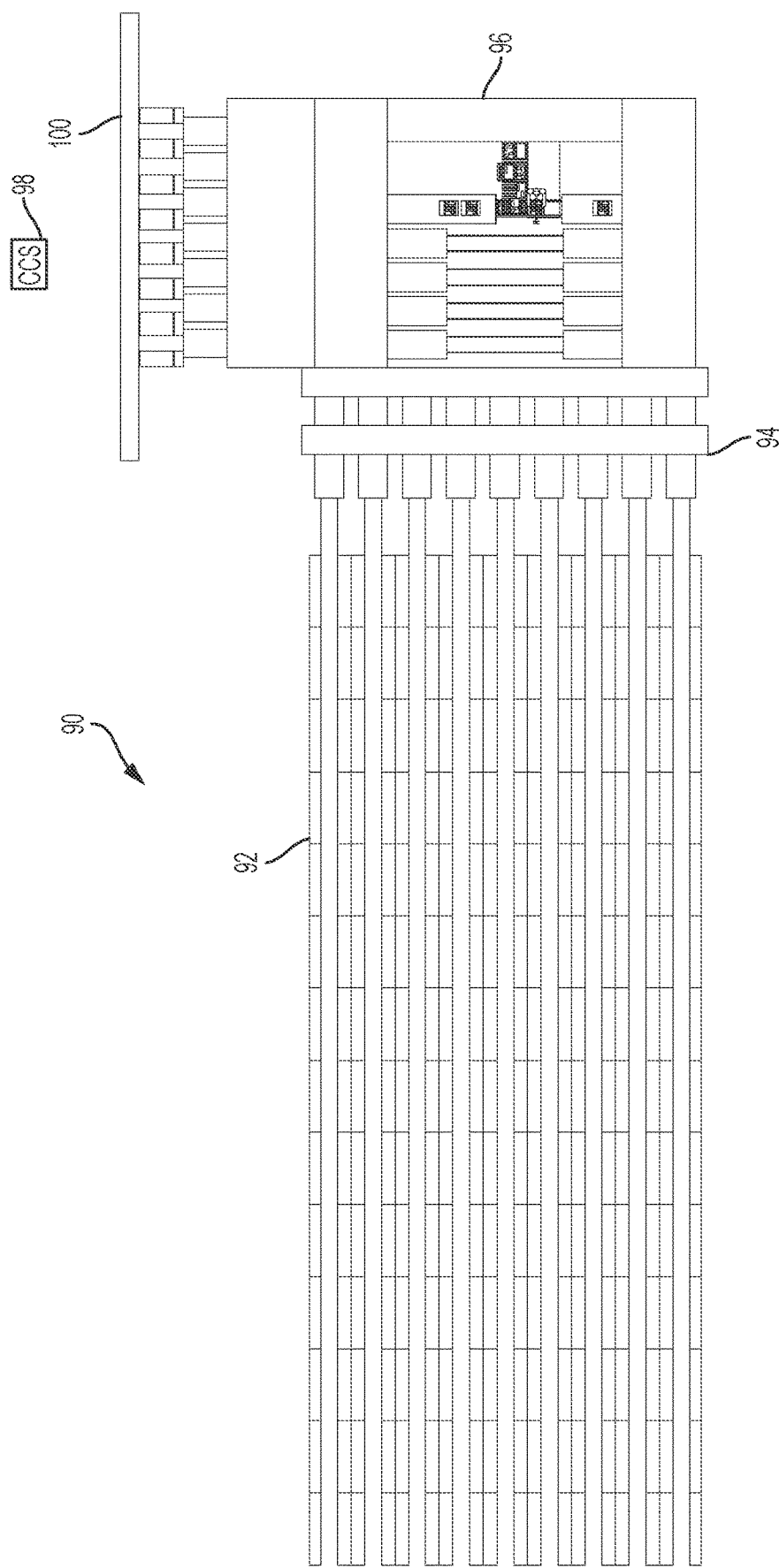
FIG. 4 is a top view of an example order fulfillment system in accordance with aspects of the disclosed embodiment.

Referring now to FIG. 4, there is shown a top view of example order fulfillment system 90. Order fulfillment system 90 may have product Totes and order Totes with mobile robots or vehicles that transfer and transport Totes. Tote storage structure 92 is shown as structural support for stored Totes and also for the mobile robots operating therein and as will be described in greater detail. Mobile robot transit structures 94 are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 96 are shown arrayed at multiple elevations where human or robotic pickers remove eaches from product Totes and place them into either order Totes or a mobile robot, depending on the system configuration. Central control system 98 is shown consisting of software, computers, and network equipment, which manages system resources as will be described, for example with respect to FIG. 19. Input/output interface 100 is shown as a conveyor with spurs where mobile robots receive Totes entering the system (filled product Totes and empty order Totes) and discharge Totes leaving the system (empty product Totes and filled order Totes) at the spurs.

Figure 5:
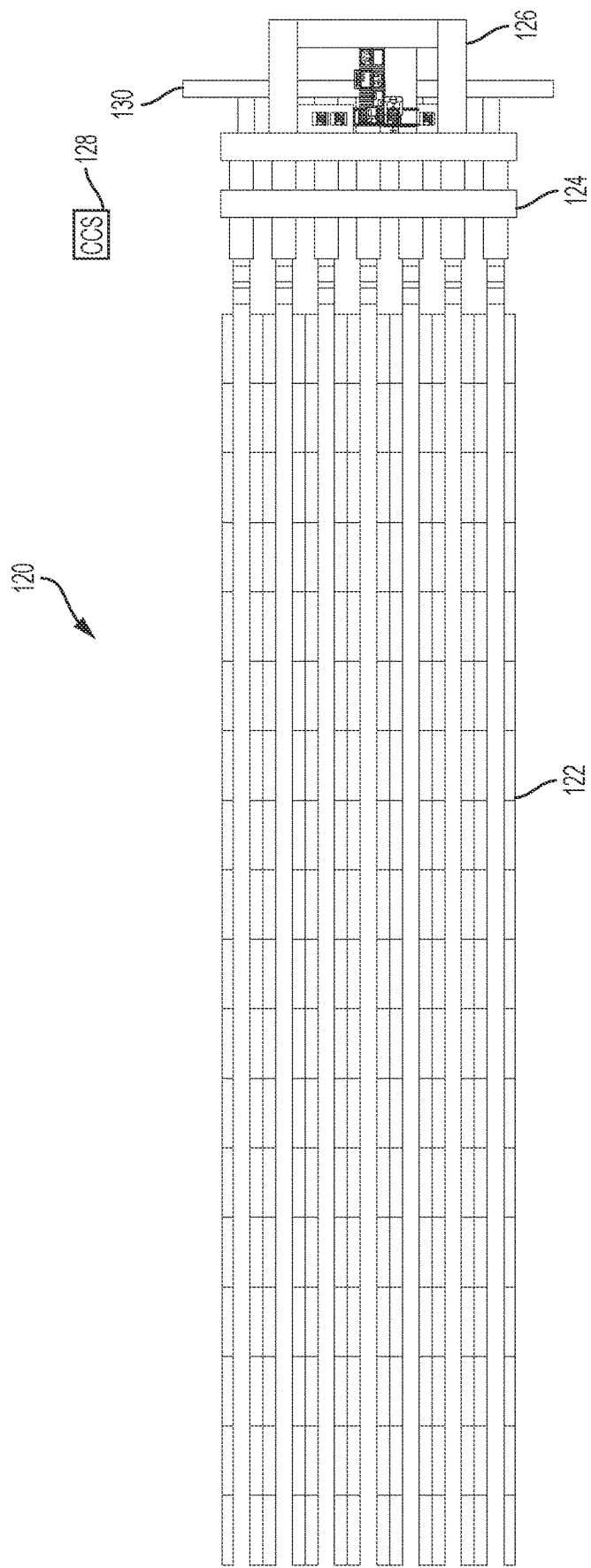
FIG. 5 is a top view of an example order fulfillment system in accordance with aspects of the disclosed embodiment.

Referring now to FIG. 5, there is shown a top view of example order fulfillment system 120. Order fulfillment system 120 may have product Totes and order Totes with mobile robots or vehicles that transfer and transport Totes. Tote storage structure 122 is shown as structural support for stored Totes and also for the mobile robots operating therein and as will be described in greater detail. Mobile robot transit structures 124 are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 126 are shown arrayed at multiple elevations where human or robotic pickers remove eaches from product Totes and place them into either order Totes or a mobile robot, depending on the system configuration. Central control system 128 is shown consisting of software, computers, and network equipment, which manages system resources as will be described, for example with respect to FIG. 19. Input/output interface 130 is shown as a conveyor with spurs where mobile robots receive Totes entering the system (filled product Totes and empty order Totes) and discharge Totes leaving the system (empty product Totes and filled order Totes) at the spurs. System 120 may utilize vertical tracks or towers allowing the system I/O 130 to have its own deck.

Referring now to FIGS. 6A and 6B, there are shown top and side views respectively of example order fulfillment system 150. Order fulfillment system 150 is shown in a single ended bidirectional flow system configuration whereby mobile robots travel bidirectionally within aisles and workstations are configured on a single end. Order fulfillment system 150 may have product Totes and order Totes with mobile robots or vehicles that transfer and transport Totes. Tote storage structure 152 is shown as structural support for stored Totes and also for the mobile robots operating therein and as will be described in greater detail. Mobile robot transit structures 154 are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32 Picking workstations 156 are shown arrayed at multiple elevations where human or robotic pickers remove eaches from product Totes and place them into either order Totes or a mobile robot, depending on the system configuration. Central control system 158 is shown consisting of software, computers, and network equipment, which manages system resources as will be described, for example with respect to FIG. 19. Input/output interface 160 is shown where mobile robots receive Totes entering the system (filled product Totes and empty order Totes) and discharge Totes leaving the system (empty product Totes and filled order Totes). The order fulfillment system 150 may utilize vertical tracks or towers allowing the system I/O 160 to have its own deck. Order fulfillment system 150 may further have order loading structure 162 where order loading structure 162 has features similar to Tote storage structure 152 except where mobile robots may access Totes from both sides of the Tote. Totes travel through the order fulfillment system 150 in a bidirectional 164 manner.

Figure 7A:
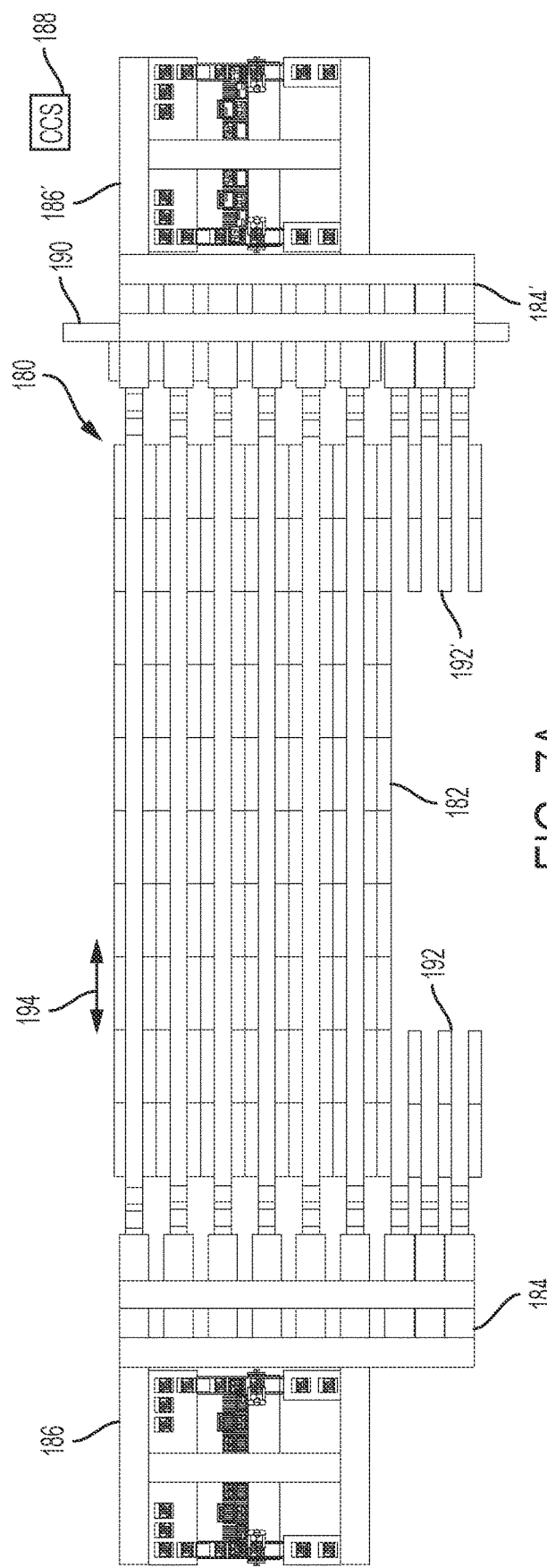
FIG. 7A is a top view of an example order fulfillment system in accordance with aspects of the disclosed embodiment.
Figure 7B:
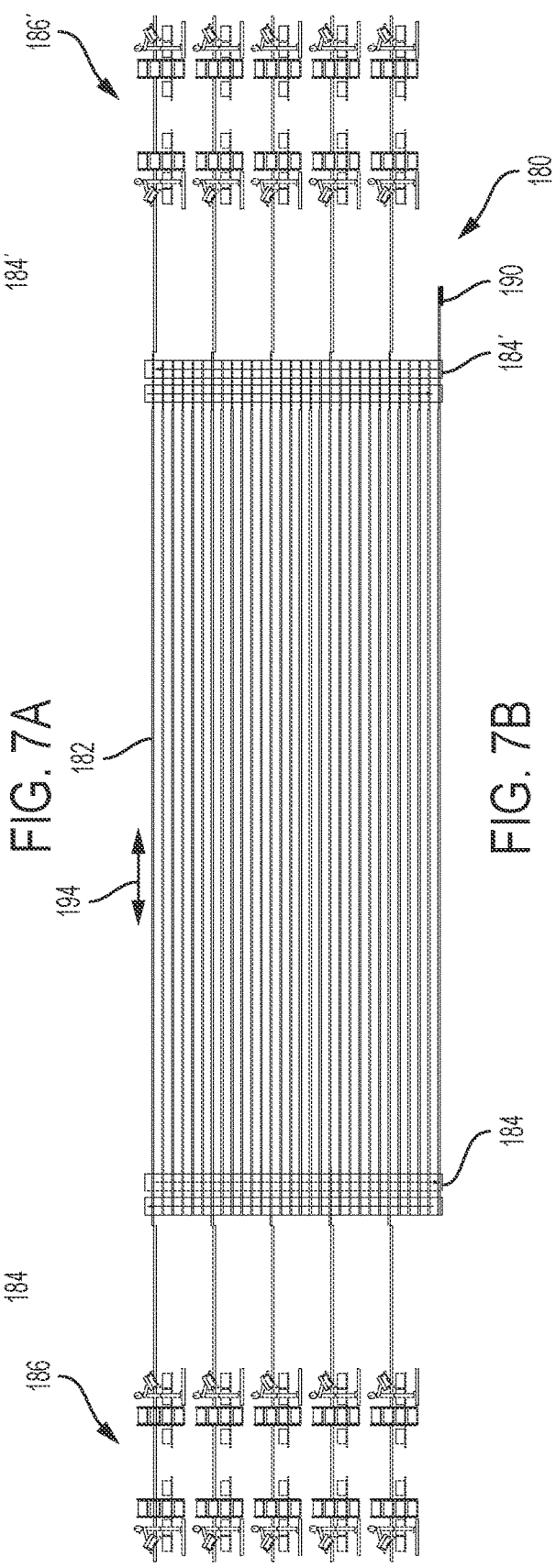
FIG. 7B is a side view of an example order fulfillment system in accordance with aspects of the disclosed embodiment.

Referring now to FIGS. 7A and 7B, there are shown top and side views respectively of example order fulfillment system 180. Order fulfillment system 180 is shown in a double ended bidirectional flow system configuration whereby mobile robots travel bidirectionally within aisles and workstations are configured on both ends. Order fulfillment system 180 may have product Totes and order Totes with mobile robots or vehicles that transfer and transport Totes. Tote storage structure 182 is shown as structural support for stored Totes and also for the mobile robots operating therein and as will be described in greater detail. Mobile robot transit structures 184, 184' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 186, 186' are shown arrayed at multiple elevations where human or robotic pickers remove eaches from product Totes and place them into either order Totes or a mobile robot, depending on the system configuration. Central control system 188 is shown consisting of software, computers, and network equipment, which manages system resources as will be described, for example with respect to FIG. 19. Input/output interface 190 is shown where mobile robots receive Totes entering the system (filled product Totes and empty order Totes) and discharge Totes leaving the system (empty product Totes and filled order Totes). Order fulfillment system 180 may utilize vertical tracks or towers allowing the system I/O 190 to have its own deck. Order fulfillment system 180 may further have order loading structures 192, 192' where order loading structures 192, 192' has features similar to Tote storage structure 182 except where mobile robots may access Totes from both sides of the Tote. Totes travel through order fulfillment system 180 in a bidirectional 194 manner.

Figure 8A:
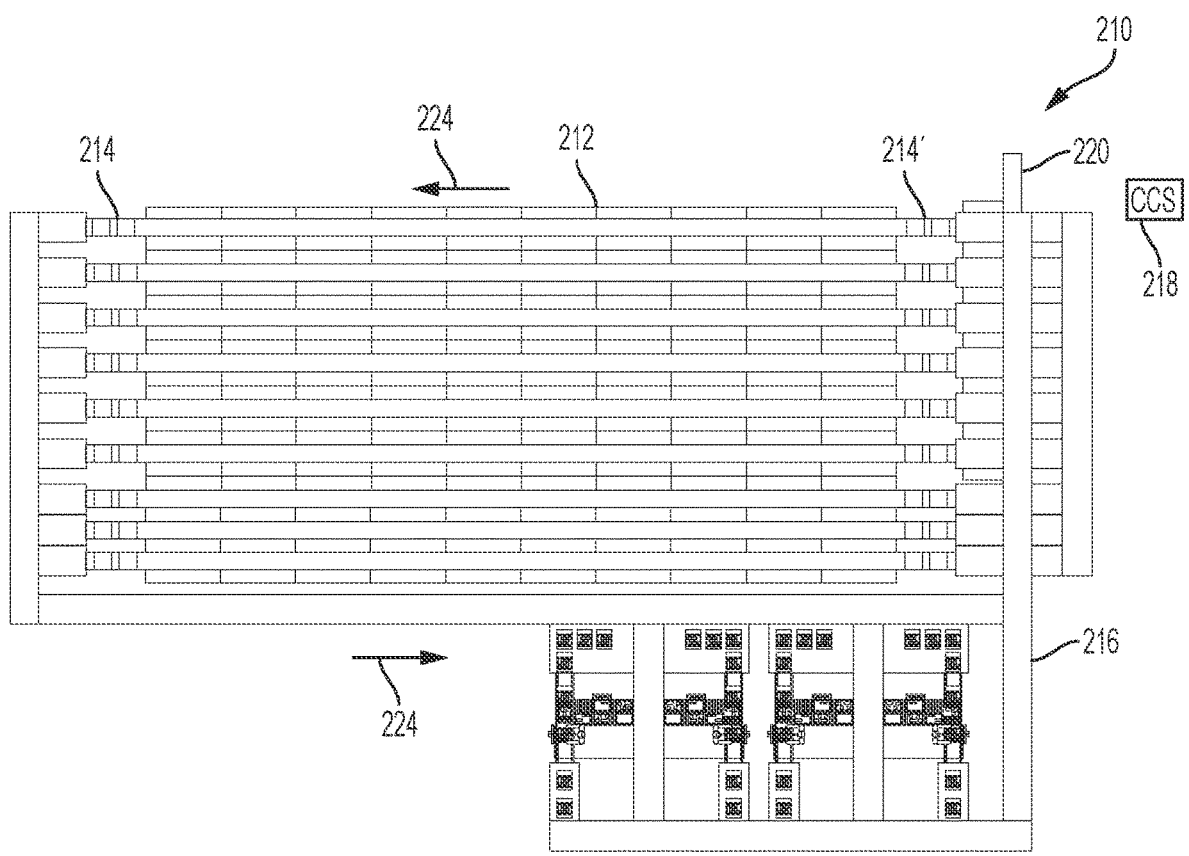
FIG. 8A is a top view of an example order fulfillment system in accordance with aspects of the disclosed embodiment.
Figure 8B:
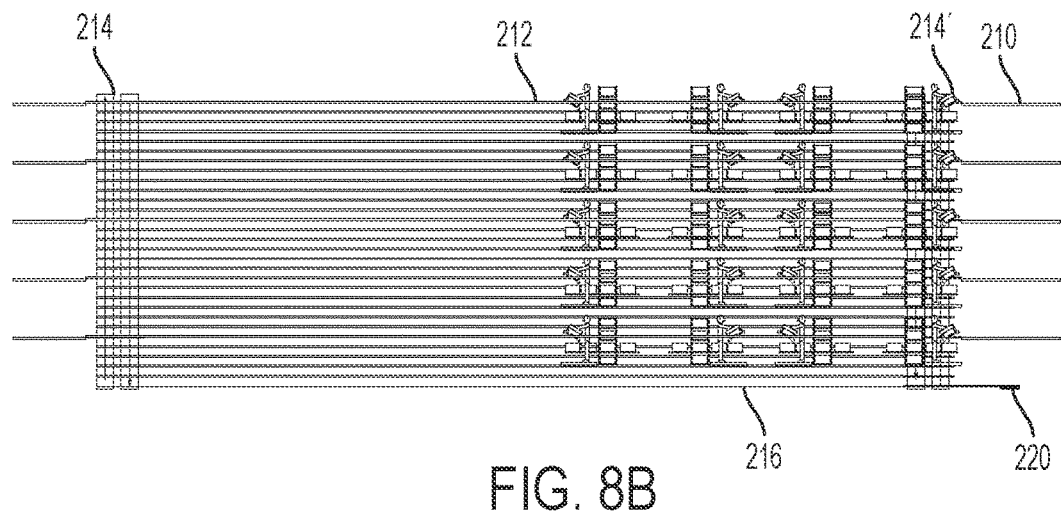
FIG. 8B is a side view of an example order fulfillment system in accordance with aspects of the disclosed embodiment.

Referring now to FIGS. 8A and 8B, there are shown top and side views respectively of example order fulfillment system 210. Order fulfillment system 210 is shown in a double ended unidirectional flow system configuration whereby mobile robots travel unidirectionally within aisles and workstations are configured on the side of system 210 accessible from both ends. Order fulfillment system 210 may have product Totes and order Totes with mobile robots or vehicles that transfer and transport Totes. Tote storage structure 212 is shown as structural support for stored Totes and also for the mobile robots operating therein and as will be described in greater detail. Mobile robot transit structures 214, 214' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 216 are shown arrayed at multiple elevations where human or robotic pickers remove eaches from product Totes and place them into either order Totes or a mobile robot, depending on the system configuration. Central control system 218 is shown consisting of software, computers, and network equipment, which manages system resources as will be described, for example with respect to FIG. 19. Input/output interface 220 is shown where mobile robots receive Totes entering the system (filled product Totes and empty order Totes) and discharge Totes leaving the system (empty product Totes and filled order Totes). System 210 may utilize vertical tracks or towers allowing the system I/O 220 to have its own deck. Totes travel through system 210 in a unidirectional 224 manner.

Figure 9:
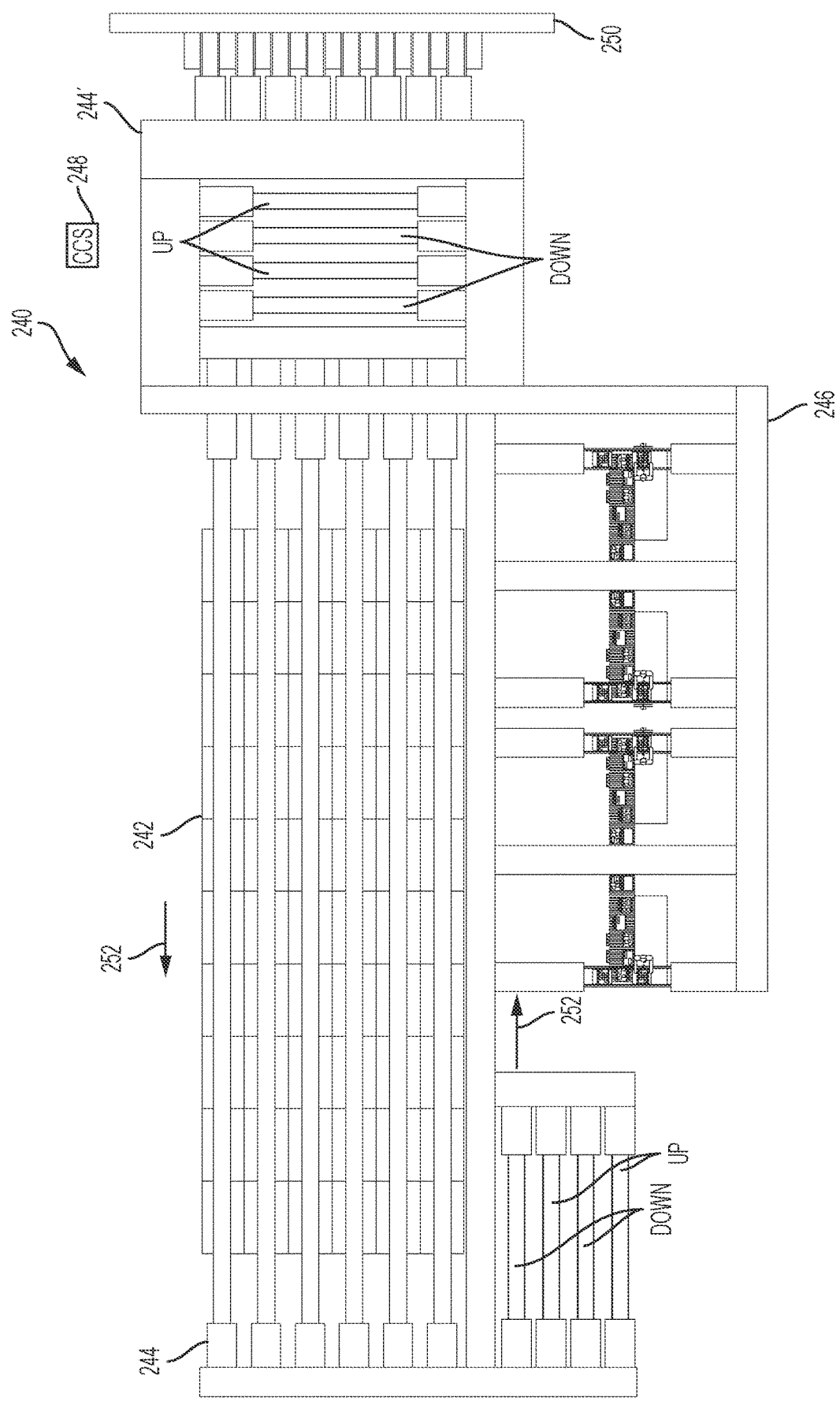
FIG. 9 is a top view of an example order fulfillment system in accordance with aspects of the disclosed embodiment.

Referring now to FIG. 9, there is shown a top view of example order fulfillment system 240. Order fulfillment system 240 is shown in a direct put, double ended unidirectional flow system configuration whereby mobile robots travel unidirectionally within aisles and workstations are configured on the side of system 240 as direct put workstations accessible from both ends. Order fulfillment system 240 may have product Totes and order Totes with mobile robots or vehicles that transfer and transport Totes. Tote storage structure 242 is shown as structural support for stored Totes and also for the mobile robots operating therein and as will be described in greater detail. Mobile robot transit structures 244, 244' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 246 are shown arrayed at multiple elevations where human or robotic pickers remove eaches from product Totes and place them into either order Totes or a mobile robot, depending on the system configuration. Central control system 248 is shown consisting of software, computers, and network equipment, which manages system resources as will be described, for example with respect to FIG. 19. Input/output interface 250 is shown where mobile robots receive Totes entering the system (filled product Totes and empty order Totes) and discharge Totes leaving the system (empty product Totes and filled order Totes). Totes travel through system 240 in a unidirectional 252 manner.

Referring now to FIGS. 10A and 10B, there are shown top and side views respectively of example order fulfillment system 270. Order fulfillment system 270 is shown in a direct put, single ended bidirectional flow system configuration whereby mobile robots travel bidirectionally within aisles and workstations are configured on the end of system 270 as direct put workstations accessible from one end. Order fulfillment system 270 may have product Totes and order Totes with mobile robots or vehicles that transfer and transport Totes. Tote storage structure 272 is shown as structural support for stored Totes and also for the mobile robots operating therein and as will be described in greater detail. Mobile robot transit structures 274 are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 276 are shown arrayed at multiple elevations where human or robotic pickers remove eaches from product Totes and place them into either order Totes or a mobile robot, depending on the system configuration. Central control system 278 is shown consisting of software, computers, and network equipment, which manages system resources as will be described, for example with respect to FIG. 19. Input/output interface 280 is shown where mobile robots receive Totes entering the system (filled product Totes and empty order Totes) and discharge Totes leaving the system (empty product Totes and filled order Totes). Totes travel through system 270 in a bidirectional 282 manner.

Figure 11:
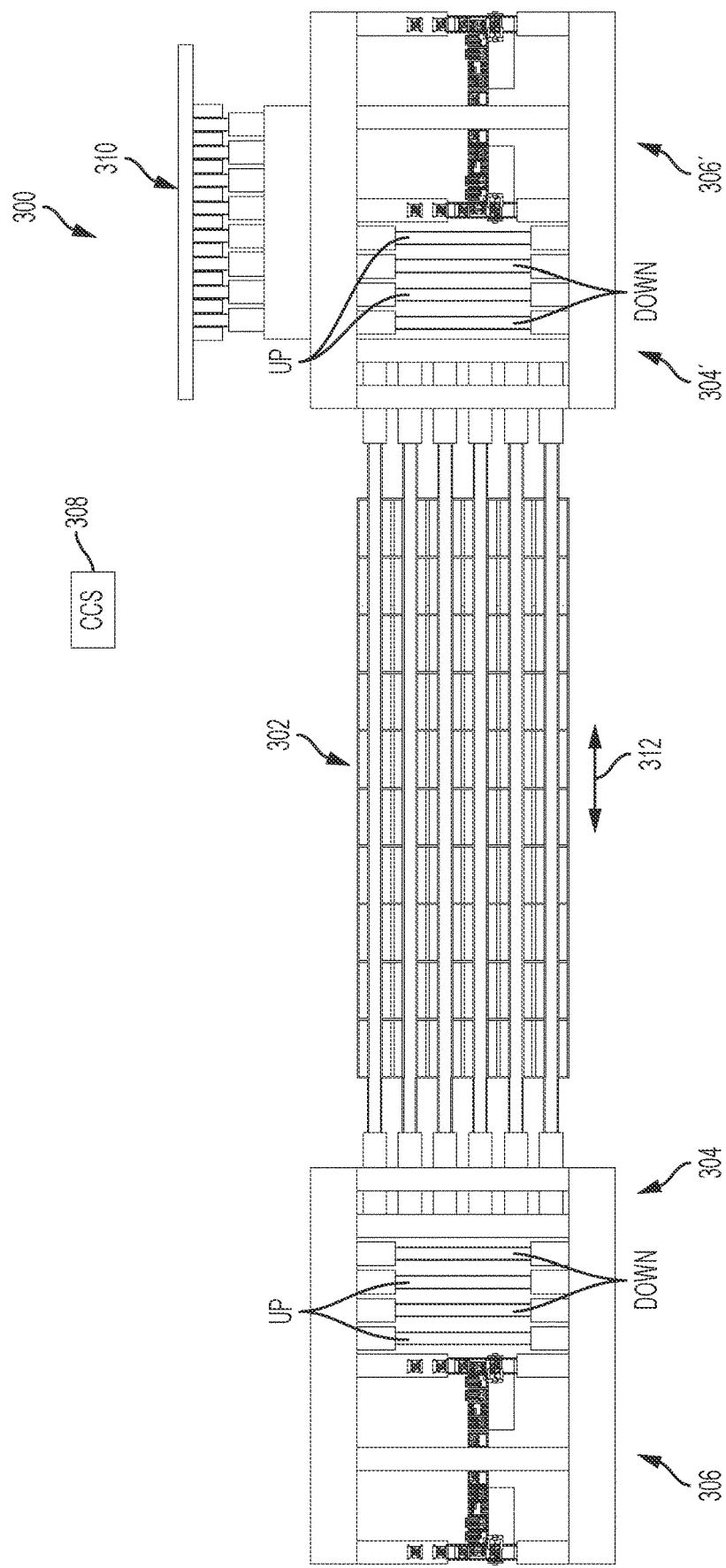
FIG. 11 is a top view of an example order fulfillment system in accordance with aspects of the disclosed embodiment.

Referring now to FIG. 11, there is shown a top view of example order fulfillment system 300. Order fulfillment system 300 is shown in a direct put, double ended bidirectional flow system configuration whereby mobile robots travel bidirectionally within aisles and workstations are configured on both ends of system 300 as direct put workstations accessible from both ends. Order fulfillment system 300 may have product Totes and order Totes with mobile robots or vehicles that transfer and transport Totes. Tote storage structure 302 is shown as structural support for stored Totes and also for the mobile robots operating therein and as will be described in greater detail. Mobile robot transit structures 304, 304' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 306, 306' are shown arrayed at multiple elevations where human or robotic pickers remove eaches from product Totes and place them into either order Totes or a mobile robot, depending on the system configuration. Central control system 308 is shown consisting of software, computers, and network equipment, which manages system resources as will be described, for example with respect to FIG. 19. Input/output interface 310 is shown where mobile robots receive Totes entering the system (filled product Totes and empty order Totes) and discharge Totes leaving the system (empty product Totes and filled order Totes). Totes travel through system 300 in a bidirectional 312 manner.

Figure 12:
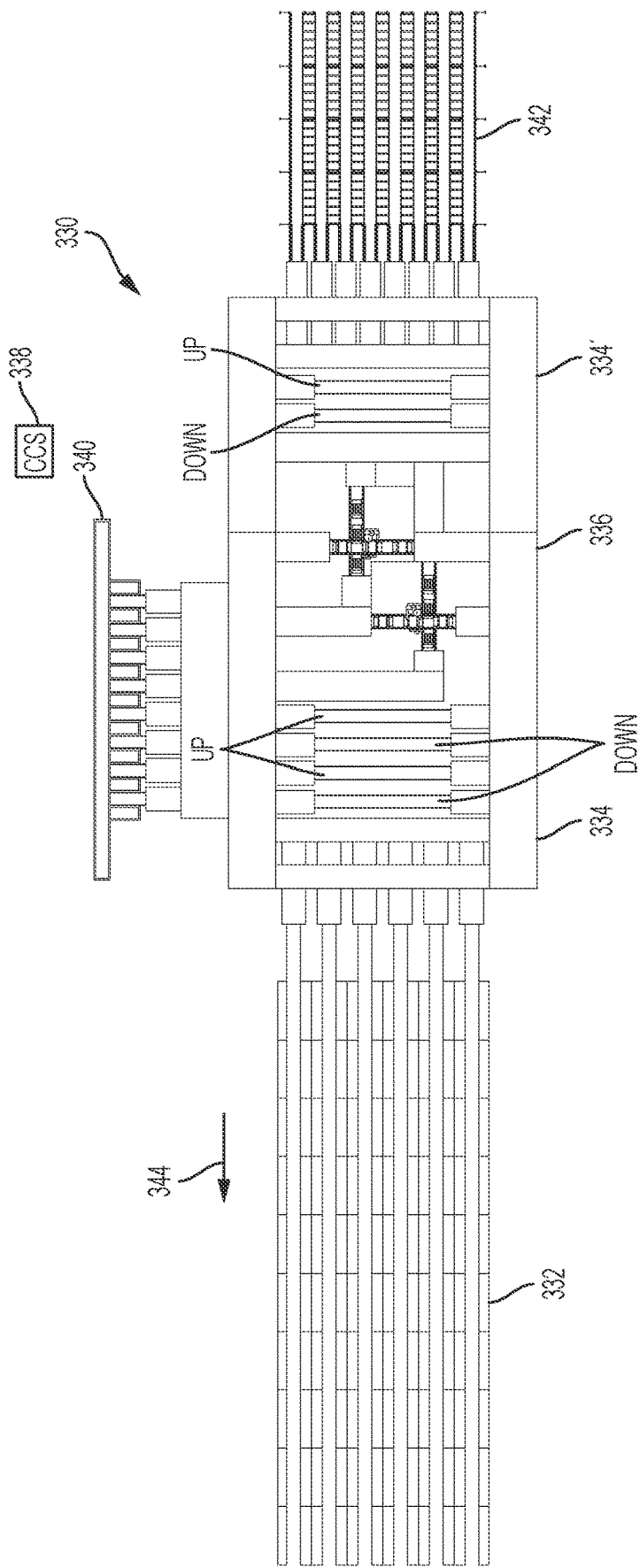
FIG. 12 is a top view of an example order fulfillment system in accordance with aspects of the disclosed embodiment.

Referring now to FIG. 12, there is shown a top view of example order fulfillment system 330. Order fulfillment system 330 is shown in an indirect put, single ended bidirectional flow system configuration whereby mobile robots travel bidirectionally within aisles and workstations are configured on one end of system 330 as indirect put workstations accessible from the middle. Order fulfillment system 330 may have product Totes and order Totes with mobile robots or vehicles that transfer and transport Totes. Tote storage structure 332 is shown as structural support for stored Totes and also for the mobile robots operating therein and as will be described in greater detail. Mobile robot transit structures 334, 334' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 336 are shown arrayed at multiple elevations where human or robotic pickers remove eaches from product Totes and place them into either order Totes or a mobile robot, depending on the system configuration. Central control system 338 is shown consisting of software, computers, and network equipment, which manages system resources as will be described, for example with respect to FIG. 19. Input/output interface 340 is shown where mobile robots receive Totes entering the system (filled product Totes and empty order Totes) and discharge Totes leaving the system (empty product Totes and filled order Totes). Order fulfillment system 330 may further have order loading structures 342 where order loading structures 342 has features similar to Tote storage structure 332 except where mobile robots may access Totes from both sides of the Tote. Totes travel through system 330 in a bidirectional 344 manner.

Figure 13:
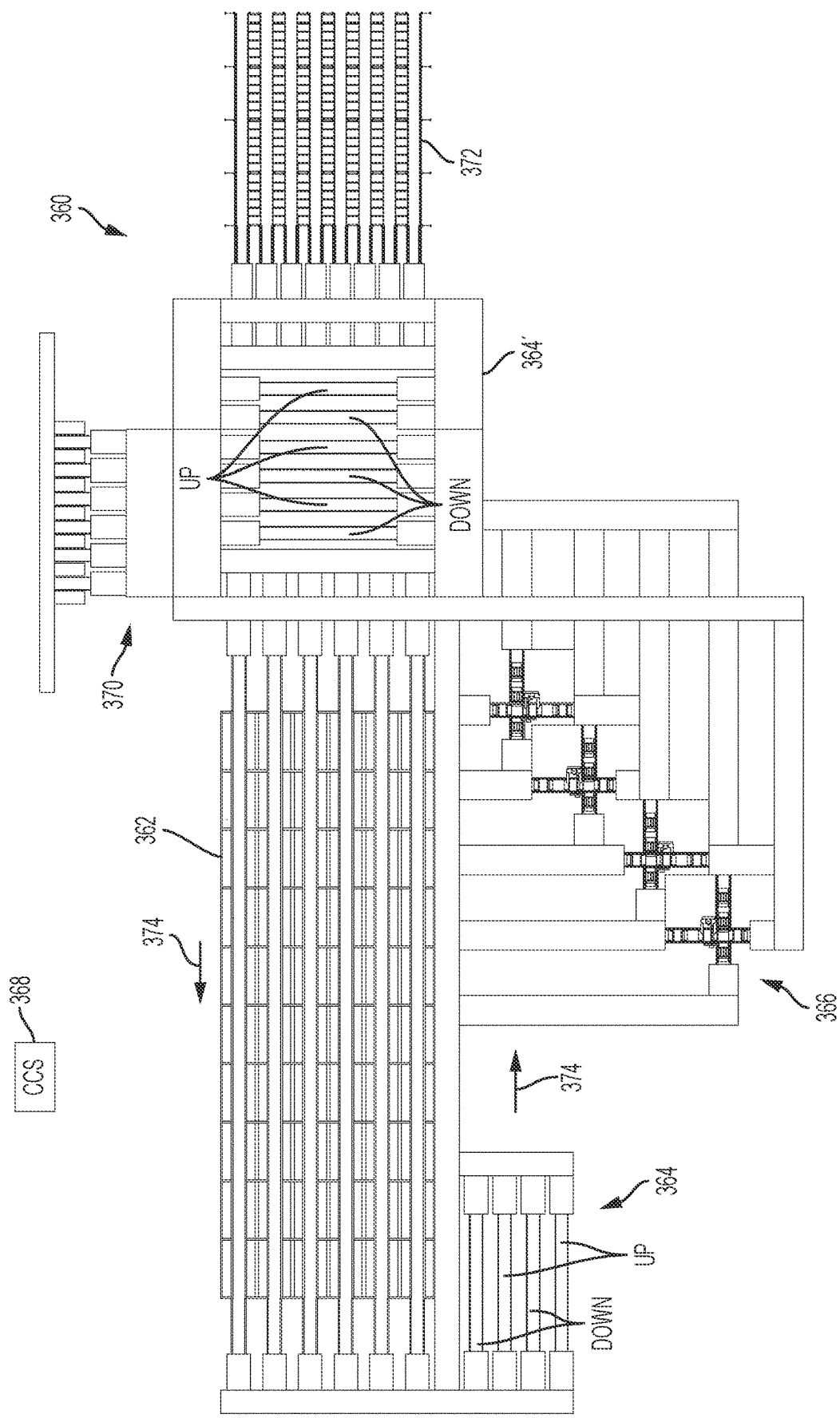
FIG. 13 is a top view of an example order fulfillment system in accordance with aspects of the disclosed embodiment.

Referring now to FIG. 13, there is shown a top view of example order fulfillment system 360. Order fulfillment system 360 is shown in an indirect put, double ended unidirectional flow system configuration whereby mobile robots travel unidirectionally within aisles and workstations are configured on one side of system 360 as indirect put workstations accessible from the middle. Order fulfillment system 360 may have product Totes and order Totes with mobile robots or vehicles that transfer and transport Totes. Tote storage structure 362 is shown as structural support for stored Totes and also for the mobile robots operating therein and as will be described in greater detail. Mobile robot transit structures 364, 364' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Picking workstations 366 are shown arrayed at multiple elevations where human or robotic pickers remove eaches from product Totes and place them into either order Totes or a mobile robot, depending on the system configuration. Central control system 368 is shown consisting of software, computers, and network equipment, which manages system resources as will be described, for example with respect to FIG. 19. Input/output interface 370, 370' is shown where mobile robots receive Totes entering the system (filled product Totes and empty order Totes) and discharge Totes leaving the system (empty product Totes and filled order Totes). Order fulfillment system 360 may further have order loading structures 372 where order loading structures 372 has features similar to Tote storage structure 362 except where mobile robots may access Totes from both sides of the Tote. Totes travel through system 360 in a unidirectional 374 manner.

Figure 14:
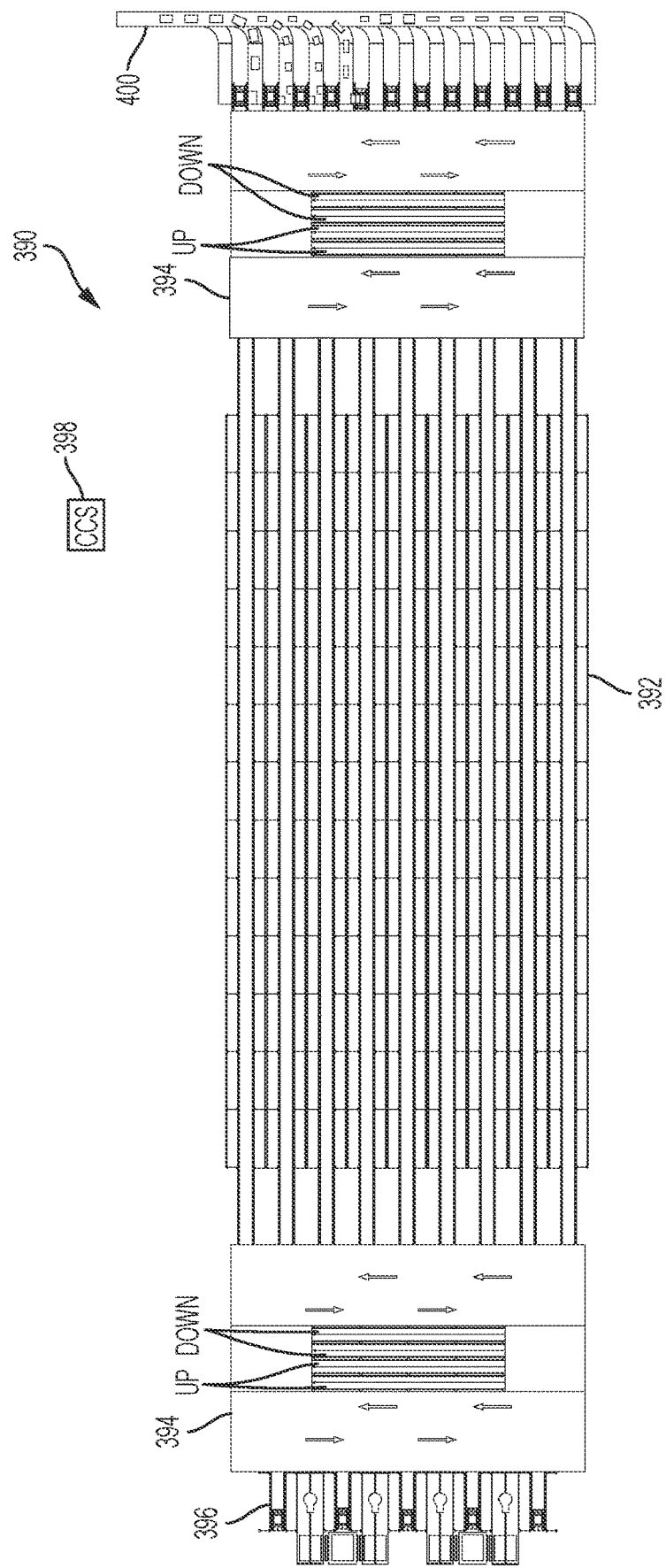
FIG. 14 is a top view of an example order fulfillment system in accordance with aspects of the disclosed embodiment.

Referring now to FIG. 14, there is shown a top view of example order fulfillment system 390. Order fulfillment system 390 is shown in an exemplary case picking configuration. Order fulfillment system 390 may have cases with mobile robots or vehicles that transfer and transport cases into storage and then from storage to palletizing workstations 396. Case storage structure 392 is shown as structural support for stored cases and also for the mobile robots operating therein and as will be described in greater detail. Mobile robot transit structures 394, 394' are shown whereby mobile robots travel in three dimensions: horizontally on planar transit decks that interconnect the rack structure and workstations; and vertically on vertical tracks or ramps that interconnect storage lanes and workstations at multiple elevations, and without the requirement of a vertical lift or vertical conveyor provided by the multi-level tote storage structure 32. Palletizing workstations 396 are shown arrayed at multiple elevations where human or robotic pickers remove cases (after being placed by mobile robots) from shelves and place them on pallets which subsequently may be wrapped and exit via conveyor or otherwise. Central control system 398 is shown consisting of software, computers, and network equipment, which manages system resources as will be described, for example with respect to FIG. 19. Input interface 400 is shown where mobile robots receive cases entering the system via conveyor where the mobile robots may transport one or more cases to the case storage structure 392.

Figure 15:
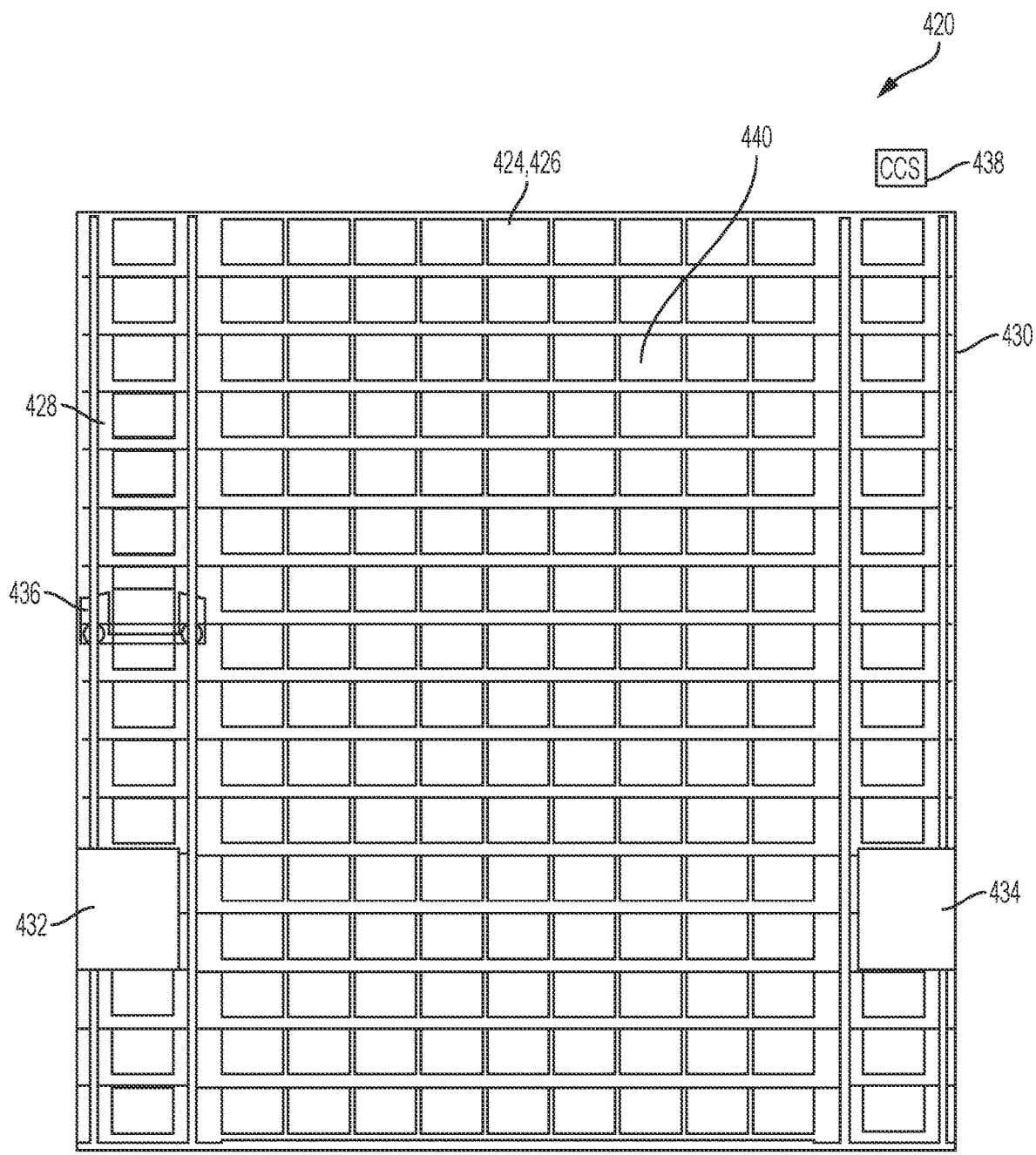
FIG. 15 is a side view of an example order fulfillment system in accordance with aspects of the disclosed embodiment.
Figure 16A:
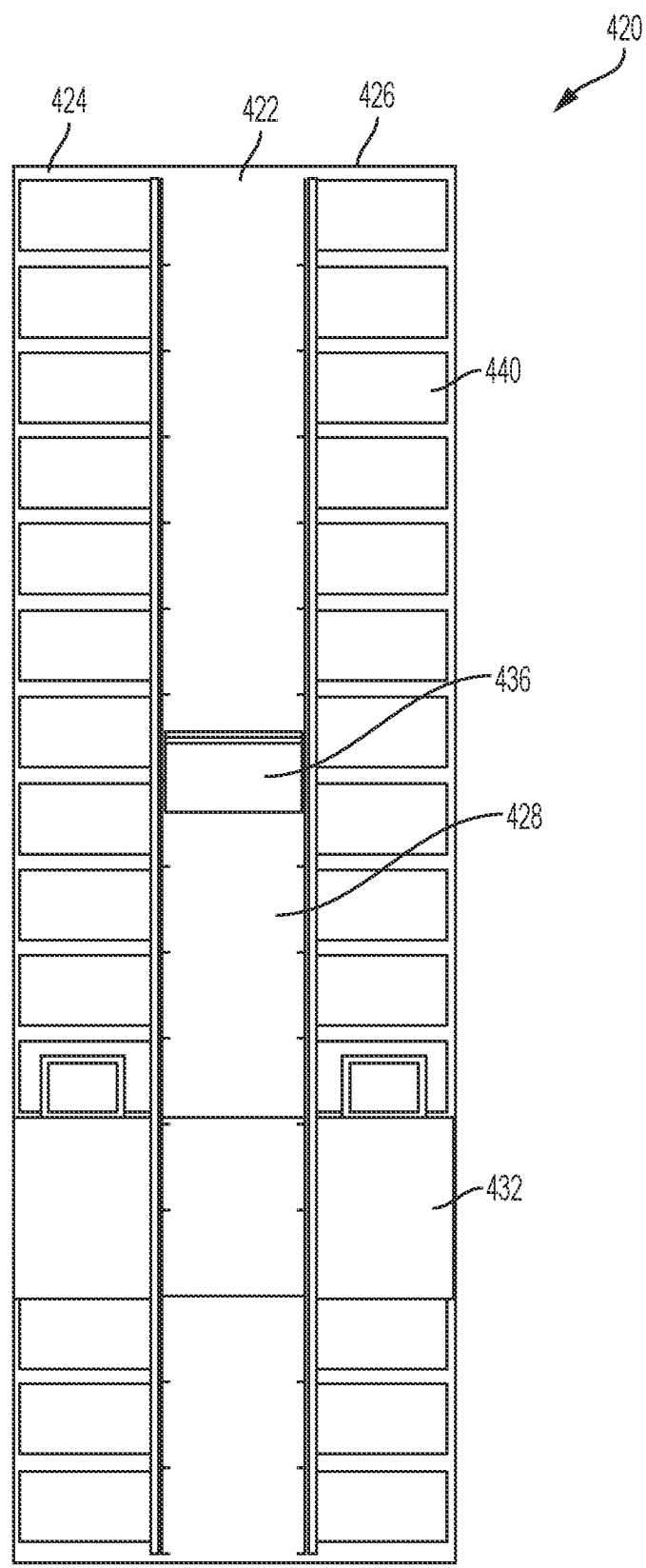
FIG. 16A is a front view of an example order fulfillment system in accordance with aspects of the disclosed embodiment.
Figure 16B:
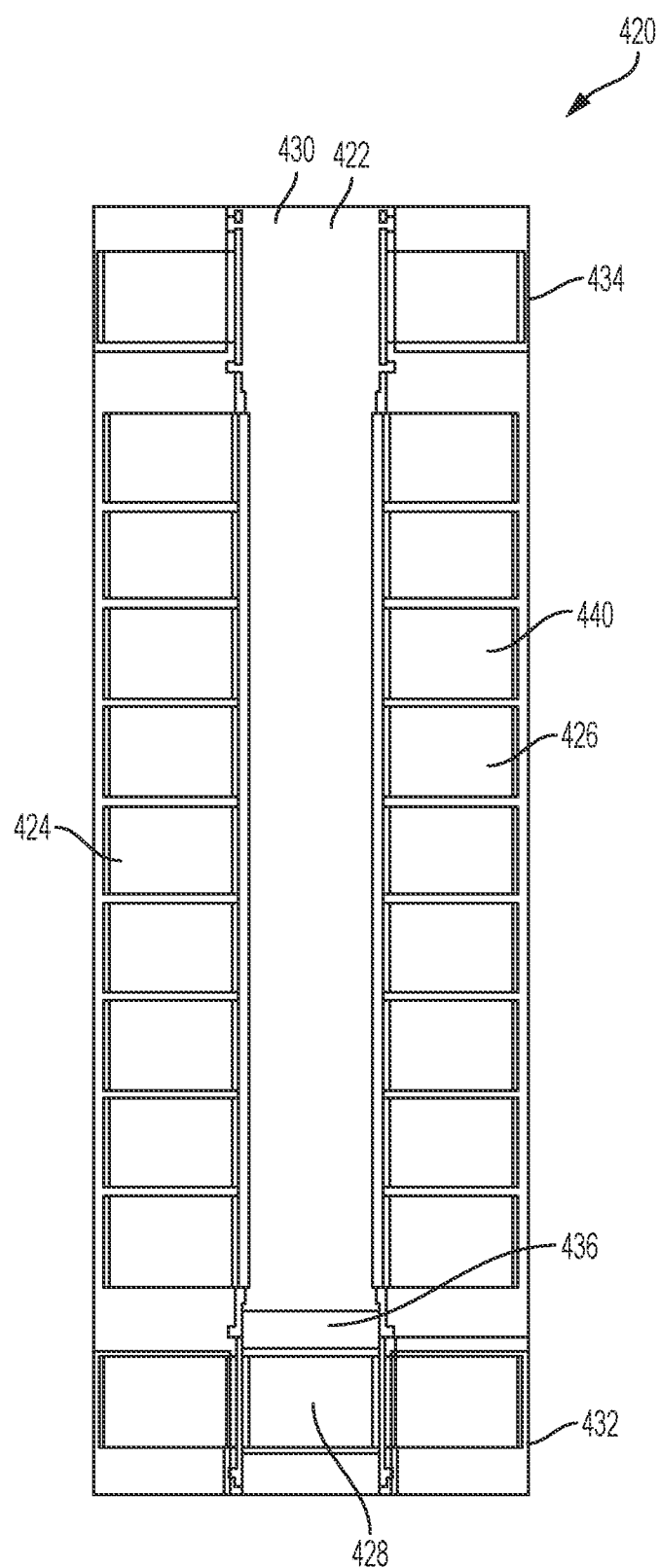
FIG. 16B is a top view of an example order fulfillment system in accordance with aspects of the disclosed embodiment.
Figure 17:
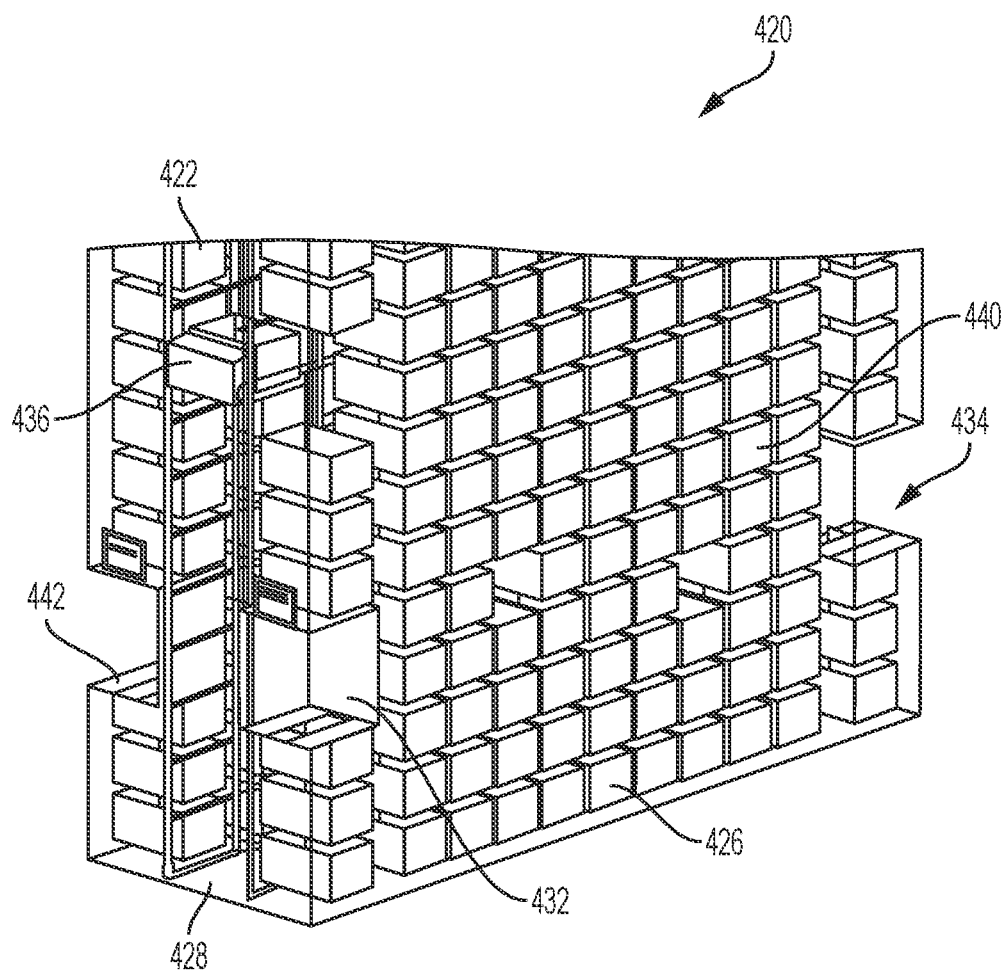
FIG. 17 is a partial isometric view of an example order fulfillment system in accordance with aspects of the disclosed embodiment.
Figure 18:
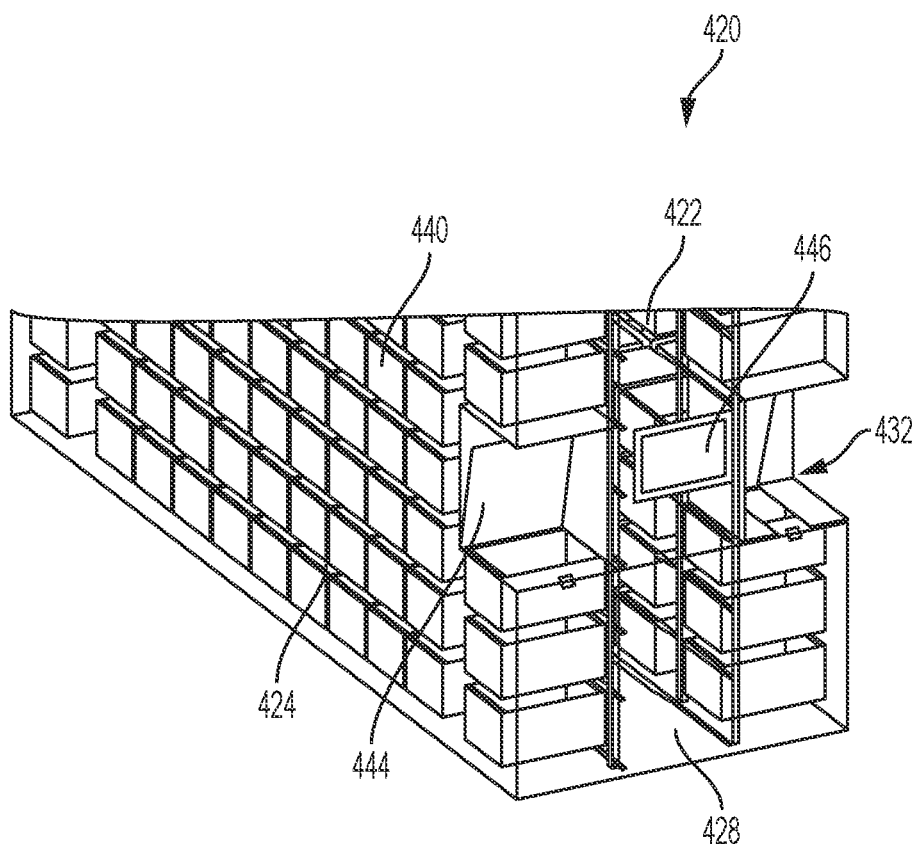
FIG. 18 is a partial isometric view of an example order fulfillment system in accordance with aspects of the disclosed embodiment.

Referring now to FIGS. 15 and 16A-B, there are shown side, front and top views respectively of example order fulfillment system configured in a vending configuration. Referring also to FIGS. 17 and 18, there are shown partial isometric views respectively of the example order fulfillment system. Here, the order fulfillment system may be described as an order vending machine 420 or "OVM" or otherwise. The order vending machine 420 shows an alternate, for example, scaled down version of the robotic vehicle and rack system, for example, that may be utilized in store vending of delivered goods or any other suitable application. For example, the vehicle technology may be used in e-commerce as applied to the "last-mile" delivery problem. For example, "Pure-play" e-commerce companies have little choice but to deliver the vast majority of orders to customers' homes, which may be costly. Retailers who both operate self-service stores and sell online can offer customers the choice of picking orders up at store locations, commonly called "click-and-collect", but in practice this model places an additional and unpredictable workload on store personnel that may result in extended wait times by customers, etc. Here, the order vending machine 420 provides an automated solution that requires a very little floor space (or land) but can securely hold a large number of orders, and also provides convenient on-demand access and short transaction times to customers. Here, the order vending machine 420 may be a robotic vehicle based "micro-warehouse" that may be referred to as an Order Vending Machine (OVM) that operates in conjunction with an e-commerce fulfillment center, for example one equipped with a robotic vehicle based system. In one aspect, Order-Totes ("O-Totes") containing customer orders may be delivered to and stored within the OVM, and then presented on demand to customers, with robotic vehicles performing all required Tote-storage and retrieval functions. Here, FIGS. 15-18 show an embodiment of an order vending machine 420 system, which comprises a single aisle 422 with two opposing multi-level storage modules 424, 426, a Bot-Tower 428, 430 at one or, alternately, both ends of the aisle, an I/O Interface 432, 434 on each Bot-Tower, at least one robotic vehicle 436 (or T-Bot/Tote Bot), and a Controller 438 with wired connections to the I/O Interface 432, 434 and wireless communication to the T-Bots. T-Bots use the vertical towers to access any storage level and horizontal Bot-track within the aisle to access any Tote position on a given level. Totes 440 can also be stored adjacent to each Bot-Tower, except for three consecutive Tote-positions on one side of the tower that are used for the Input/Output interface, where Totes are received and removed during deliveries and also where customer receive their orders contained in the Totes. An OVM can operate with only a single T-Bot. Alternately, more than one may be provided, for example, a second robotic vehicle (or more) may be effective, for example, throughput is increased during the processing of deliveries, thereby minimizing dwell time for both truck and driver, and customer-service levels are improved by the reduction in order-pickup transaction times pickup and by the ability to service two customers concurrently. Similarly, an OVM can operate with a single Bot-Tower at one end of the aisle, but configuring a tower at each end of the aisle may be effective as it provides two I/O interfaces, allowing concurrent service to two customers (or one customer concurrently with delivery processing).

The I/O interface consists of a shelf 442 that holds a single Tote, a moveable Access Panel 444, and a Human/Machine Interface (HMI), such as a touch-screen display 446. Both the Access Panel and the HMI are connected to and controlled by the Controller. The Access Panel is selectively movable between a closed position, which blocks all access, and two or more open positions. A full-open position allows the Tote on the shelf to be removed entirely or an external Tote to be placed onto the shelf; this position is used during delivery transactions. The other open positions provide a customer with reach-in access to the contents of a Tote corresponding to that customer's individual order, as Totes will typically contain multiple orders. FIG. 17 shows Output Ports with Sliding Shutters whereas FIG. 18 shows alternate Output Ports with Hinged Covers, for example, covers that have one or more solenoids to lock shut (shown in front). Alternately, the covers also may be held open by passive magnet when a shopper is retrieving goods. Additionally, the covers may have a damper so they do not slam shut. In one aspect, the two I/O Ports could be useful in also configuring them differently. Perhaps the left side is divided in ¼ and the right side is full access. Depending on the Tote, they may be directed to the portioned or full access side. Alternately, any suitable combination may be used.

Operation of the system generally involves two types of transactions: Tote-removal/insertion transactions and order-pickup transactions. Removal/insertion transactions occur during the processing of a delivery, when an operator arrives with fresh Totes to be placed into storage in the OVM. The operator brings the inbound Totes to an I/O Interface and interacts with the HMI to cause the Controller to open the access panel to the full-open position and to initiate removal/insertion transactions by the T-Bots in the system. On each removal/insertion transaction, a T-Bot retrieves an outbound (typically empty) Tote from storage, transports it to the I/O Interface, and places it on the Shelf, whereupon the operator removes it. The operator then may place an inbound Tote onto the Shelf, which the T-Bot transports into storage. Removal/Insertion transactions continue until there are no more outbound or inbound Totes to be removed or inserted, respectively. The operator then leaves with the removed outbound Totes, which are returned to the fulfillment center and subsequently reused to contain future orders.

When a customer arrives at the OVM to pick up an order, he/she interacts with the HMI at an I/O Interface to validate his/her identity, whereupon the Controller initiates one or more order-pickup transactions performed by the T-Bots. Each such transaction begins with a T-Bot retrieving from storage a Tote containing items ordered by that customer, transporting the Tote to the I/O Interface, and placing it on the Shelf Upon the arrival of an O-Tote on the shelf, the Controller operates the Access Panel to create an opening immediately above the customer's ordered item(s), whereupon the customer removes the item(s) from the Tote. Once all items have been so removed, the Controller closes the Access Panel and instructs the T-Bot to return the Tote to storage.

While this description is focused on the transfer of e-commerce orders to customers, it can readily be seen that the same system can be used generically to implement a very large-scale product-vending machine, which might contain an assortment of SKUs equal to what is found today in a small convenience store. In this application, the Totes would be product-Totes rather than order-Totes, and the customer interaction with the HMI would involve ordering items contained in the P-Totes, rather than picking up products ordered delivered from a remote fulfillment center; that is, the customer's order is fulfilled on the spot at the OVM. For that matter, the same OVM can perform both functions at once.

To illustrate the space efficiency of the OVM, the specific embodiment shown may be roughly 2 meters in width and 6 meters in both length and height, so it has a footprint of 12 square meters. Here, the embodiment may have a maximum storage capacity of 340 Totes. Since multiple orders or SKUs can be contained in each O-Tote or P-Tote respectively, and even allowing for empty Tote positions necessary for efficient operation, this OVM may store between 500 and 2,000 customer orders and/or SKUs.

Figure 19:
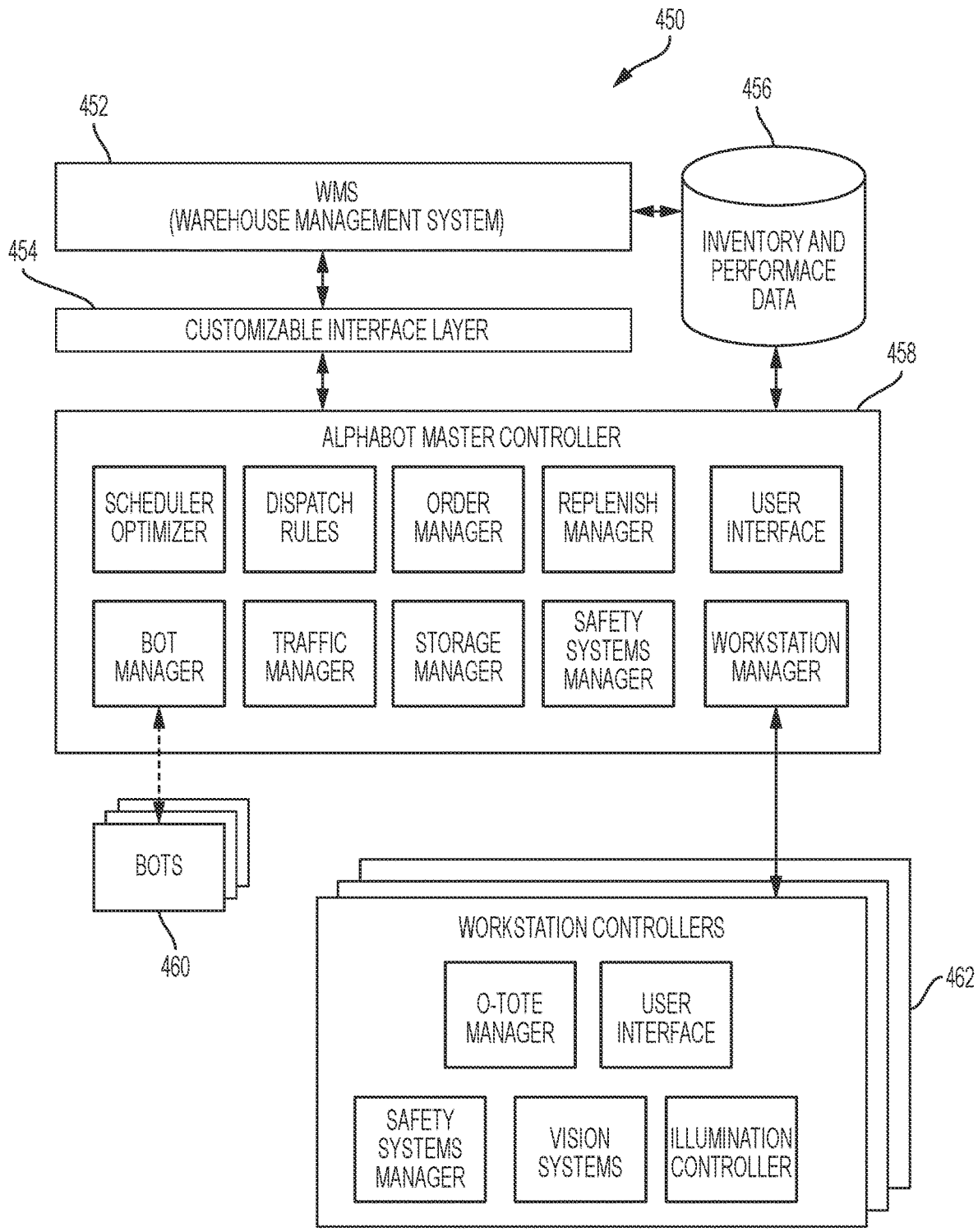
FIG. 19 is a schematic diagram of a control system in accordance with aspects of the disclosed embodiment.

Referring now to FIG. 19, there is shown a schematic diagram of control system 450. Control system 450 may have warehouse management system 452, customizable interface layer 454, inventory and performance data repository 456, robot/vehicle master controller 458, robot vehicle on board controller 460 and workstation controllers 462. Additional modules may be provided to control additional equipment, for example, additional material handling modules, robotics, safety or otherwise. Control system 450 may further be configured with more or less modules or sub modules. Robot/vehicle master controller 458 may have modules such as a schedule optimizer, dispatch rules, order management, replenishment manager, UI, robot manager, traffic manager, storage manager, safety systems manager, and workstation manager. Workstation controllers 462 may have modules such as a Tote or order Tote manager, UI, safety systems manager, vision system and illumination controller. In alternate aspects, more or less modules may be provided. An example embodiment may comprise a non-transitory program storage device (such as memory 456 for example) readable by a machine, tangibly embodying a program of instructions executable by the machine for performing operations, the operations comprising controlling, at least partially, an order fulfillment system.

The order fulfillment systems as described share, at least in part, common components and subsystems that may be configured in any suitable combination or sub combination alone or in combination with other components and subsystems. The order fulfillment systems may include multi-level rack structures for storage of inventory (or "picking stock"), generally configured to maximize space utilization by using all available cubic volume from floor to ceiling for shelving modules that hold products in storage separated by aisles whereby robots access product-storage locations, and subdivided horizontally into a plurality of "tiers", each tier comprising a plurality of storage levels. The order fulfillment systems may further include mobile robots ("Bots"), autonomous or semi-autonomous vehicles that are free-roaming, i.e. have complete access to all portions of the system, and perform various transfer and transport functions depending on embodiment, for example the movement of containers of products between storage locations within the rack structure and workstations. The bots can be considered autonomous or semi-autonomous in that in the illustrative embodiments they can receive control commands and they have sufficient computing hardware to store the command and then carry out several processes autonomously to execute the command (wherein the command can be, e.g., pick up each X and deliver it to destination Y, which would then require the bot to autonomously determine the steps necessary to execute the command). As described herein, the order fulfillment system includes a central control system, which has control over the bots as well. As such, the mobile robots are not required to be completely autonomous in identifying what they need to do and how they need to go about doing it. There is some degree of governance of the bots provided by the central control system. Whether specific governance tasks are carried out by the bots or by the central control system will vary depending on the particular implementation of the order fulfillment system, as would be appreciated by those of skill in the art. The order fulfillment systems may further include Bot-transit structures whereby Bots travel in three dimensions: horizontally on planar transit-decks interconnecting the rack structure, workstations and I/O interfaces on a given tier; and vertically on verticals or diagonal ramps that interconnect either storage levels within a tier (Aisle Ramps) or tiers (Transit-Ramps), and without the requirement of a vertical lift or vertical conveyor provided by the multi-level tote storage structure. The order fulfillment systems may further include workstations at which humans or robots transfer picked eaches or cases either directly into order containers or to intermediate robots which then transfer to order containers, depending on the embodiment. The order fulfillment systems may further include input output interfaces whereby product is inducted into the system to replenish the picking stock (input) and picked orders are discharged from the system to be delivered eventually to customers (output). The order fulfillment systems may further include a centralized control system, comprising computers, software, and communications components, which manages the operation of the entire system. Accordingly, all suitable combinations in whole or in part may be provided.

In the context of the exemplary order fulfillment systems and suitable combinations of their subcomponents and systems, various operational scenarios and the subsystems will now be described in greater detail.

The order-fulfillment technology described may be primarily for use in retail supply chains to fill orders for individual item units ("eaches"), for example orders placed by smaller self-service stores to replenish inventory (e.g. drug, convenience or otherwise); or orders placed by end-users (direct-to-consumer). Alternately or in combination, the order-fulfillment technology described may be applied to case-picking, for example, filling orders for cases of product placed by self-service retail stores to replenish their inventory, uses goods-to-palletizer process.

These orders may be filled in a "goods-to-picker" process that uses free-roaming mobile robots, operating within a closed, structured, three-dimensional environment, to perform all movement of containers of products, including: 1) Receiving incoming product-containers and placing into storage in a rack structure to replenish picking stock, retrieving said containers from storage as required to fill orders, transporting those containers to picking workstations where human or robotic pickers remove eaches, then returning the containers to storage, and finally discharging empty containers from the system to be refilled for another cycle of use, and 2) Receiving incoming empty order-containers, placing them into position to receive ordered eaches to be held pending customer delivery, placing filled order-containers into storage as necessary, and discharging said filled order-containers from system for delivery to customers. The mobile robots may have fully random and autonomous access directly all locations within the system's operating environment, including all storage locations, all workstations, and all receiving and shipping locations, by virtue of having self-contained ability to move in all three dimensions within that environment, i.e. two horizontal dimensions as well as the vertical dimension. Two alternatives are disclosed, the difference between them being related to the process used in transferring eaches from product containers to order containers: 1) In the Direct-Put embodiment, picked eaches are transferred directly from a product container into an order container, which is the process model commonly practiced in the field; and 2) in the Indirect-Put embodiment, picked eaches are transferred not directly into product containers but into intermediate robots that then transport them to and transfer them into the assigned order-containers.

Direct Put System

In a direct-put system, eaches are transferred directly from Product-Totes to Order-Totes. This process may minimize the number of each-transfers and so minimizes the capital investment required for a given application. Compared to the Indirect-Put embodiment described below, it has several differences. The first difference is workstation specificity, i.e. once an O-Tote designated to receive order-lines from a given customer order is assigned to a given workstation, the picking of eaches to fill those order-lines can only be performed at that specific workstation, which may lead to delays by robots interfering with each other while trying to get to their assigned destinations. The second difference is related to the first and the use of multi-order workstations where a number of O-Totes are processed concurrently, which extends order-completion latency for a give O-Tote, i.e. the time it spends at the Picking Workstation, since it shares the each-picking resource with all the other concurrent O-Totes.

The direct put system may have eight elements or subsystems. Product Totes ("P-Totes") are containers of the picking stock of eaches used to fulfill orders. Order Totes ("O-Totes") are containers of eaches that have been picked to fulfill specific orders. Mobile robots are robots that transfer and transport Totes ("T-Bots"). Bot tasks are typically round-trip transactions consisting of two segments, the first segment being the removal of a Tote from storage in the TSS and transport to a destination, and the second segment being the return of a Tote from that same destination back to storage in the TSS, so bots almost always are traveling with a Tote payload onboard. A T-Bot handling a P-Tote is referred to as a P-Bot, while a T-Bot handling an O-Tote is referred to as an O-Bot; a given T-Bot can switch roles on a transaction-by-transaction basis, e.g. perform as a P-Bot on one transaction and then immediately perform as an O-Bot on the very next transaction. A Tote-Storage Structure ("TSS") provides the structural support for stored Totes (both P-Totes and O-Totes) and also for the Bots operating therein, generally configured to maximize space utilization by using all available cubic volume from floor to ceiling for shelving modules that hold Totes in storage separated by aisles that provide robots access to Tote-storage locations. Bot-Transit Structures ("BTS") allow Bots to travel in three dimensions: horizontally on planar Transit Decks that interconnect the rack structure and workstations; and vertically on Vertical Tracks that interconnect storage lanes and workstations at multiple elevations. Alternately, the Bot-Transit Structure ("BTS") may comprise Aisle-Ramp modules, Transit-Ramps, and Transit Decks. Picking Workstations are arrayed at multiple elevations where human or robotic pickers remove eaches from P-Totes and place them into either O-Totes or a robot, depending on embodiment. A Central Control System ("CCS") consists of software, computers, and network equipment, which manages system resources (including all of the various robots), orchestrates the entire order-fulfillment process and all related processes, and provides status and control interfaces to human operators of the system and to external systems. One or more Input/Output ("I/O") Interface at which T-Bots receive Totes entering the system (filled P-Totes and empty O-Totes) and discharge Totes leaving the system (empty P-Totes and filled O-Totes).

Operating Processes, Controlled Directly or Indirectly by the CCS

P-Totes flow to picking workstations whereby T-Bots retrieve P-Totes containing ordered products from storage in the TSS, transport P-Totes to specified Picking Workstations based on location of specific target order-Totes, and then return P-Totes to storage in the TSS. Typically P-Totes are returned to storage in the TSS even if the last remaining each has been picked and the Tote is empty.

O-Totes flow to and from picking workstations whereby O-Bots deliver empty O-Totes to workstations to be filled with eaches ordered by customers and also remove filled O-Totes from workstations; the removal of a filled O-Tote and the delivery of an empty O-Tote typically occur on the same round-trip transaction. Typically the O-Bot first removes an empty O-Tote from storage in the TSS, transports that Tote to the I/O Interface for discharge, immediately picks up a filled O-Tote and departs the workstation. Filled O-Totes are typically then transport to storage locations in the TSS pending delivery to customers, though they can alternatively be taken directly to the I/O Interface for immediate delivery.

Pick and put at workstations occurs where P-Bots present P-Totes to human or robotic pickers, who remove one or more eaches from every P-Tote and place in designated O-Totes (described in more detail below).

Order shipment & O-Tote induction occurs whereby T-Bots remove from storage in the TSS (or alternatively directly from Picking Workstations) filled O-Totes that are to be discharged from the system for delivery to customers and transport them to the I/O Interface. Here, empty O-Totes are inducted into the system through the I/O interface and are typically transported by T-Bot to a storage location in the TSS, where it will remain pending transport to a Picking Workstation, though they can opportunistically (and more efficiently) be transported directly to a workstation if needed immediately.

Picking-stock replenishment and P-Tote recycling occurs whereby T-Bots receive incoming filled P-Totes at the I/O Interface and transport them into storage in the TSS (or occasionally directly to a Picking Workstation). T-Bots also remove empty P-Totes from storage in the TSS and deliver them to the I/O Interface to be discharged from the system for refilling.

Direct Put System Components

P-Totes and O-Totes

P-Totes and O-Totes preferably are dimensionally identical so that any T-Bot can handle either with a fixed-width Tote-transfer mechanism, and therefore perform the roles of both P-Bots and O-Bots. For example, both Totes can have a length of 600 mm, width of 400 mm and height of 300 mm, a widely-used standard size, with height being application dependent based on the most efficient volume for specific product assortments and typical order sizes. P-Totes can be subdivided into multiple compartments, each of which can contain a different SKU, in which case the Tote is referred to as a "multi-SKU" P-Tote ("SKU" being an acronym for "stock-keeping unit", meaning a unique product). Similarly, O-Totes can be subdivided into multiple compartments or can contain multiple separate shipping containers, in which case the Tote is referred to as a "multi-order" O-Tote.

Tote Storage Structure ("TSS")

The Tote Storage Structure is a storage system for holding Totes, comprising a plurality of steel rack modules separated by aisles. Rack modules use frame assemblies as vertical columns, to which attach the horizontal beams that support Totes in storage. Shape of aisle-facing beams includes a horizontal extension from bottom of beam that provide running surface for Bot wheels, hence called "Bot Beams". Design of shelf depends on method Bots use to transfer Totes: i) If Bots lift Totes, two beams are the only support required, and Totes will be stored only one-deep (two Totes between adjacent aisles); ii) If Bots slide Totes across shelf, Tote-support between beams is needed, e.g. wire fabric; compared to a lifting transfer, Bots are less expensive but storage rack is more expensive; however, sliding transfer makes double-deep (or greater) Tote-storage possible (four or more Totes between adjacent aisles), which increases storage density and reduces building costs compared to single-deep storage;

The Tote Storage Structure may be subdivided horizontally to form "Tiers"— groups of interconnected storage levels. The number of Tiers is a throughput factor because the greater the number of Tiers the more Bots can operate within the system without excessive congestion. Each tier subdivision within an aisle creates a single "Storage Zone", with a floor provided whereby maintenance technicians can enter that zone to resolve any problems; the single zone must be shut down to all Bot activity during such maintenance visits, but the rest of the system can continue to operate.

Bot Transit Structures ("BTS")

The Bot Transit Structure may have transit decks that are planar structures that serve as roadways whereby Bots can move in two horizontal dimensions between TSS aisles and Picking Workstations. Decks may be typically constructed of plywood panels on a steel support frame. Transit Decks are located at multiple elevations vertically, specifically at every workstation Level.

BTS—Vertical Alternative

Figure 41A:
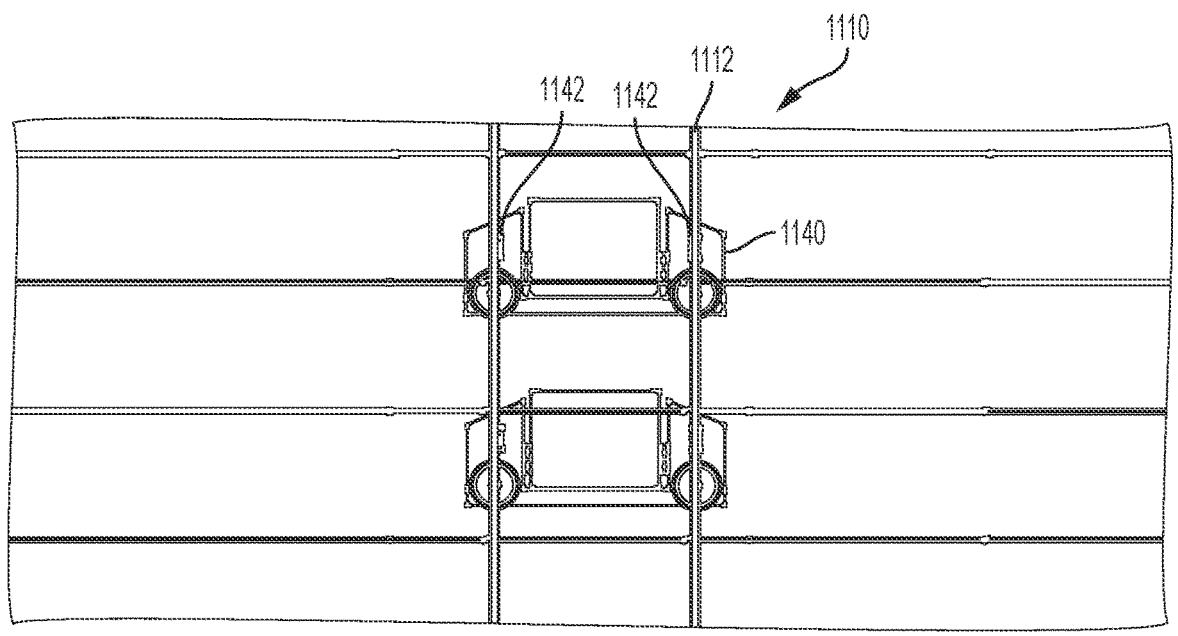
FIG. 41A is a side view of vehicles with a vertical ramp in accordance with aspects of the disclosed embodiment.
Figure 41B:
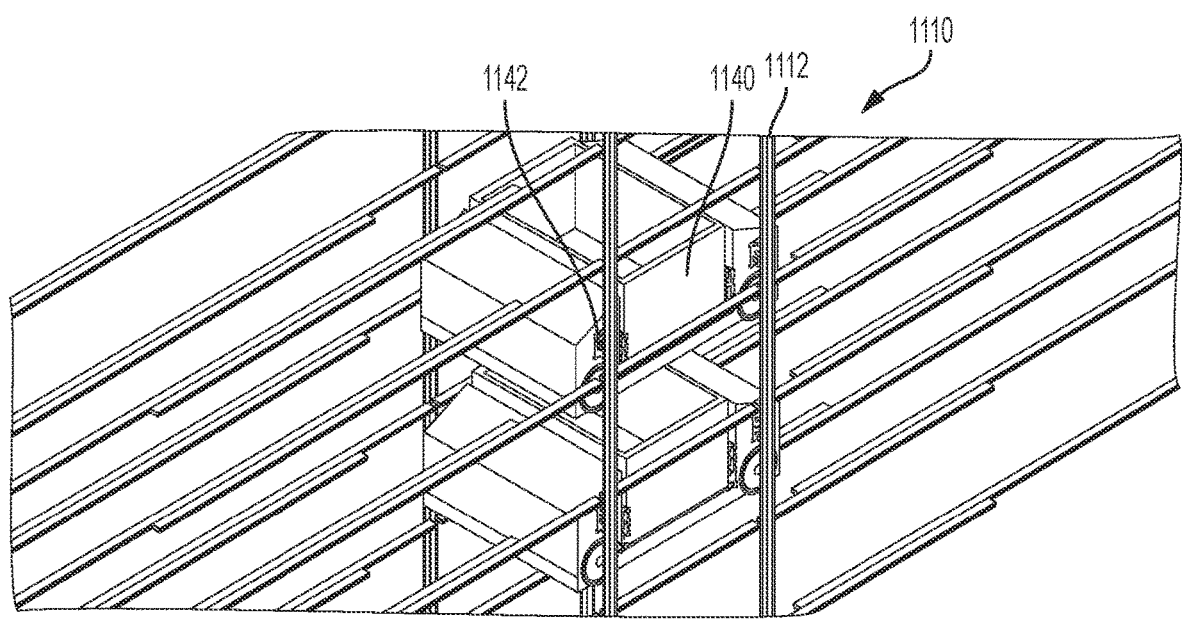
FIG. 41B is an isometric view of vehicles with a vertical ramp in accordance with aspects of the disclosed embodiment.
Figure 42A:
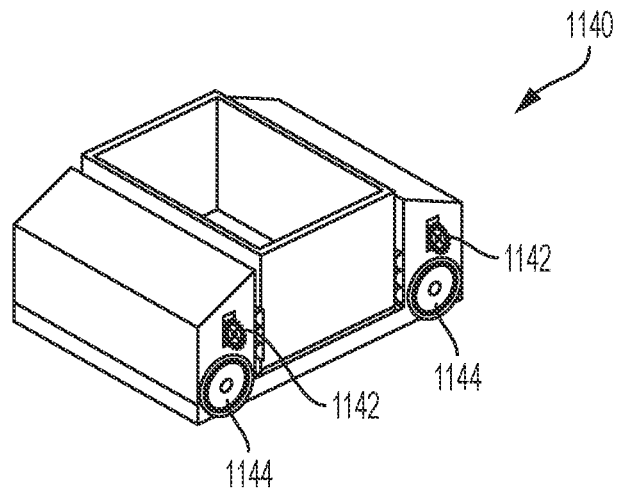
FIG. 42A is an isometric view of a vehicle in accordance with aspects of the disclosed embodiment.
Figure 42B:
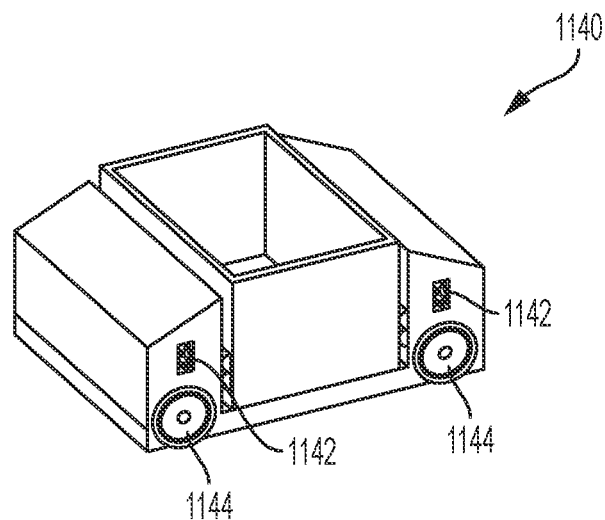
FIG. 42B is an isometric view of a vehicle in accordance with aspects of the disclosed embodiment.
Figure 43A:
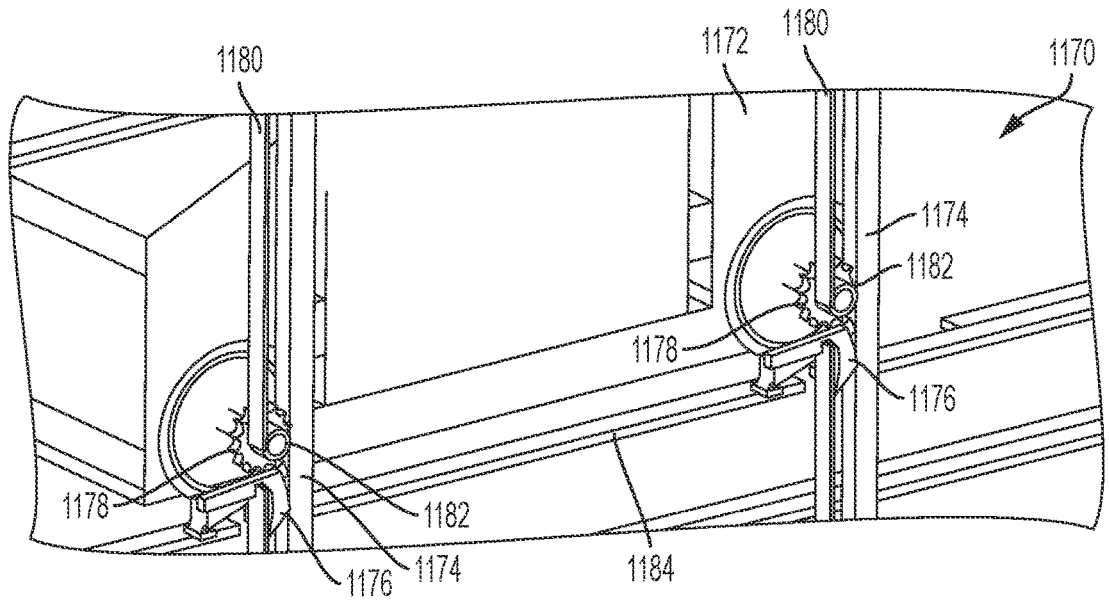
FIG. 43A is an isometric view of a vehicle with a vertical ramp in accordance with aspects of the disclosed embodiment.
Figure 43B:
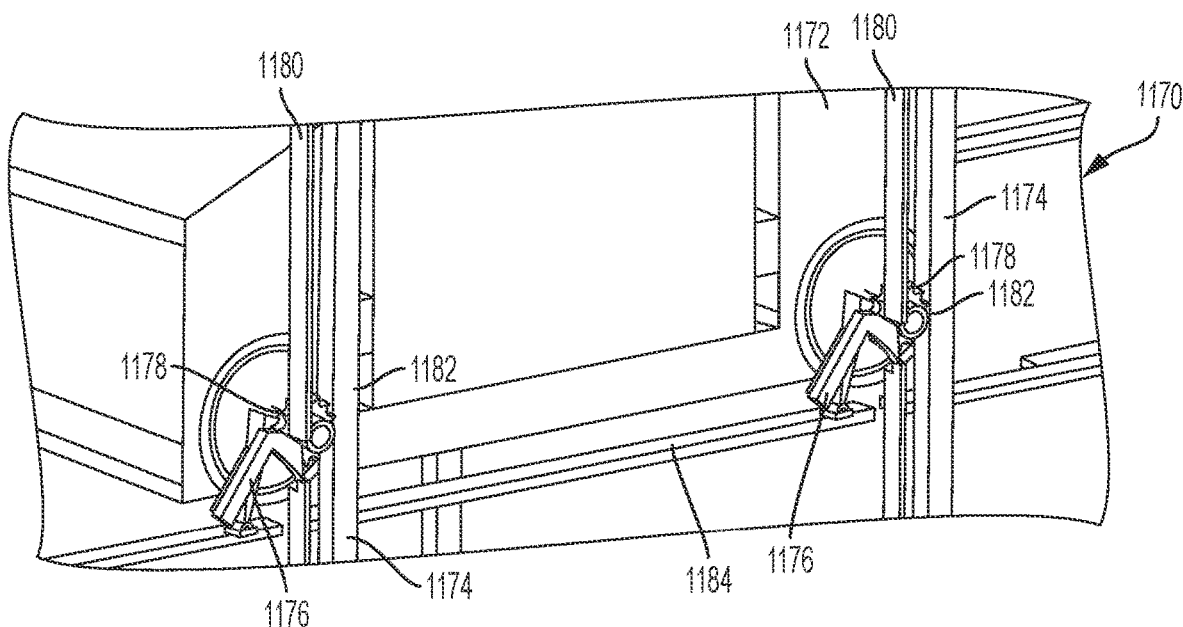
FIG. 43B is an isometric view of a vehicle with a vertical ramp in accordance with aspects of the disclosed embodiment.

Vertical Tracks (or simply "Verticals") are structural subassemblies by which Bots can move vertically up or down to move to any storage level in an aisle or to any workstation level. There are advantageously two Verticals at one end or both ends of each aisle, depending on whether there are Transit Decks on one or both ends of the aisles. One Vertical is for travel going up, the other for travel going down. The Verticals on one or both ends of the aisles are positioned between the aisle and the Transit Decks, with the Up-Vertical attached to the Transit Deck and the Down-Vertical attached to the aisle. FIGS. 43A and 43B show isometric views of vehicles with a vertical ramp 1170. Here, robot 1172 may climb verticals 1174. Here, counter-bearing rails have vertical breaks where counter bearing can enter. Shown here is passive switch 1176 for an up ramp where robot 1172 is entering horizontally from left. In FIG. 43B, robot 1172 is climbing vertical 1174 where switch 1176 is pushed out of the way for climbing Bot. In the case of the down ramp, the switch is normally open and may be pushed closed to allow the Bot to exit onto the outer horizontal track. Each Vertical includes four vertical chain-tracks that are constructed of standard roller-chain welded to a U-shaped channel; four sprocket gearwheels 1178 on the robots engage these chain-tracks. Associated with each chain-track is a Counter-bearing Rail 1180 that engages a bearing 1182 at the end of the gearwheel axis and ensures that the sprocket on the Bot remains properly engaged with the chain-track. At each entry/exit level is a hinged Gate-Switch 1176 which allows bearings to enter and exit the counter-rail channel if a Bot is entering or exiting the Vertical, but also prevents the bearing from leaving the channel if a Bot is passing through that level without exiting. Each Vertical also includes a pair of horizontal Bot Tracks 1184 positioned between opposing chain-tracks at each elevation at which Bots can enter or exit the ramp, said tracks connecting to the Bot Beams of each storage level and to each Transit Deck. Track pitch (distance between tracks) is same as aisle width at point of connection to Bot Beams of aisle but widens to slightly greater than Bot-width near the chain-tracks in order to permit ascending or descending Bots to pass between the tracks. A gap exists in the Bot Track immediately adjacent to each of the four chain-tracks, which allows the sprocket-wheel axles of a Bot ascending or descending the Vertical to pass through the track. Up-Verticals may be equipped with charging rails so that Bots can recharge their super-capacitors while ascending. Referring also to FIGS. 41A and 41B, there is shown side and isometric views respectively of vehicles with a vertical ramp 1110. Here, vehicle 1140 climbs verticals 1114 in a vertical climbing configuration of the robot. The difference in this embodiment is gears 1142 are perpendicular to direction of travel. Here, gear 1142 extends out through a gap in "outer horizontal track" to climb. An electronic level may be provided in the robotic vehicle to detect pitch and roll variance such that servo motors may be adjusted to maintain robotic vehicle level variations and eliminate racking. Referring also to FIGS. 42A and 42B, there are shown isometric views of the vehicle 1140, showing the gears 1142 extended in FIG. 42A and retracted in FIG. 42B. Those of skill in the art will appreciate the sprocket gears with chains described in this embodiment and other embodiments are not limiting to the invention, and that other equivalent structures may be utilized, such as pinion and rack, or the like.

Figure 47A:
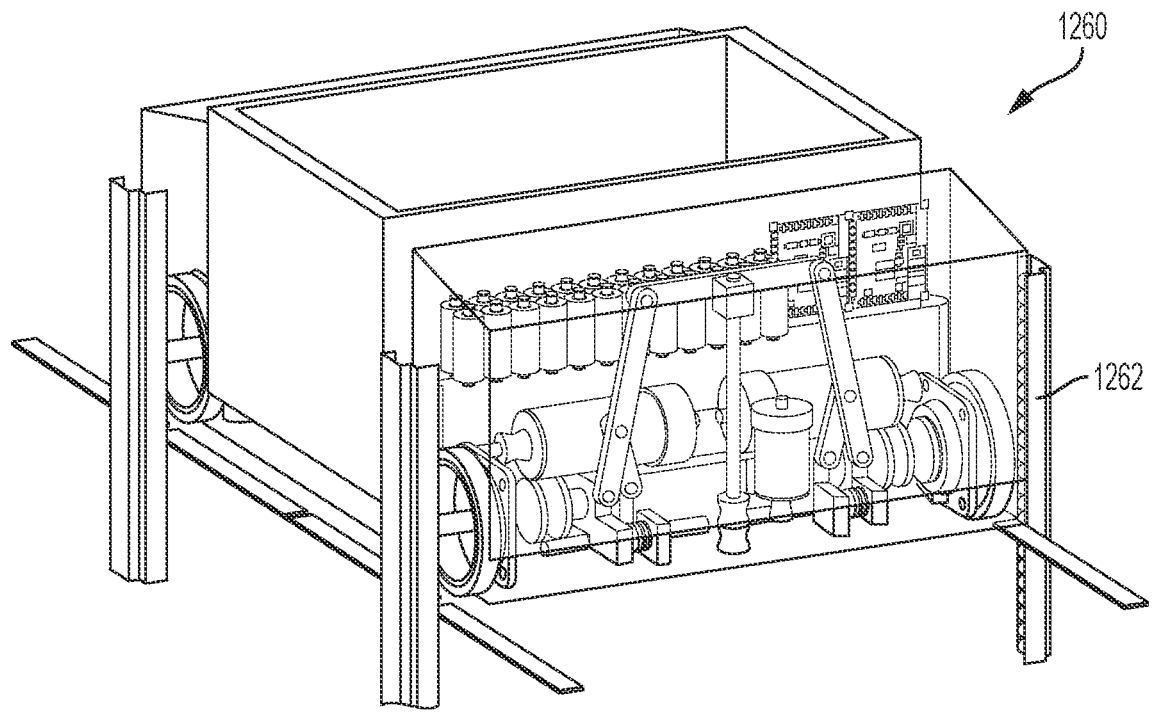
FIG. 47A is an isometric view of a vehicle in accordance with aspects of the disclosed embodiment.
Figure 47B:
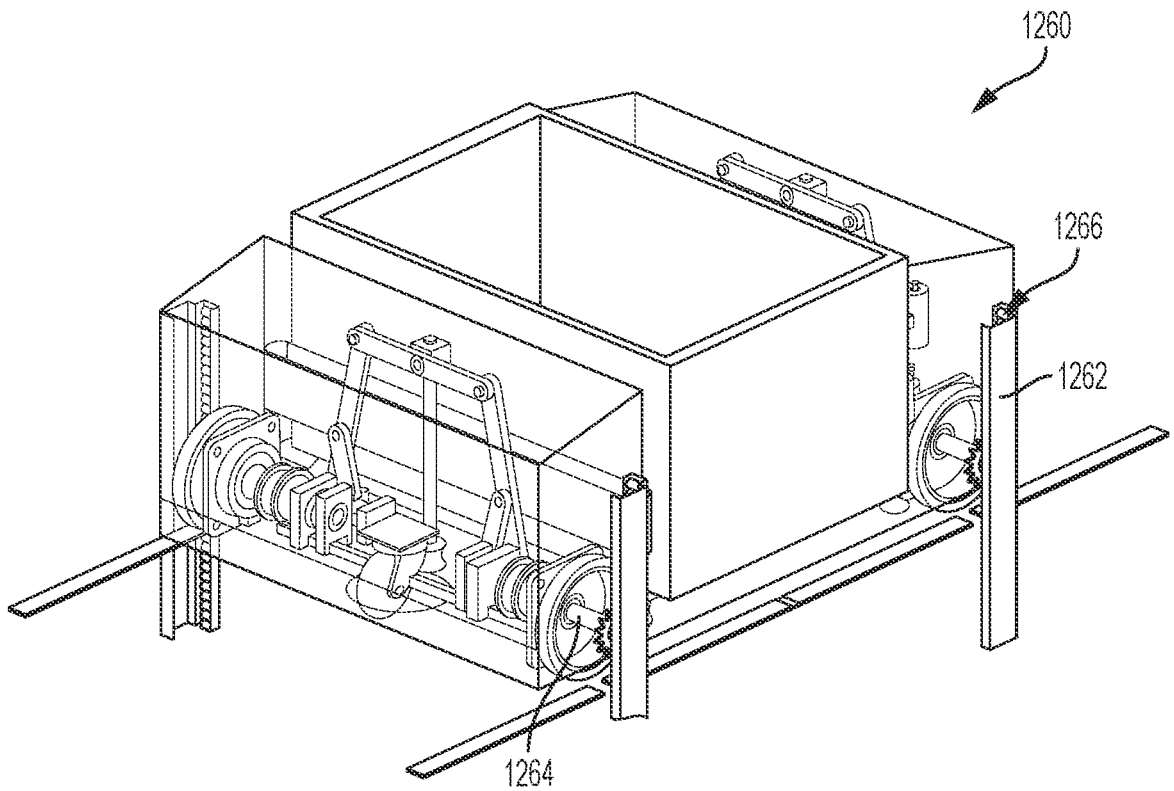
FIG. 47B is an isometric view of a vehicle in accordance with aspects of the disclosed embodiment.
Figure 50A:
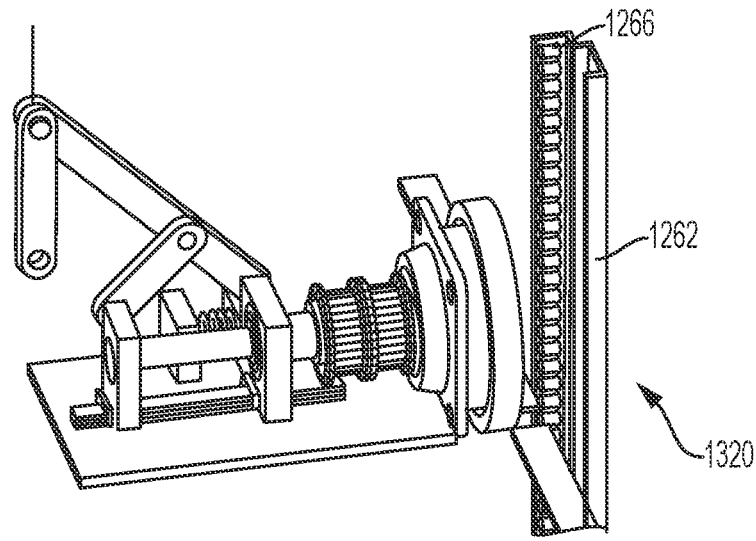
FIG. 50A is an isometric view of an orthogonal drive unit in accordance with aspects of the disclosed embodiment.
Figure 50B:
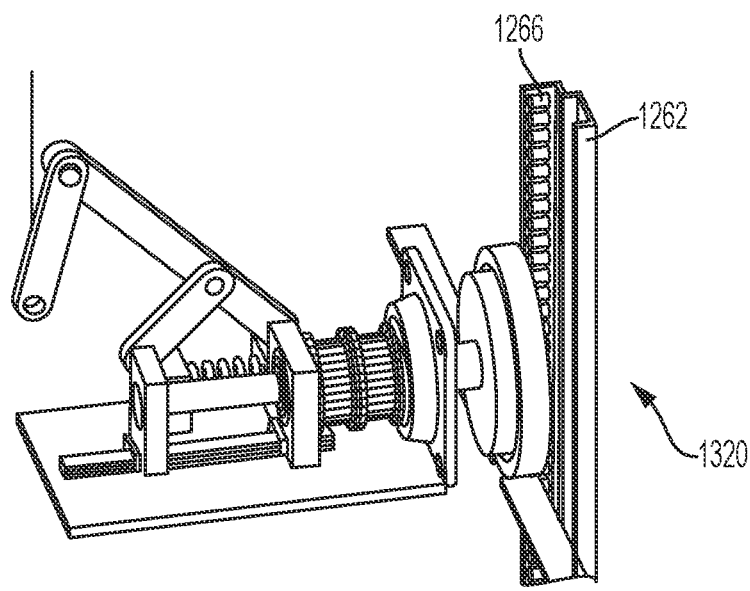
FIG. 50B is an isometric view of an orthogonal drive unit in accordance with aspects of the disclosed embodiment.
Figure 50C:
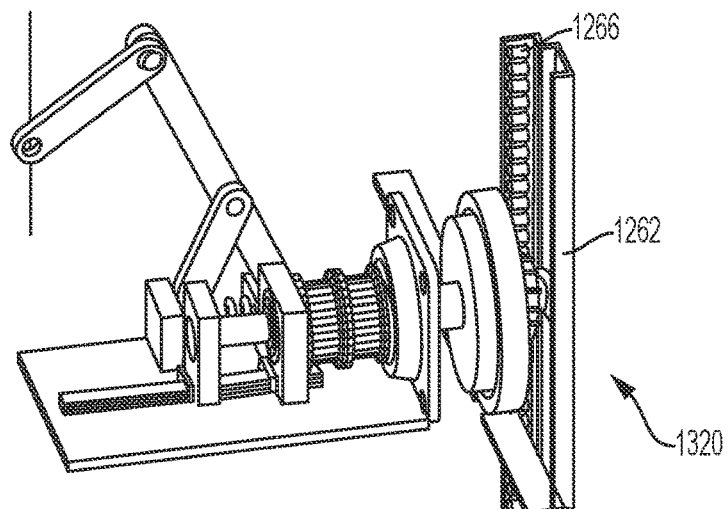
FIG. 50C is an isometric view of an orthogonal drive unit in accordance with aspects of the disclosed embodiment.
Figure 50D:
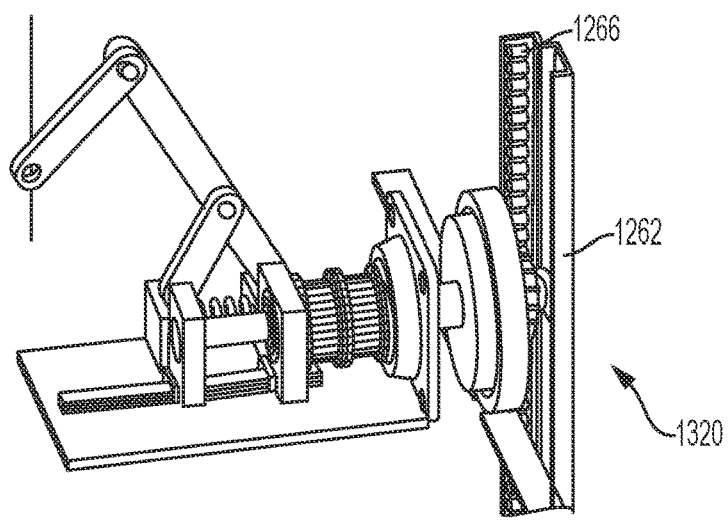
Figure 50E:
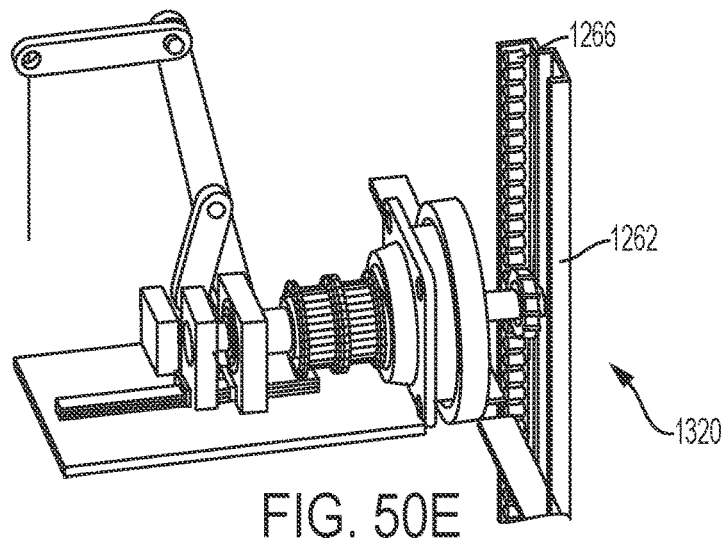

Referring now to FIGS. 47A and 47B, there are shown isometric views of robotic vehicle 1260 engaging verticals 1262. FIG. 47A shows "Unishaft" Bot Front whereas FIG. 47B shows "Unishaft" Bot Rear. Referring also to FIGS. 48A through 48E, there are shown end views of orthogonal drive unit linkage 1290. Referring also to FIGS. 49A through 49E, there are shown rear views of orthogonal drive unit linkage 1320. Referring also to FIGS. 50A through 50E, there are shown isometric views of orthogonal drive unit linkage 1320. FIG. 50A shows wheel in, sprocket in, the position when driving through a rack system. FIG. 50B shows wheel out, sprocket in, the position when driving horizontally through a vertical zone. FIG. 50C shows wheel out, sprocket out, counter bearing not fully extended, the position when Bot drives up to vertical chain. FIG. 50D shows wheel out, sprocket out, counter bearing out with the robotic vehicle ready to climb off, or land on horizontal rails. FIG. 50E shows wheel in, sprocket out, counter bearing out, the position when Bot is climbing through horizontal rails.

Figure 44A:
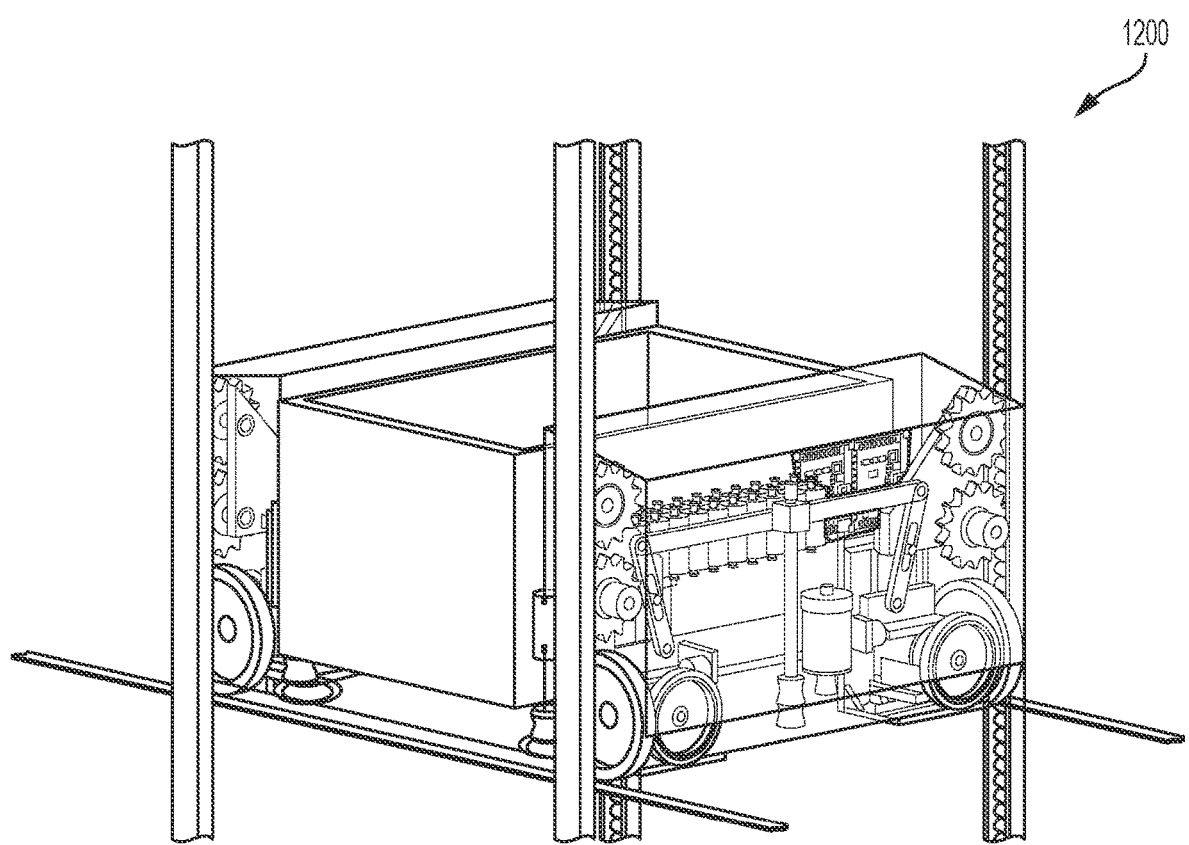
FIG. 44A is an isometric view of a vehicle with a vertical ramp in accordance with aspects of the disclosed embodiment.
Figure 44B:
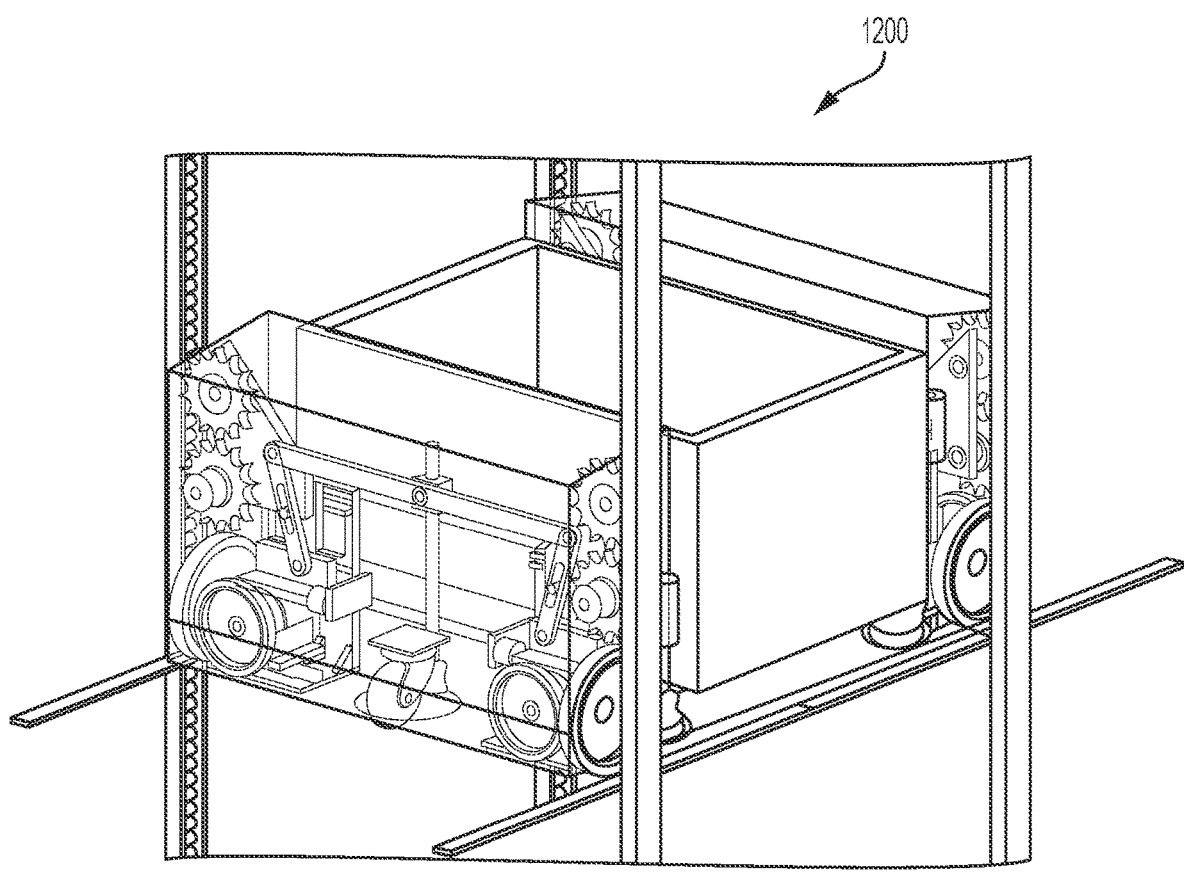
FIG. 44B is an isometric view of a vehicle with a vertical ramp in accordance with aspects of the disclosed embodiment.
Figure 45A:
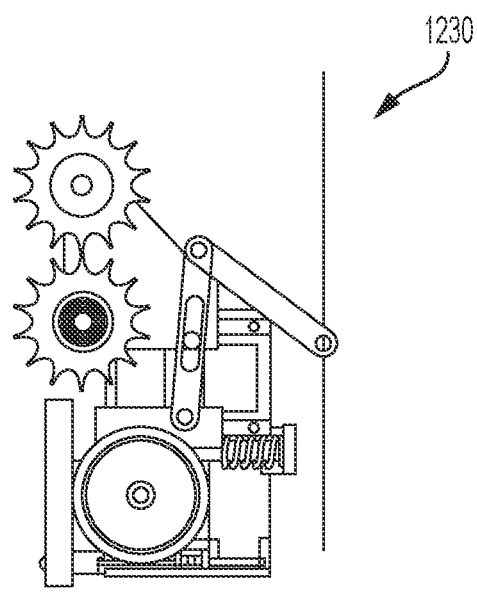
FIG. 45A is an end view of an orthogonal drive unit in accordance with aspects of the disclosed embodiment.
Figure 45B:
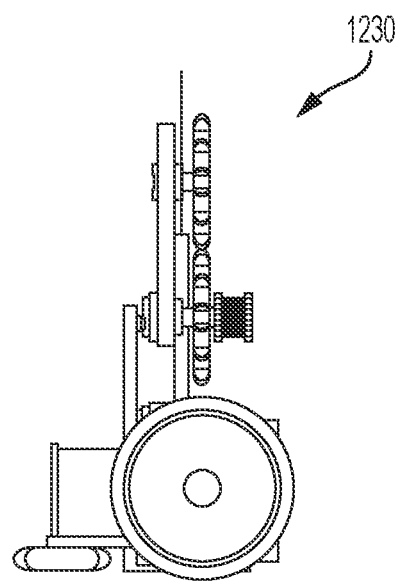
FIG. 45B is a side view of an orthogonal drive unit in accordance with aspects of the disclosed embodiment.
Figure 45C:
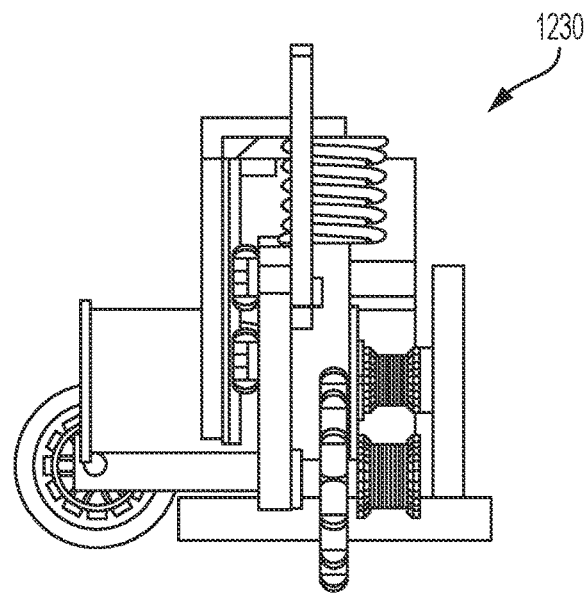
FIG. 45C is a top view of an orthogonal drive unit in accordance with aspects of the disclosed embodiment.
Figure 45D:
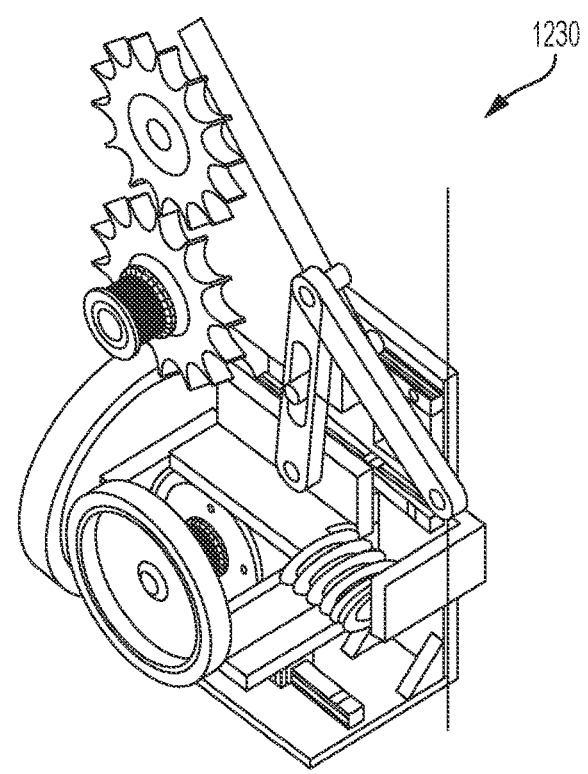
FIG. 45D is an isometric view of an orthogonal drive unit in accordance with aspects of the disclosed embodiment.
Figures 46A, 46B, 46C, 46D:
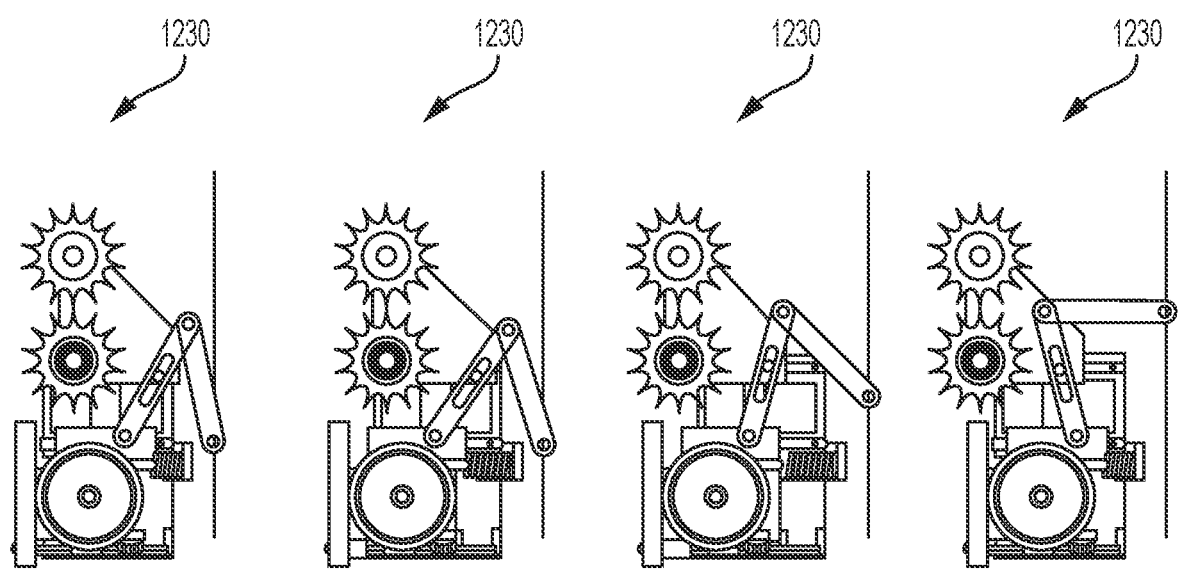
FIG. 46A is an end view of an orthogonal drive unit in accordance with aspects of the disclosed embodiment.
FIG. 46B is an end view of an orthogonal drive unit in accordance with aspects of the disclosed embodiment.
FIG. 46C is an end view of an orthogonal drive unit in accordance with aspects of the disclosed embodiment.
FIG. 46D is an end view of an orthogonal drive unit in accordance with aspects of the disclosed embodiment.

Referring now to FIGS. 44A and 44B, there are shown isometric front views of alternate embodiment vertical climbing vehicles with a vertical ramp 1200. Referring also to FIGS. 45A through 45D, there are shown end, side, top and isometric views respectively of orthogonal drive unit 1230. Referring also to FIGS. 46A through 46D, there are shown end views of orthogonal drive unit 1230. The orthogonal drive unit linkage drive is shown with center link actuated vertically. FIG. 46A shows wheel in, sprocket in. FIG. 46B shows wheel out, sprocket in. Here, the end of center link is in same position and the linkage allows the wheel to passively ride out driven by spring. FIG. 46C shows wheels out, sprocket out. FIG. 46D shows wheels in, sprocket in. Here, the drive wheel is disengaged from the Bot wheel and the distance from the motor center to driven sprocket center is 13 mm longer causing the belt to engage to drive sprocket at same time. Here, the link is horizontal creating rigid engagement of sprocket in vertical chain, like an over-center latch. In this embodiment, the top sprocket is passive and may be used for stability of Bot in roll axis.

BTS—Passive Ramp Alternative

Figure 37A:
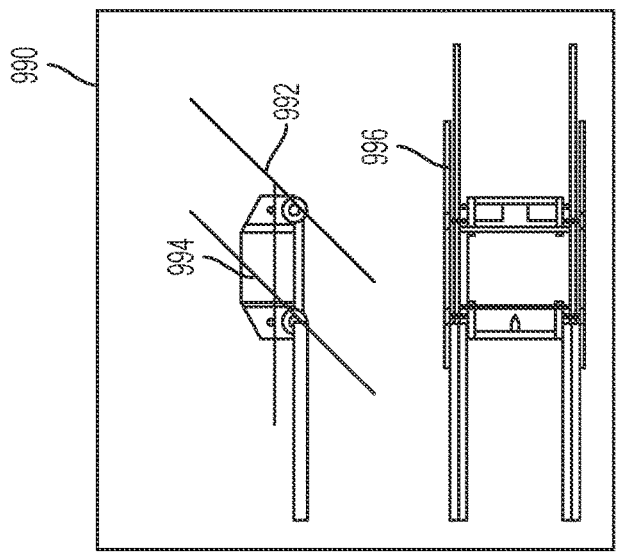
FIG. 37A is a side view of a vehicle with a ramp in accordance with aspects of the disclosed embodiment.
Figure 37B:
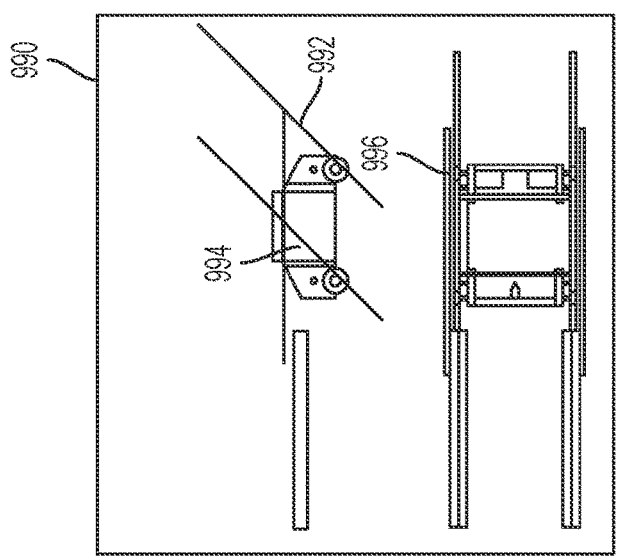
FIG. 37B is a side view of a vehicle with a ramp in accordance with aspects of the disclosed embodiment.
Figure 37C:
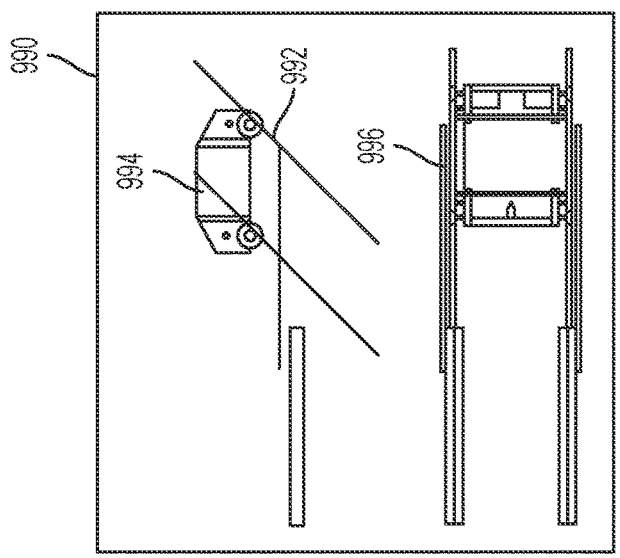
FIG. 37C is a side view of a vehicle with a ramp in accordance with aspects of the disclosed embodiment.
Figure 37D:
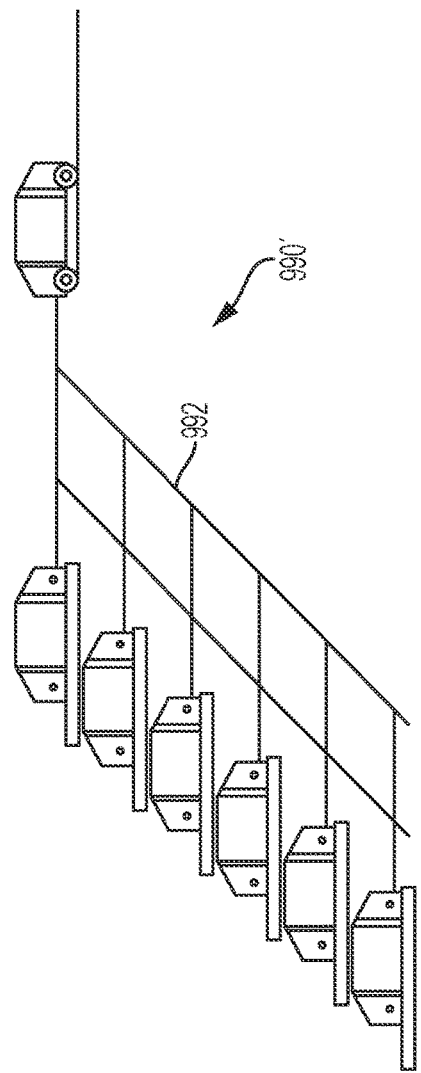
FIG. 37D is a side view of vehicles with a ramp module in accordance with aspects of the disclosed embodiment.
Figure 38B:
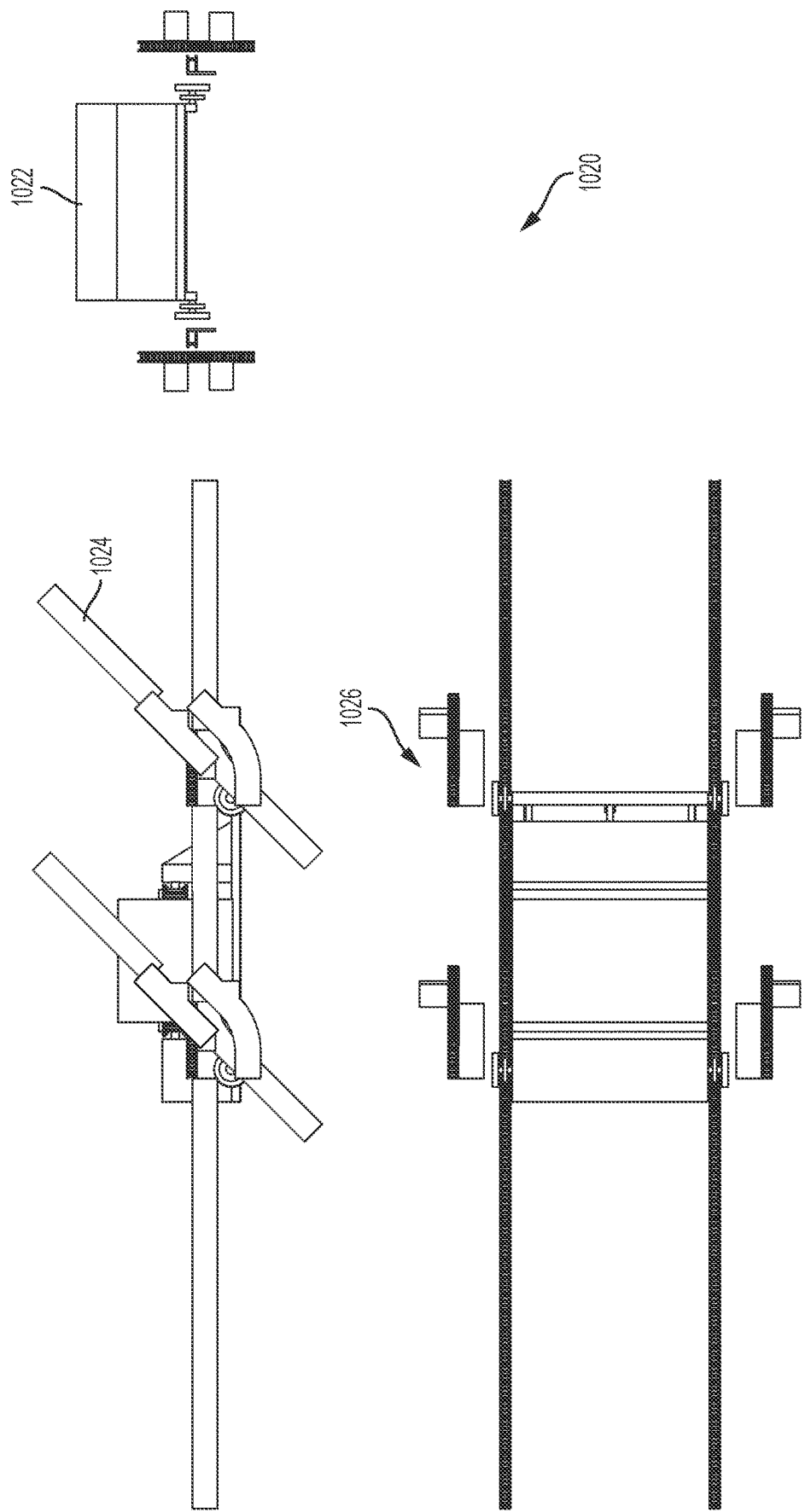
FIG. 38B is a side, end and top view of a vehicle with a ramp in accordance with aspects of the disclosed embodiment.
Figure 38C:
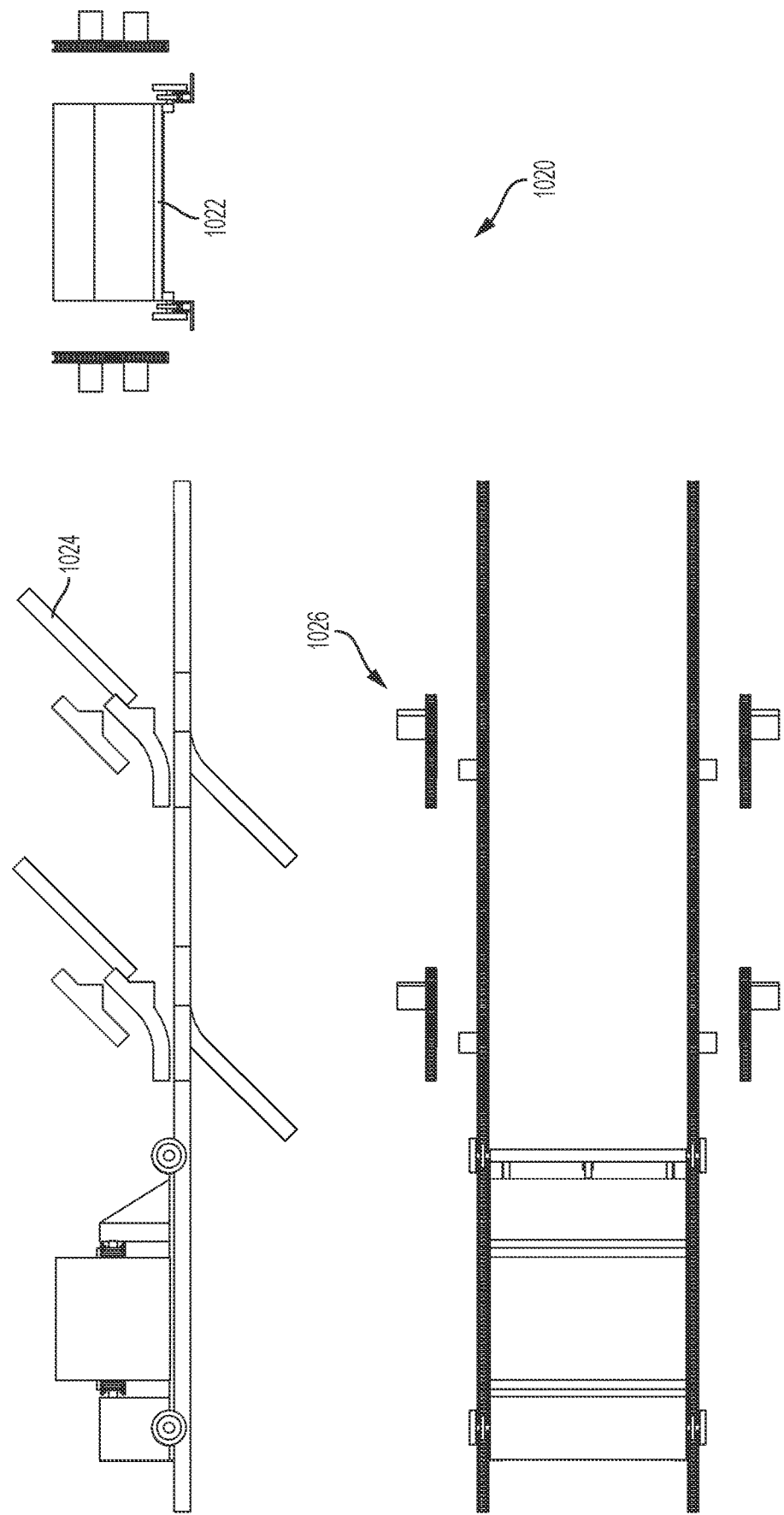
FIG. 38C is a side, end and top view of a vehicle with a ramp in accordance with aspects of the disclosed embodiment.
Figure 38D:
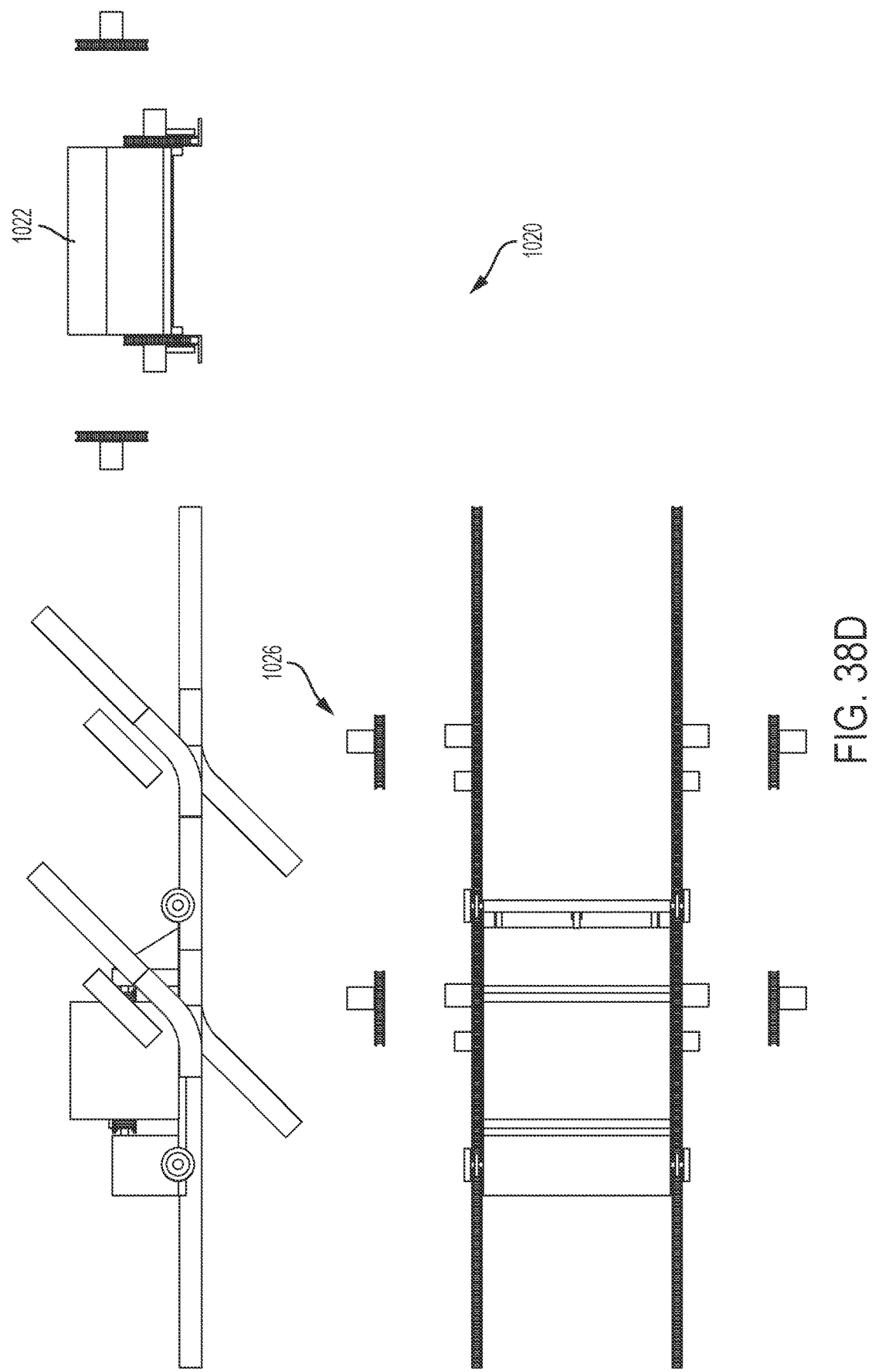
FIG. 38D is a side, end and top view of a vehicle with a ramp in accordance with aspects of the disclosed embodiment.

Aisle Ramps (passive-track embodiment) are structural subassemblies (modules) interconnecting the storage levels within a given Storage Zone (one tier section of one aisle) and the Transit Deck of that tier. FIGS. 37A through 37C shows side and top views of example vehicle with ramp 990 and FIG. 37D shows a side view of example vehicles with ramp module 990'. Each Aisle Ramp module provides pathway for Bots to move between the Transit Deck and any of the interconnected storage levels. Travel can be either bidirectional or unidirectional depending on system topology, i.e. single-ended or double-ended, respectively. Each ramp module includes four diagonal Ramp Tracks 992, one for each of the four wheels on a Bot 994, which are constructed of passive roller-chain welded to a U-shaped channel. Roller chain on each track is engaged by one of four sprocket wheels on the robot. Four tracks enable the robot to remain horizontal when ascending or descending the diagonal ramp. Each ramp module also includes a pair of horizontal Bot Tracks 996 positioned between ramp tracks at each elevation at which Bots can enter or exit the ramp. Bot Tracks connect on one side to Transit Deck at top of ramp and on other side to each storage level within that Storage Zone. A Bot descending a ramp can enter the ramp only at the top of the ramp from the Transit Deck and can exit the ramp at any storage level within the zone (no reversing maneuver required in either direction) as seen in FIG. 37D. A Bot ascending the ramp can enter the ramp only from one of the storage levels and can exit the ramp only at the top of the ramp to the Transit Deck (no reversing maneuver required in either direction). Track pitch (distance between tracks) is same as aisle width except in the "ramp zone" near the ramp tracks, where pitch increases. A gap exists in the Bot Track immediately adjacent to each of the four ramp tracks, which allows the sprocket-wheel axles of a Bot ascending or descending the ramp to pass through the track.

Transit Ramps are structural subassemblies interconnecting the multiple tiers within a system. Each Transit Ramp provides a pathway for robots to move between interconnected Transit Decks, i.e. between tiers. Travel on Transit Ramps is unidirectional by default in order to maximize throughput, but can be bidirectional (at lower throughput) if necessitated as a result of an operational problem that prevents travel on one or more Transit Ramps. Basic design same as that of Aisle Ramps, for example, four roller-chain Ramp Tracks with Bot Tracks at each entry/exit elevation. Configuration differs in that all Bot Tracks connect on both ends to Transit Decks of each tier. Bots ascending or descending a ramp can enter a ramp from any tier and exit at any other tier, reversing maneuver required on entry if descending (except from top tier) and on exit if ascending (except to bottom tier). Transit Ramps with travel going up are equipped with charging rails so that Bots can recharge their super-capacitors while ascending.

Figure 39A:
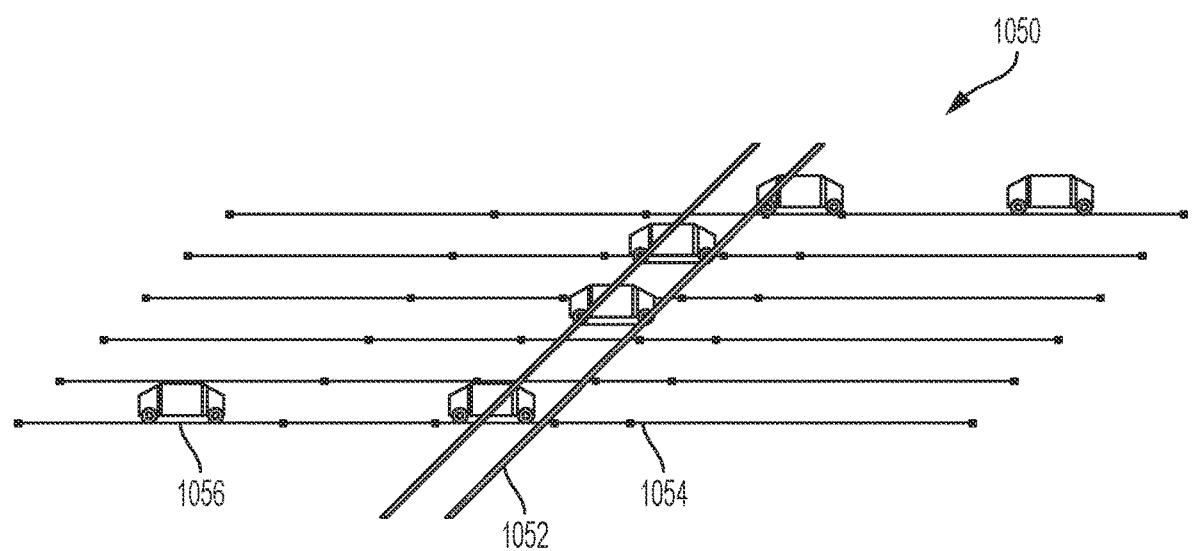
FIG. 39A is a side view of vehicles with a ramp in accordance with aspects of the disclosed embodiment.
Figure 39B:
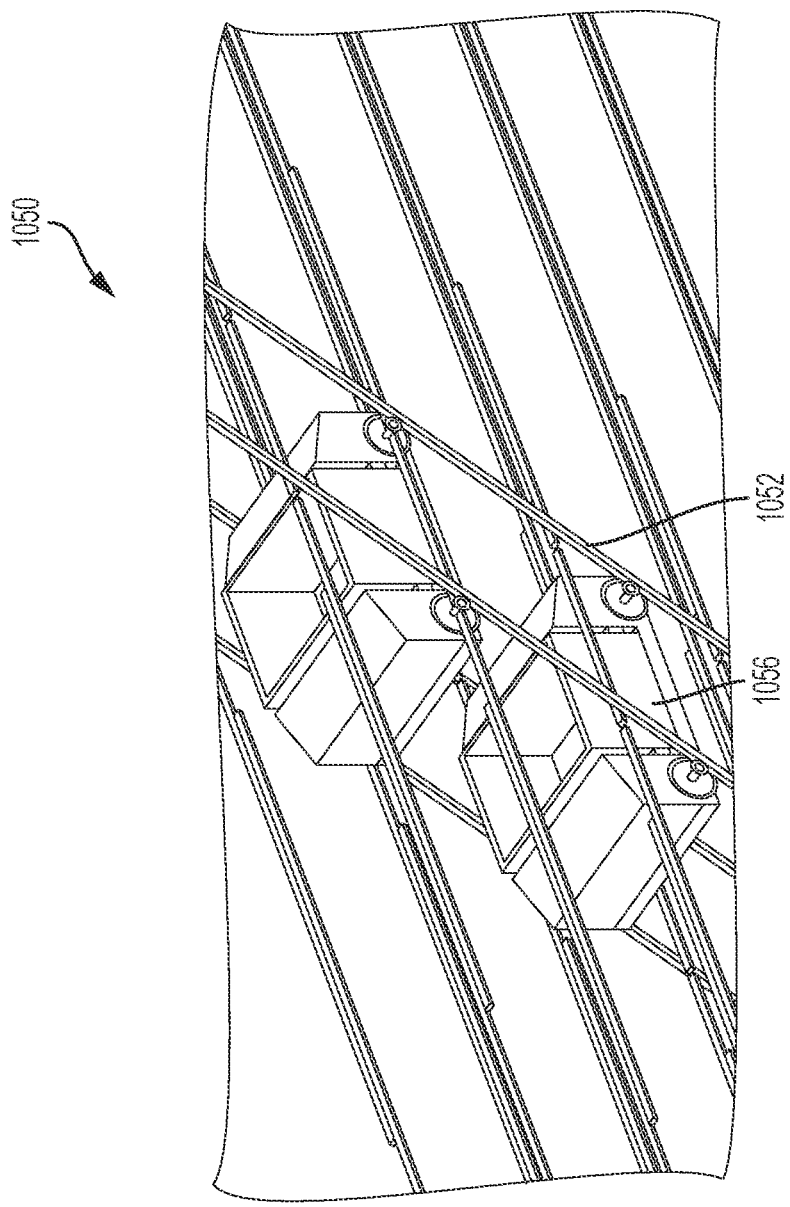
FIG. 39B is an isometric view of vehicles with a ramp in accordance with aspects of the disclosed embodiment.
Figure 39C:
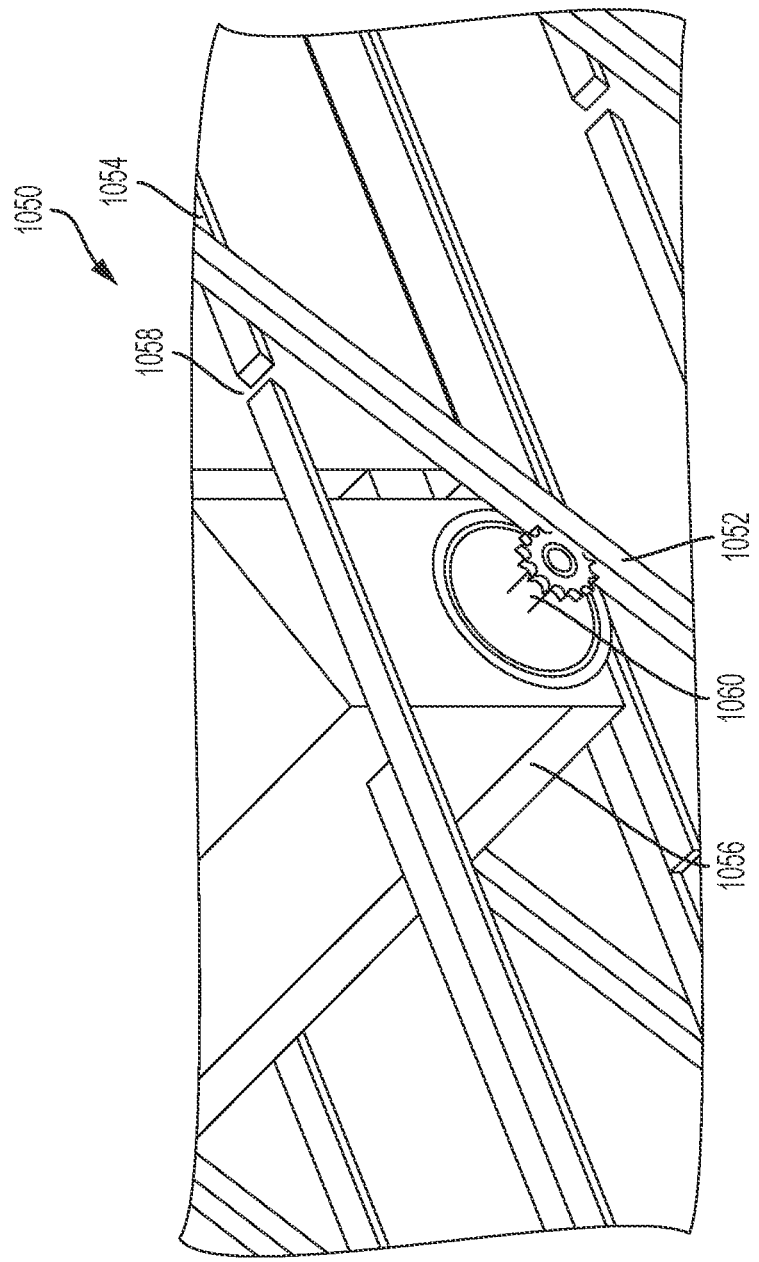
FIG. 39C is an isometric view of a vehicle with a ramp in accordance with aspects of the disclosed embodiment.
Figure 39D:
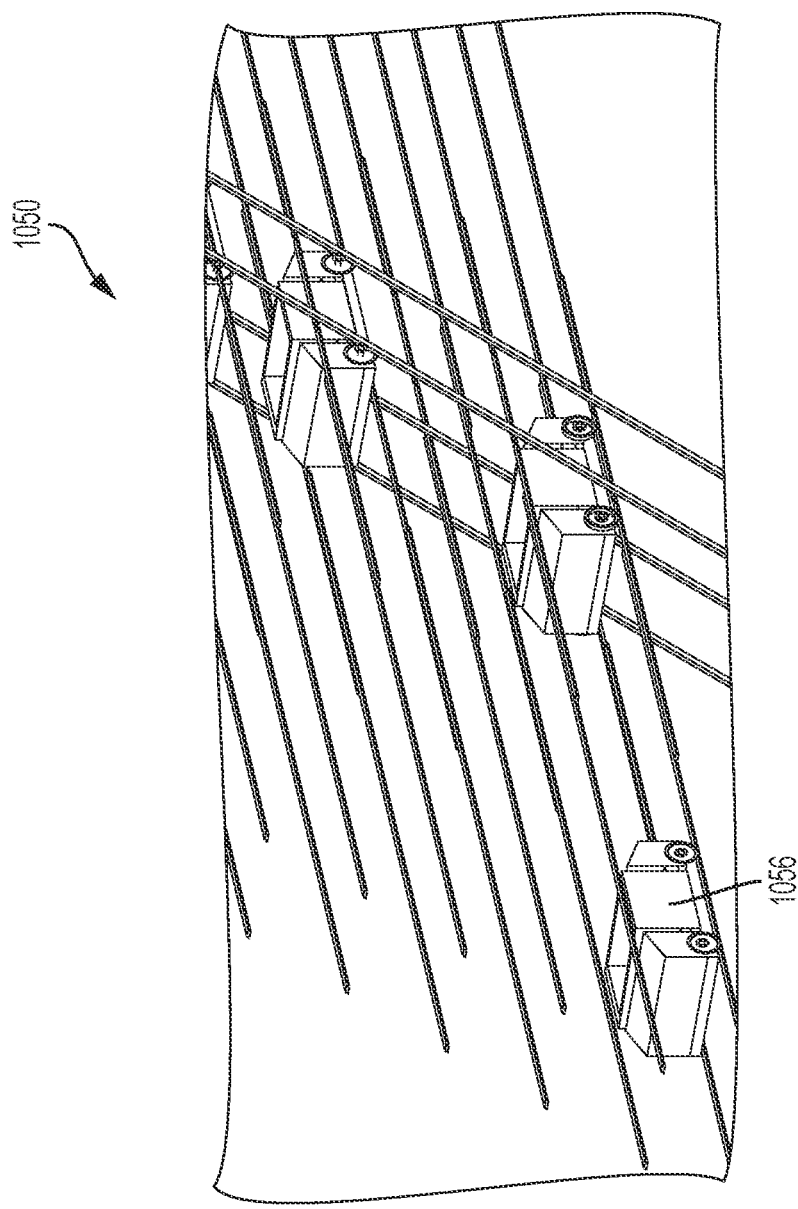
FIG. 39D is an isometric view of vehicles with a ramp in accordance with aspects of the disclosed embodiment.
Figure 39E:
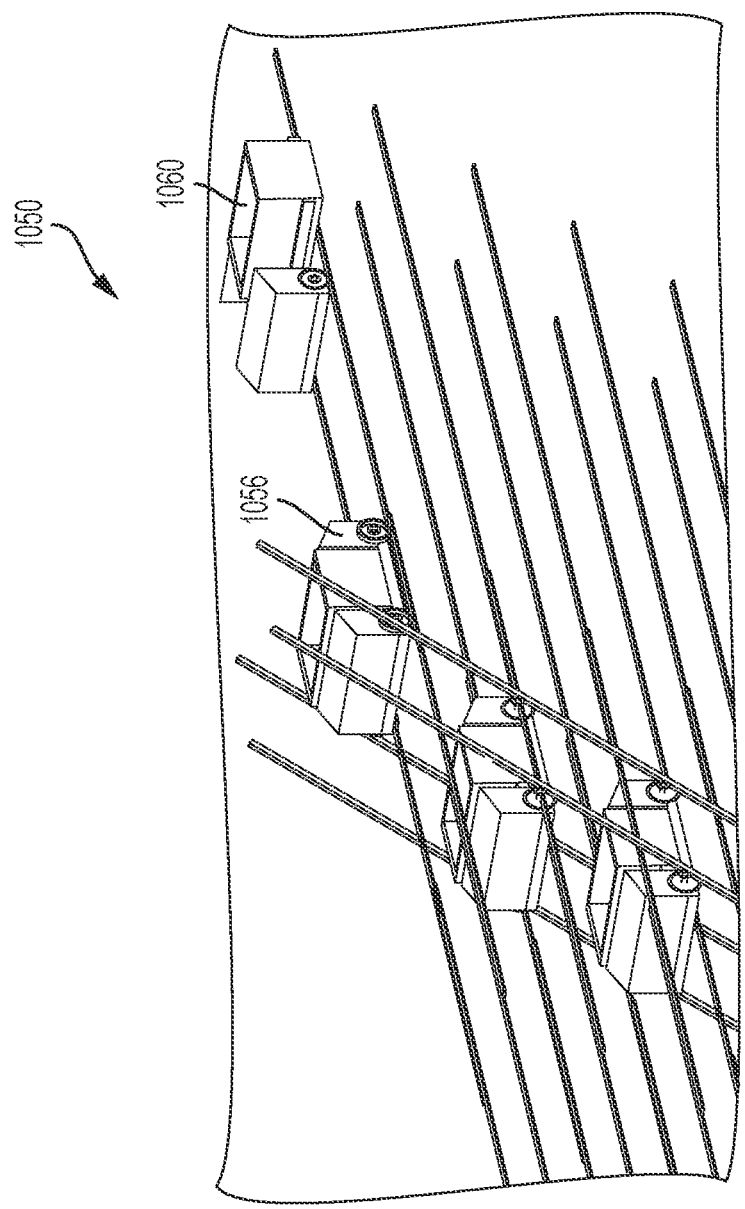
FIG. 39E is an isometric view of vehicles with a ramp in accordance with aspects of the disclosed embodiment.
Figure 40B:
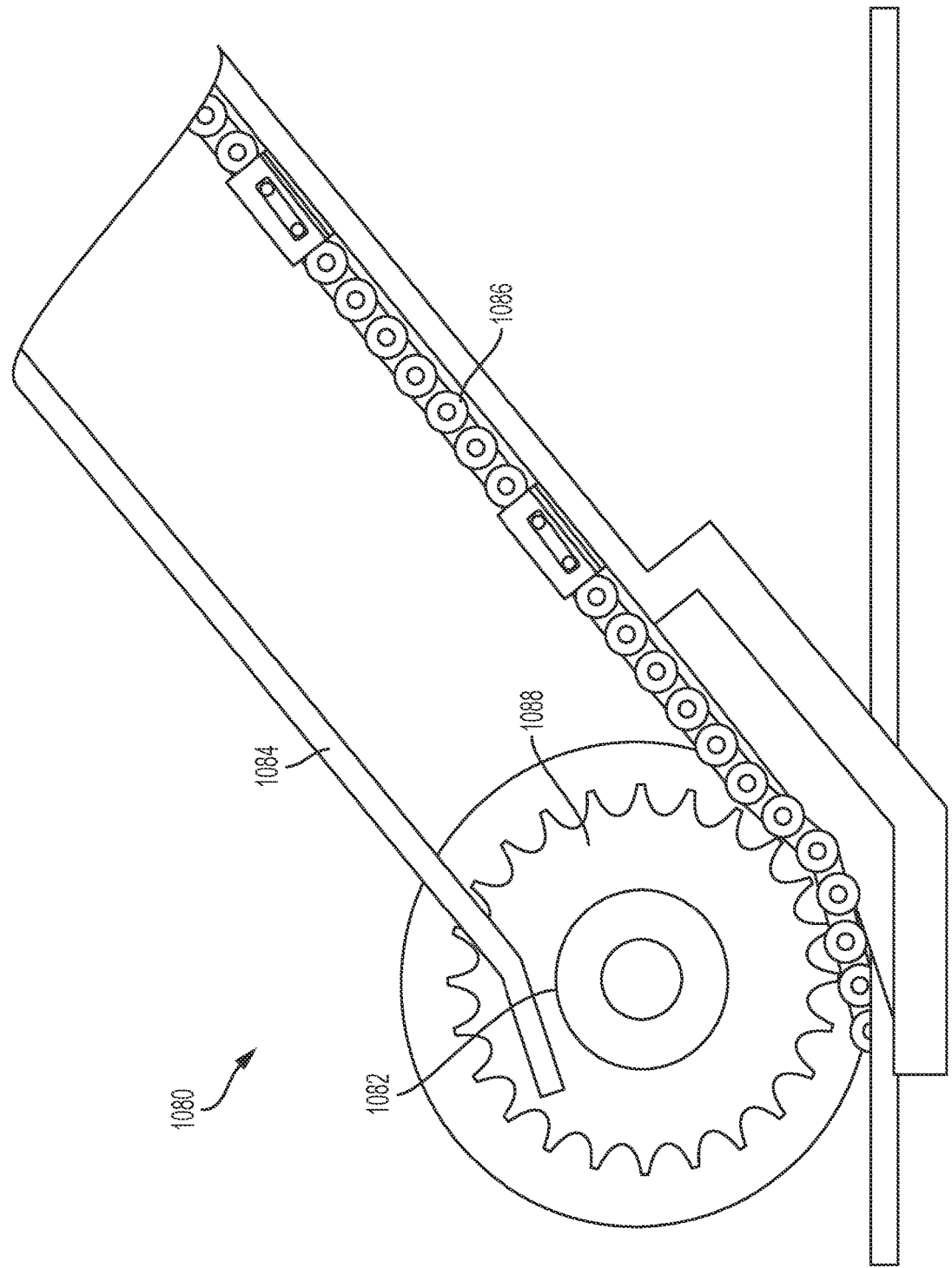
FIG. 40B is a side schematic view of a transmission in accordance with aspects of the disclosed embodiment.
Figure 40C:
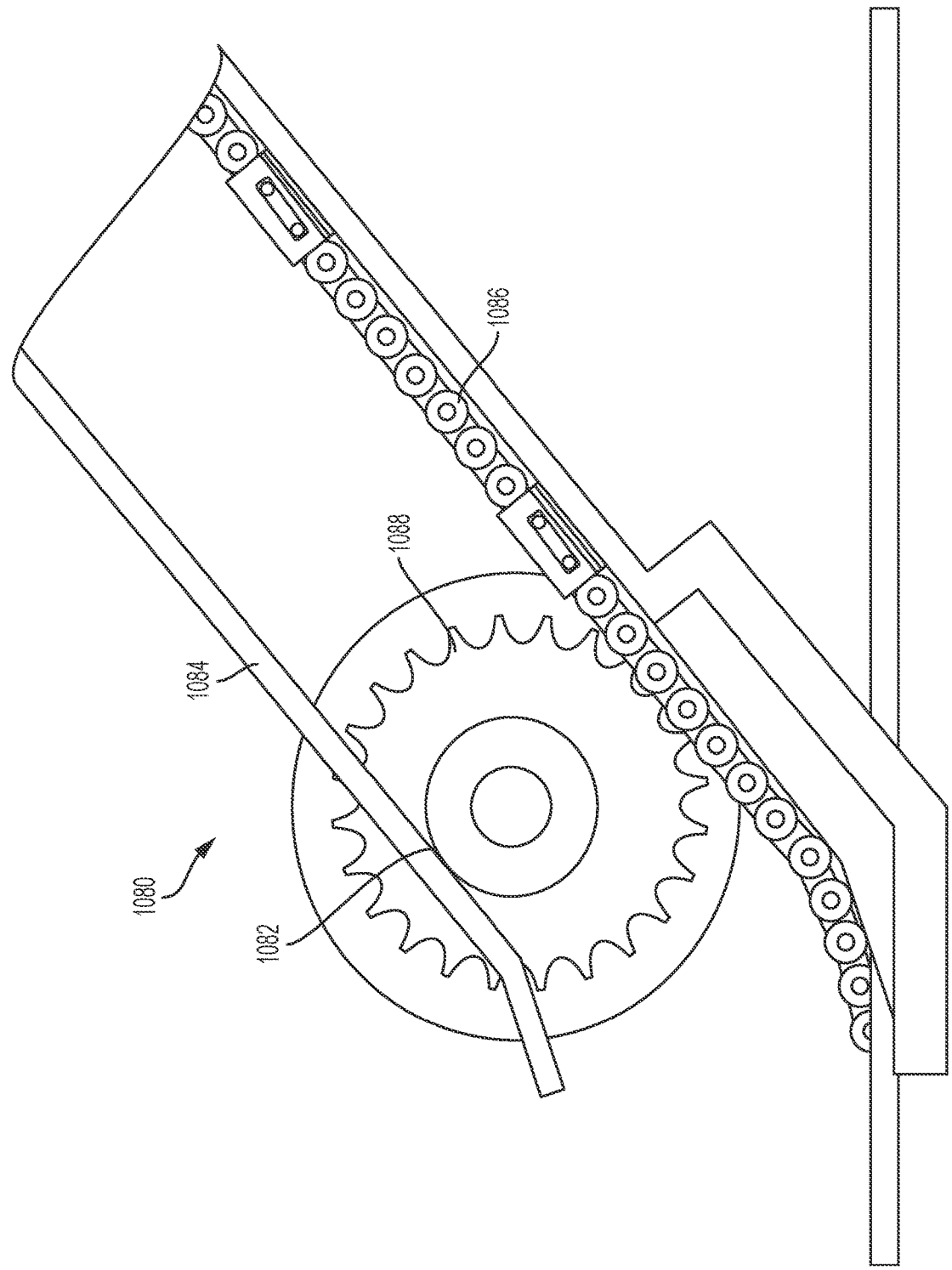
FIG. 40C is a side schematic view of a transmission in accordance with aspects of the disclosed embodiment.
Figure 40D:
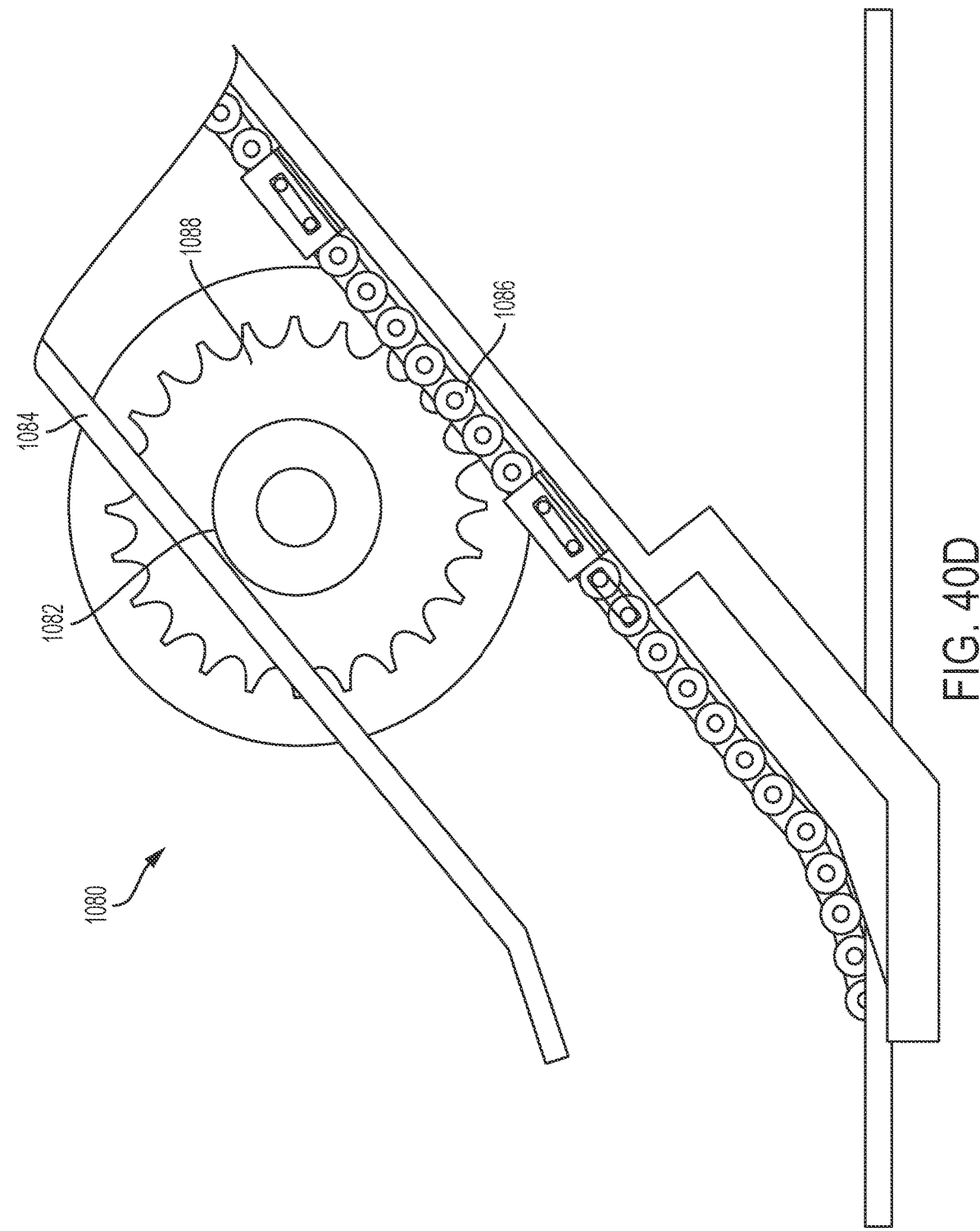
FIG. 40D is a side schematic view of a transmission in accordance with aspects of the disclosed embodiment.

Referring now to FIG. 39A, there is shown a side view of vehicles with a ramp 1050. Referring also to FIGS. 39B through 39E, there are shown isometric views of vehicles with a ramp 1050. FIG. 39A shows a side elevation of ramp 1052 and track 1054. Robotic Vehicles 1056 can enter ramp 1052 on any level and exit ramp 1052 on any level. FIG. 39A shows only entering on bottom level and exiting on top level. FIG. 39B shows robot vehicles 1056 climbing "ramp" 1052. In climbing mode, their wheels are retracted "in" to allow them to rise between the "outer horizontal tracks". Their wheel sprockets are extended "out" to engage "passive roller chain" linearly affixed in the "ramp". FIG. 39C shows a close-up of robotic vehicle 1056 climbing a ramp 1052. A "break" 1058 in "outer horizontal track" 1054 allows "sprocket axle" 1060 to pass through. Here, a completely passive track and ramp system is achieved with no switches or moving parts in the structure. FIG. 39D shows robotic vehicle 1056 in the "non-ramp zone". In the "non-ramp zone", robotic vehicle 1056 drives with wheels and sprockets "in" on "inner horizontal track" to make robotic vehicle 1056 as narrow as possible to reduce storage footprint. When a robotic vehicle 1056 passes through a "ramp-zone" without climbing, it extends its wheels "out" to ride on the "outer horizontal track" that straddles the width of the robotic vehicle 1056 with wheels "in". FIG. 39E shows robotic vehicle 1056 has just exited ramp on top level. The robotic vehicle 1060 is delivering a Tote to a passive storage location adjacent to the "inner horizontal track". Referring also to FIGS. 40A through 40D, there are shown side schematic views of wheels with sprockets 1080 engaging a ramp. Here, counter bearing 1082 engages counter-bearing rail 1084 while chain 1086 is engaged by sprocket 1088. FIGS. 40A and 40B show initial engagement where a rubber backing may be provided to enable chain meshing and limit engagement wear. FIGS. 40C and 40D show further progression up the ramp.

BTS—Active Ramp Alternative

Active ramps also use four roller-chain ramp tracks that are engaged by sprocket wheels on Bots. FIGS. 38A through 38D show side, end and top views of a vehicle with a ramp 1020. Here, vehicle 1022 climbs or descends ramp 1024. The figure shows alternative to passive ramp configuration. In this case, ramps include switches 1026 that may be either actuated by the robot or actuated with motors located on the ramps. The motors are commanded by either the robot locally or a central Material Control System (MCS). Here, the ramp tracks are active rather than passive: at each ramp entry and exit point there is a mechanism that can switch any of multiple segments into position to control the path that the vehicle will take when the sprocket wheels engage those segments. This ramp design simplifies and reduces the cost of the robot compared to the passive-track design, but adds complexity and cost to the ramps; while typical applications will favor the passive-track embodiment, applications that require little storage but high throughput may favor the active-track.

T-Bots

Figure 25C:
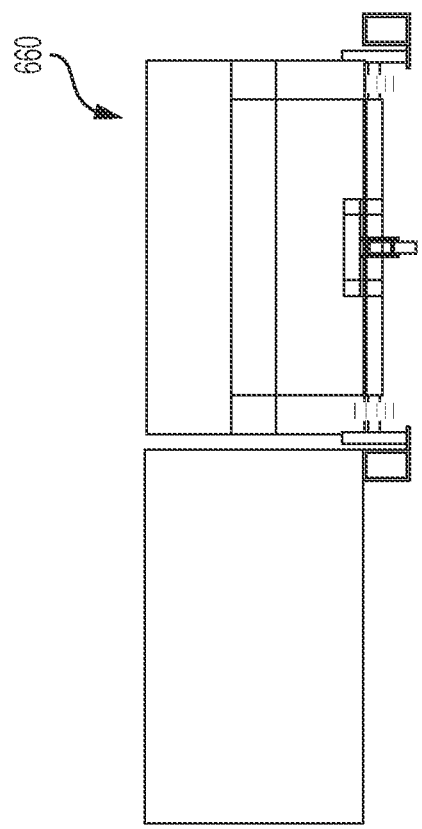
FIG. 25C is an end view of a vehicle in accordance with aspects of the disclosed embodiment.
Figure 25A:
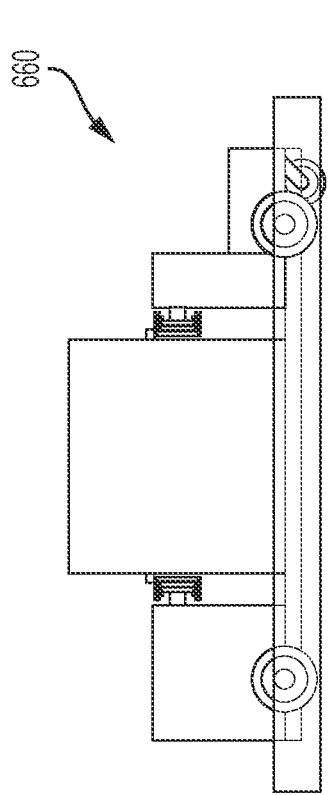
FIG. 25A is a side view of a vehicle in accordance with aspects of the disclosed embodiment.
Figure 25B:
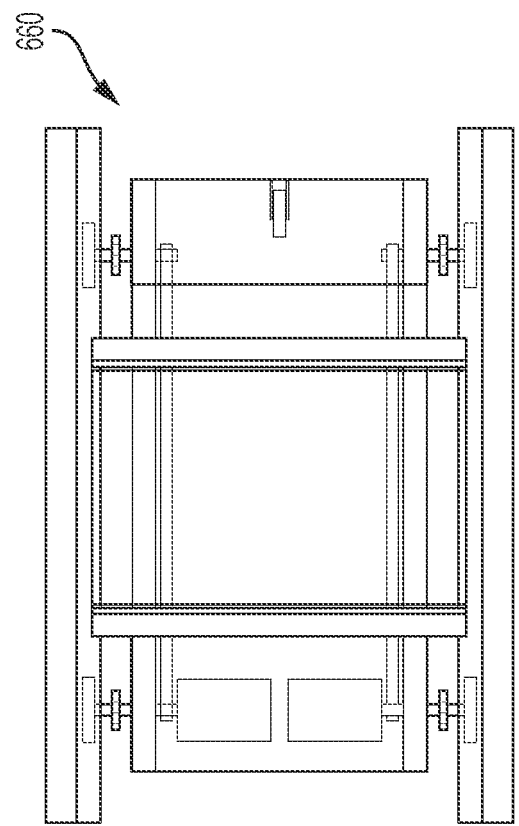
FIG. 25B is a top view of a vehicle in accordance with aspects of the disclosed embodiment.
Figure 31A:
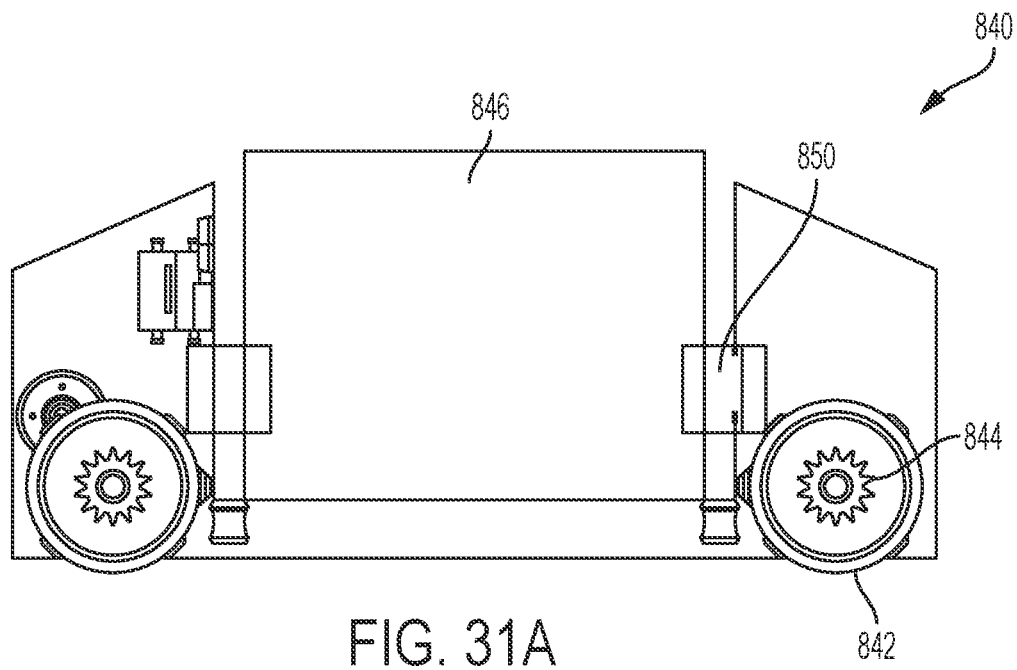
FIG. 31A is a side view of a vehicle in accordance with aspects of the disclosed embodiment.
Figure 31B:
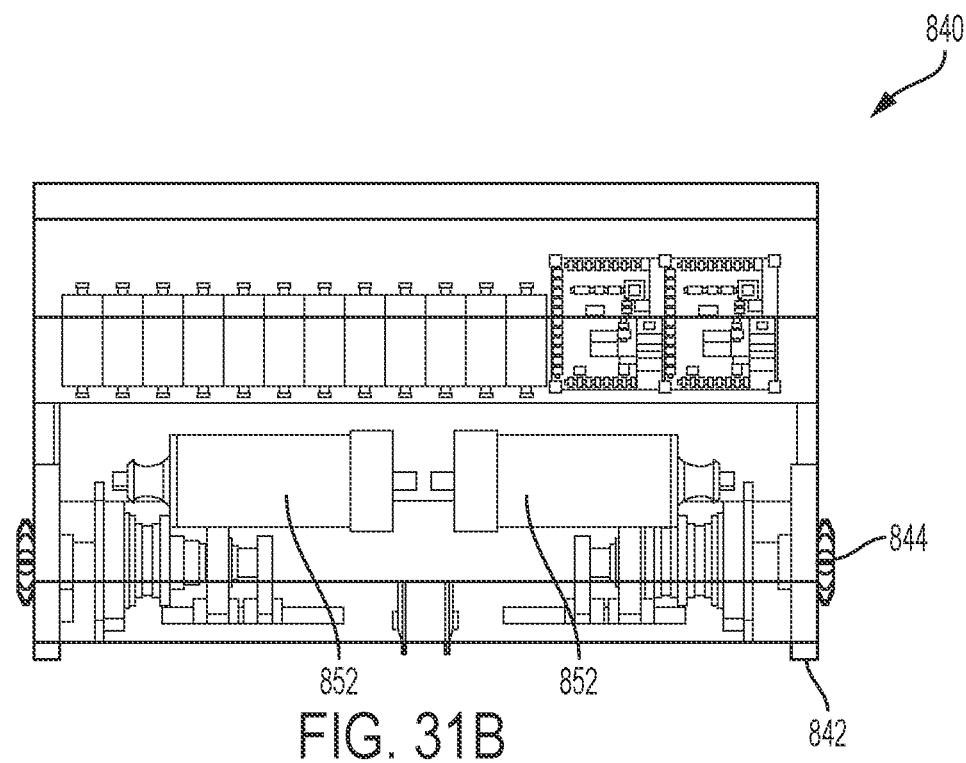
FIG. 31B is an end view of a vehicle in accordance with aspects of the disclosed embodiment.
Figure 31C:
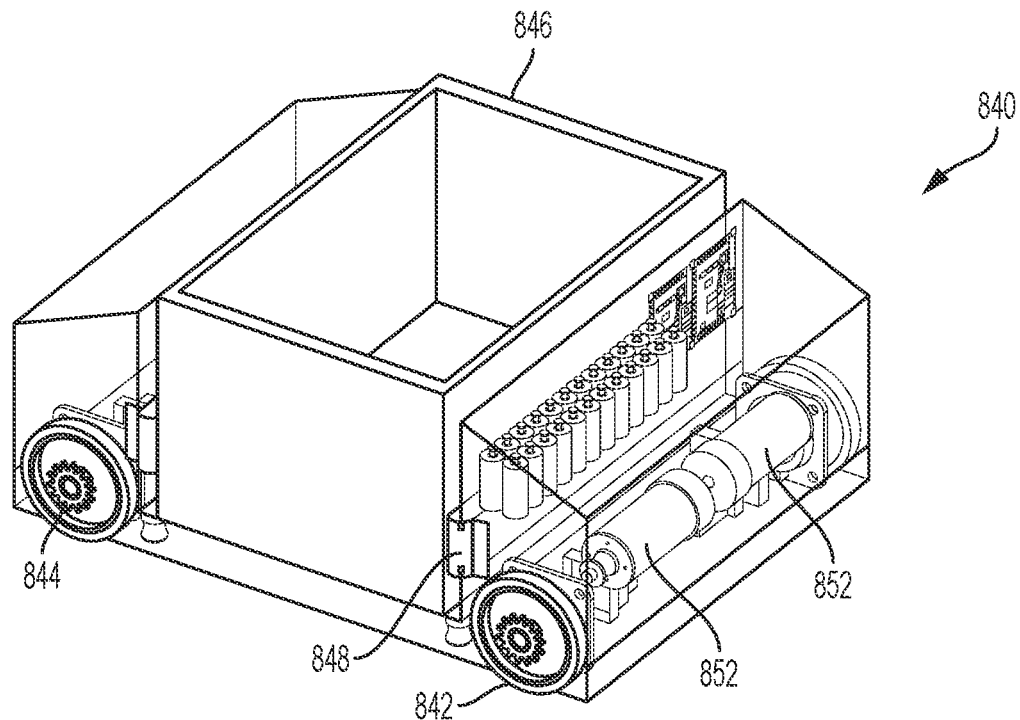
FIG. 31C is an isometric view of a vehicle in accordance with aspects of the disclosed embodiment.
Figure 31D:
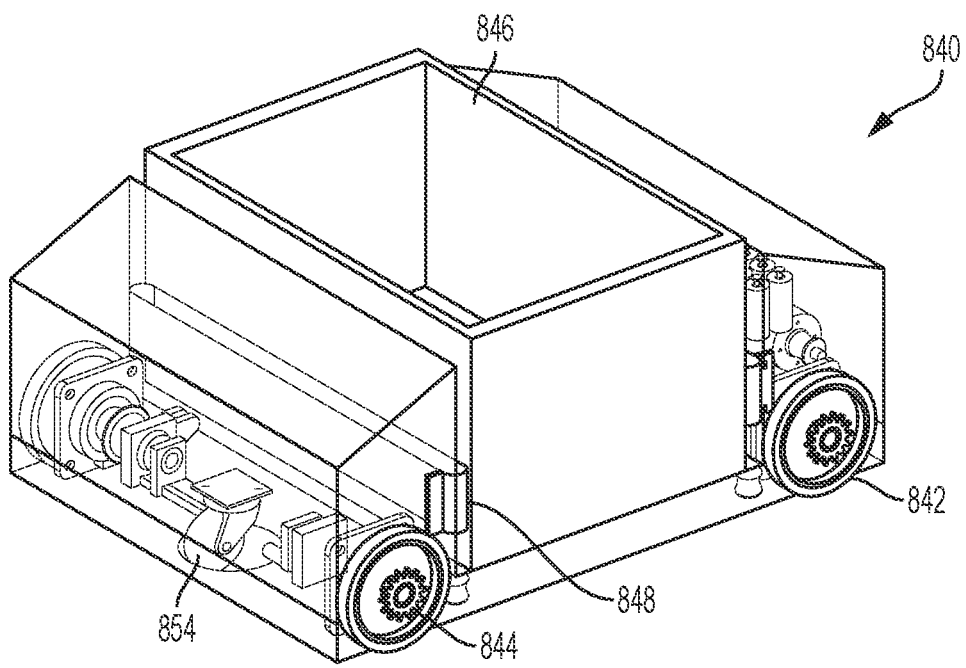
FIG. 31D is an isometric view of a vehicle in accordance with aspects of the disclosed embodiment.
Figure 33:
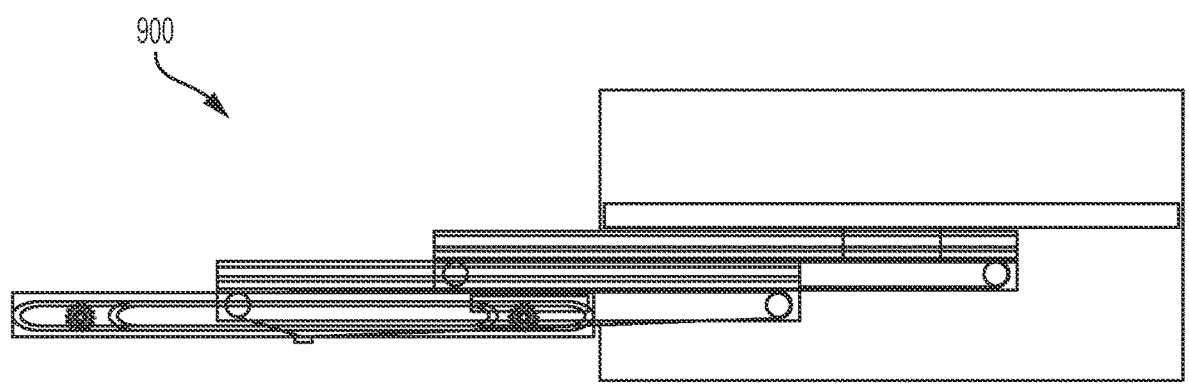
FIG. 33 is a partial side view of a vehicle drive in accordance with aspects of the disclosed embodiment.
Figure 34A:
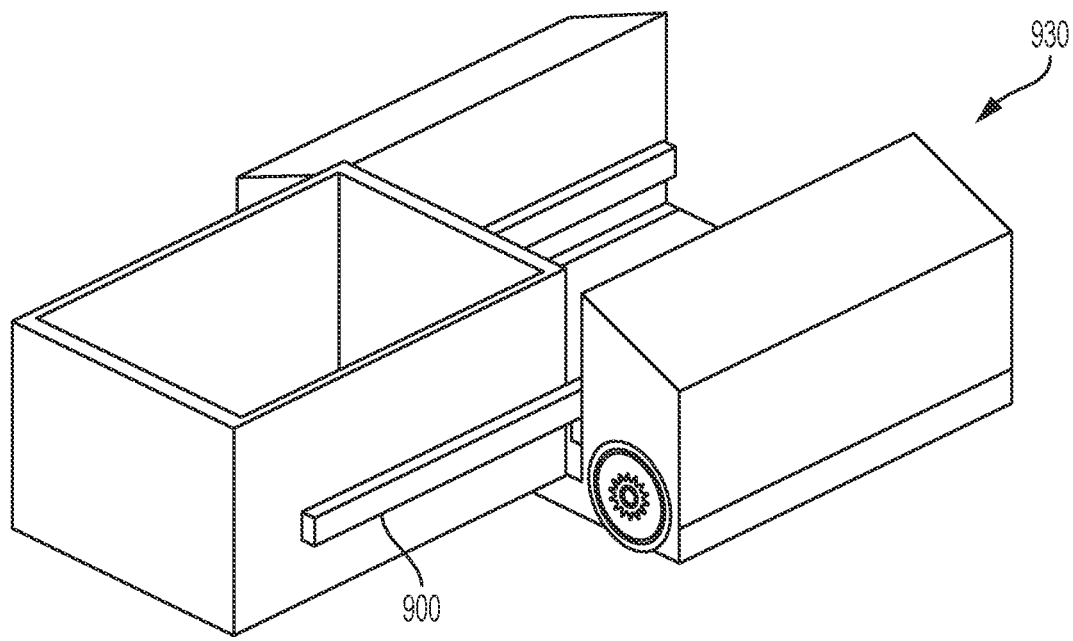
FIG. 34A is an isometric view of a vehicle in accordance with aspects of the disclosed embodiment.
Figure 34B:
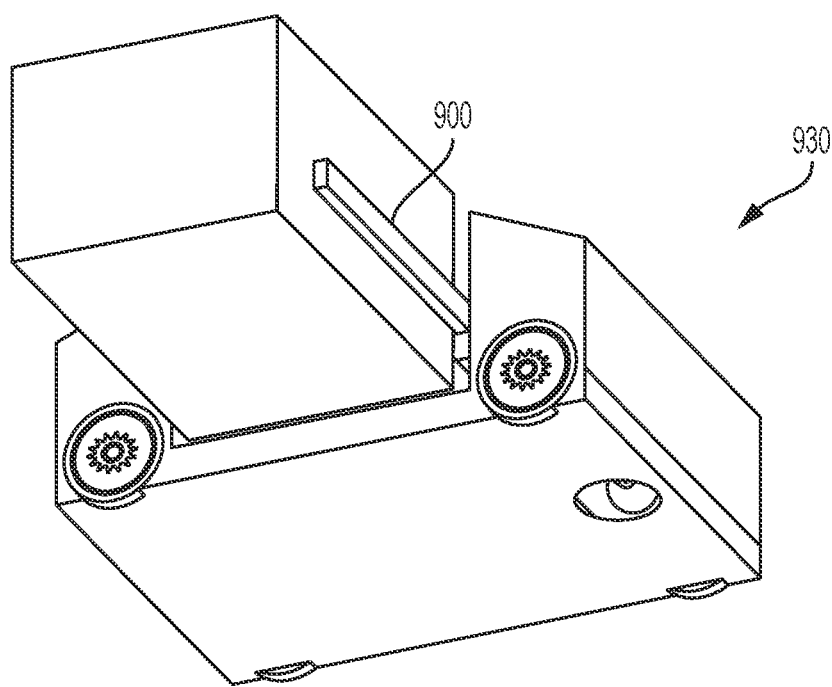
FIG. 34B is an isometric view of a vehicle in accordance with aspects of the disclosed embodiment.

T-Bots are vehicular robots having an approximately rectangular chassis and body panels. By way of example, FIGS. 25A, 25B and 25C show side, top and end views respectively of example vehicle or Tote-Bot "T-Bot" 660. A T-Bot may have an onboard control computer system, including wireless LAN (802.11x) interface for communication with CCS. A T-bot may have sensors as required for location, navigation, payload transfers, etc. FIG. 33 shows a partial side view of vehicle drive or Tote transfer mechanism 900. A T-bot may have a Tote-transfer mechanism 900 by means of which the Bot moves P-Totes or O-Totes between its payload bay and Tote-placement positions in the TSS, at workstations, or at the I/O Interface. As an alternative to Tote sliding, the robotic vehicle may be provided with assembly that permits the Tote to be lifted. Here, FIG. 33 shows a side elevation of a telescoping Tote extend and lift/lower using one drive motor. Slide stages are extended using looped belt or cable anchored on preceding stage. First moving stage follows a chain drive with parallel bearings in elliptical profile to provide lifting and lowering with stage fully extended to left or right. Referring also to FIGS. 34A and 34B, there are shown isometric views of example vehicle 930 with Tote-transfer mechanism 900 extended. FIG. 34A shows the robotic vehicle serving as a P-Bot or O-Bot with linear sliding extension rails that may or may not be lifting. Similarly, FIG. 34B shows a bottom view of a robotic vehicle acting as a P-Bot or O-Bot. A caster wheel on the bottom rear of the robotic vehicle that permits steering on decking, for example, when not in a rack system or on ramp. Here, the robot loads Totes onboard by extending the transfer mechanism to either side of the robot (ambidextrous), engaging the target Tote, and then pulling the Tote onboard by retracting. Further, the Bot unloads Totes by extending the mechanism (which is already engaged with the Tote) to either side to place Tote at target location, releasing the Tote, and then retracting the mechanism. The Bot can either slide the Tote across a supporting surface or lift the Tote prior to the retraction/extension, which would eliminate the need for a supporting surface under the Tote. Referring also to FIGS. 31A and 31B, there are shown side and end views respectively of vehicle 840. Referring also to FIGS. 31C and 31D, there are shown isometric views of vehicle 840. FIG. 31A shows a side elevation of robotic vehicle 840 showing wheels 842, sprockets 844 and Tote 846. Electronics and ultra-capacitors 848 for energy storage are visible in top left. Tote 846 is pushed/pulled into storage using drive belts 848 with flaps 850 shown. FIG. 31B shows an end elevation of the robotic vehicle illustrating two DC servomotors 852 that drive two front wheel/sprocket assemblies. FIG. 31D shows rear wheel/sprocket assemblies that may be driven by belt or alternatively chain from corresponding side front wheel/sprocket assembly. Caster wheel 854 is lower than rear wheel heights permitting the robot to turn using the two front wheels when driving on flat decking. When moving in the "Rack System", the robot rides on the four wheels and the caster wheel hangs freely. Two electric servo traction motors and related drive electronics are provided, one on each side of the vehicle, each with transmissions that drive both fore and aft actuated wheel assemblies on that side. Energy-storage is provided, for example, super-capacitor or battery, and related circuitry for charging; in one aspect, super-capacitors are used and charging is accomplished by means of external charging rail into which charging contacts on the robot are inserted.

Figure 29A:
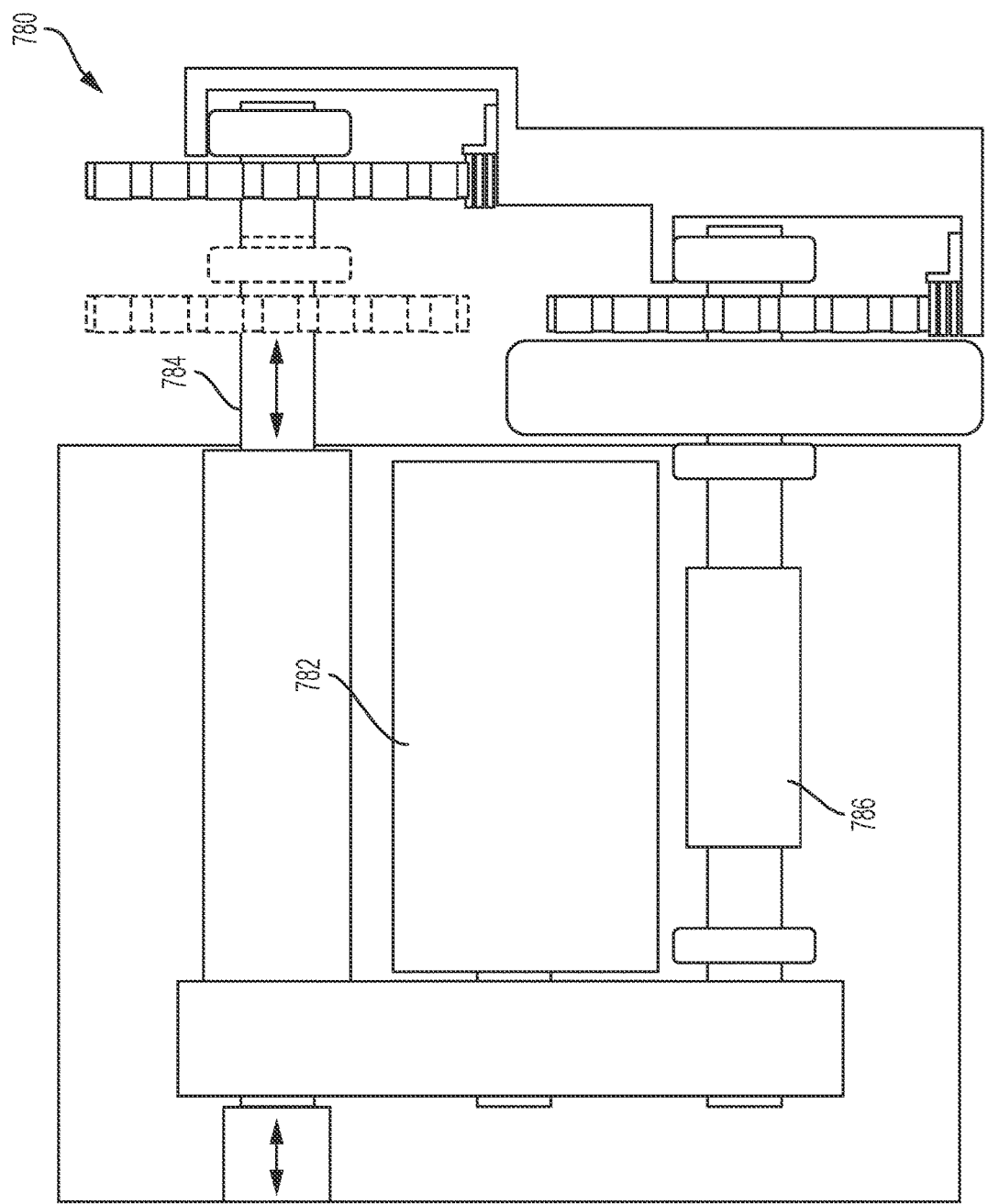
FIG. 29A is a top schematic view of a vehicle drive in accordance with aspects of the disclosed embodiment.
Figure 29B:
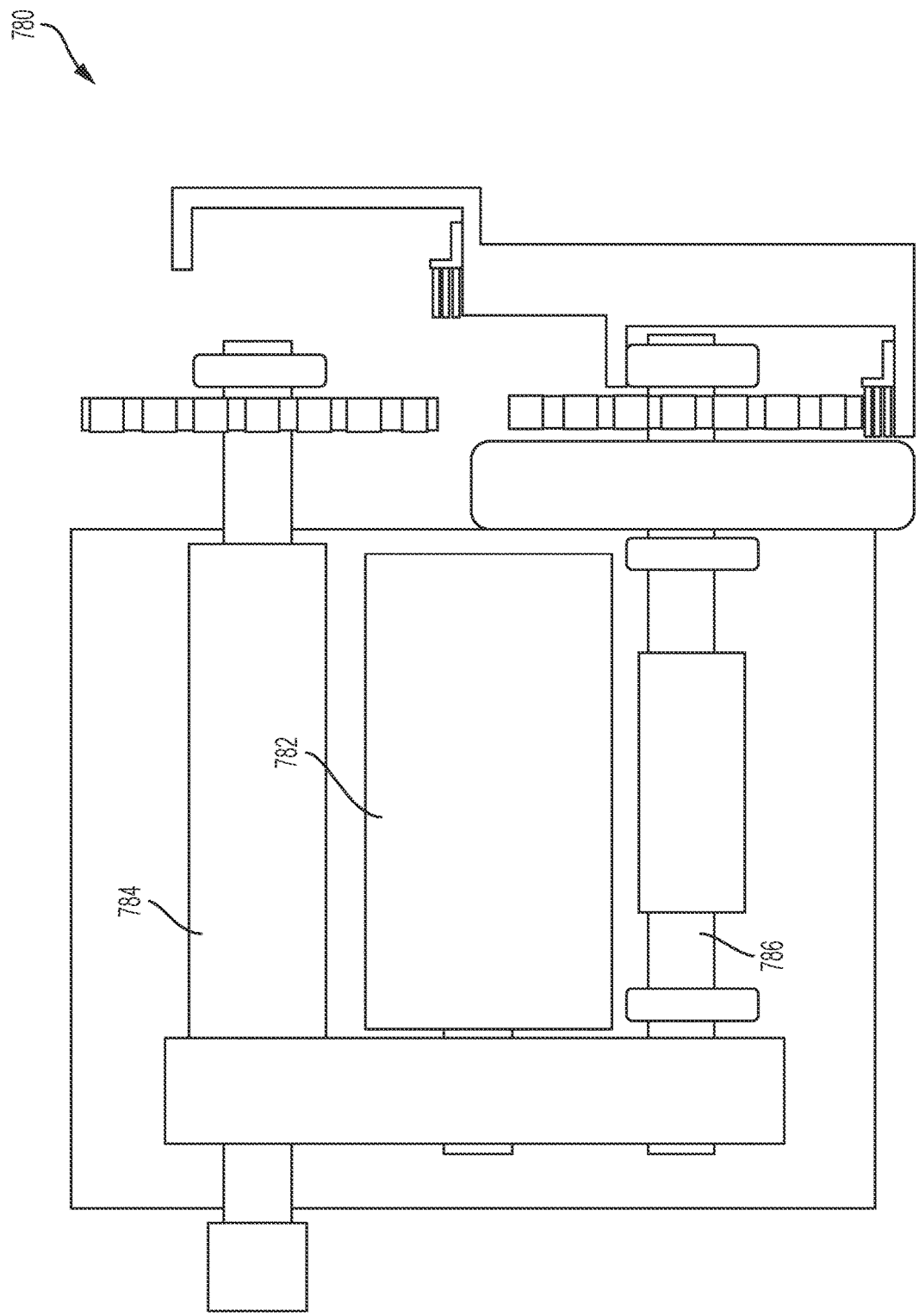
FIG. 29B is a top schematic view of a vehicle drive in accordance with aspects of the disclosed embodiment.
Figure 29C:
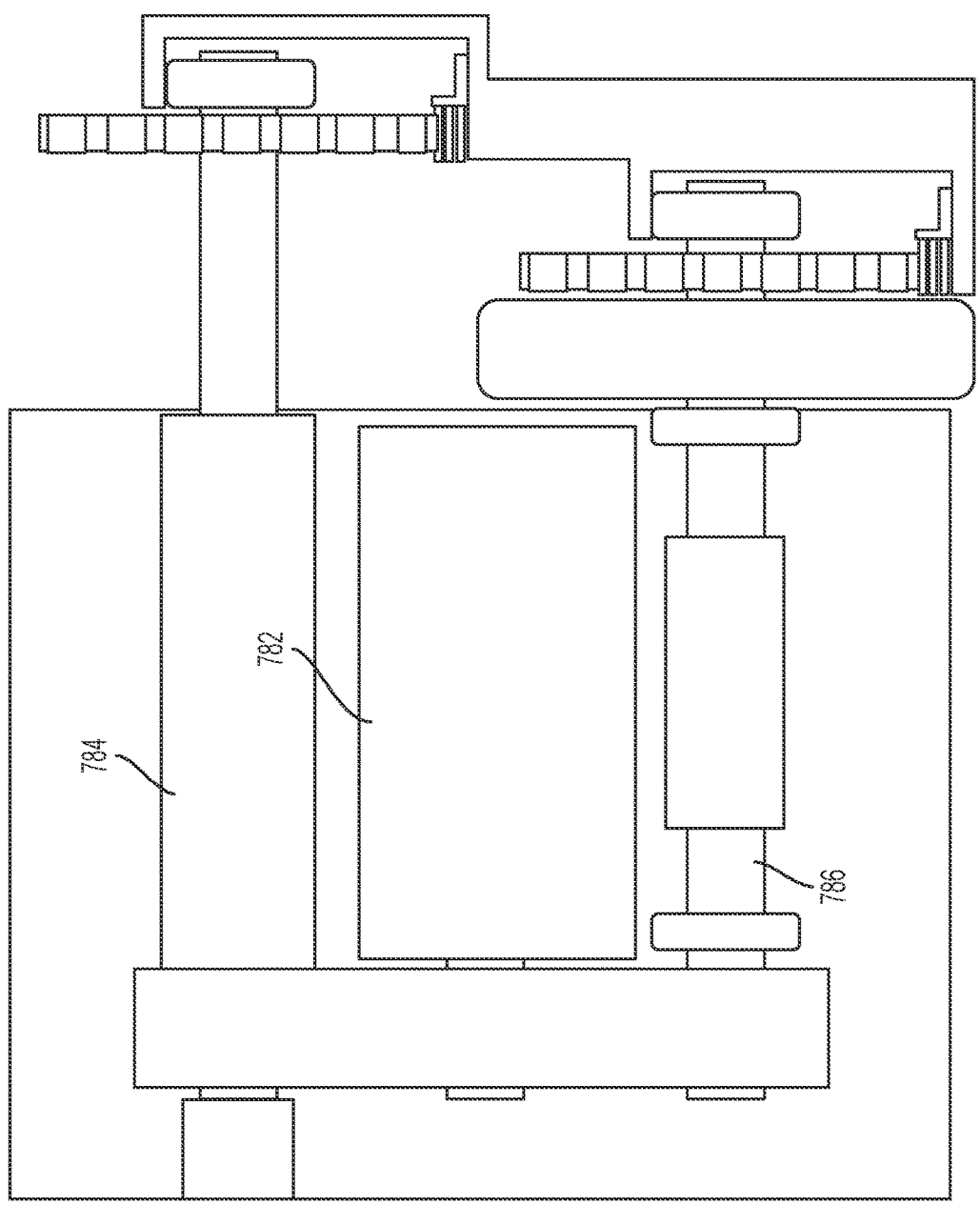
FIG. 29C is a top schematic view of a vehicle drive in accordance with aspects of the disclosed embodiment.
Figure 30A:
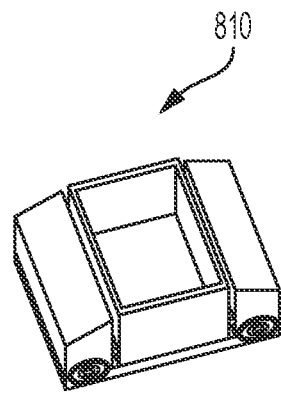
FIG. 30A is an isometric view of a vehicle in accordance with aspects of the disclosed embodiment.
Figure 30B:
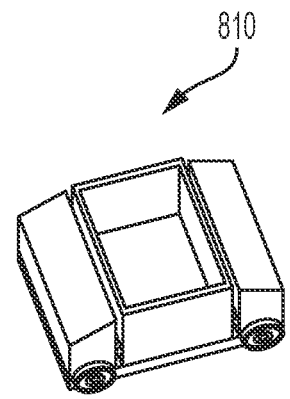
FIG. 30B is an isometric view of a vehicle in accordance with aspects of the disclosed embodiment.
Figure 30C:
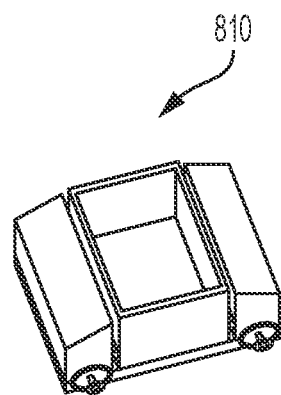
FIG. 30C is an isometric view of a vehicle in accordance with aspects of the disclosed embodiment.
Figure 30D:
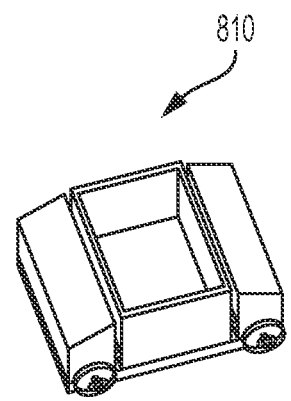
FIG. 30D is an isometric view of a vehicle in accordance with aspects of the disclosed embodiment.
Figure 32:
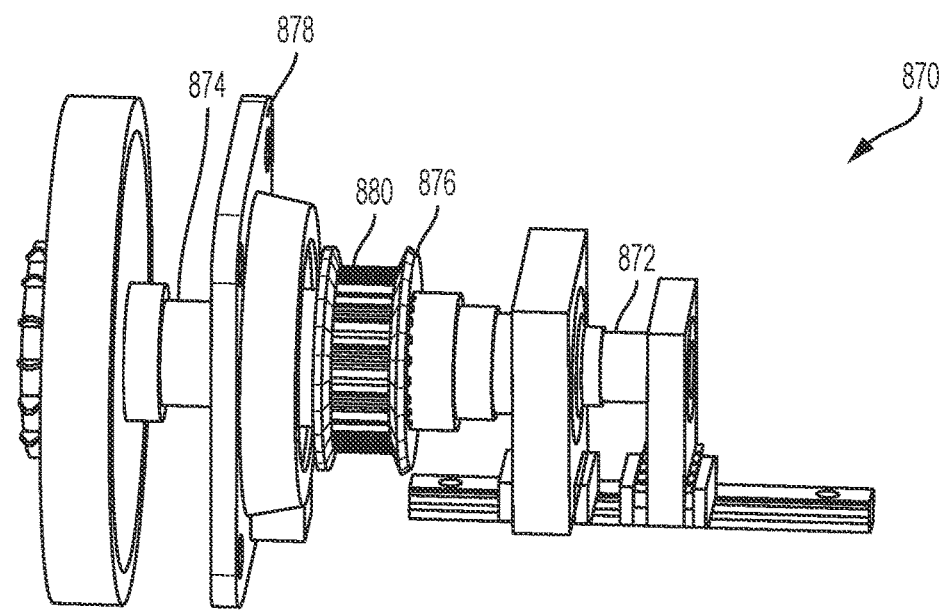
FIG. 32 is a partial isometric view of a vehicle drive in accordance with aspects of the disclosed embodiment.

Referring now to FIG. 32, there is shown a partial isometric view of vehicle drive 870 wheel/sprocket assembly. Here, solid sprocket shaft 872 is contained within hollow wheel shaft 874 contained with hollow drive shaft 876. Shafts are keyed and separated by IGUS polymer bushing to allow axial movement. Drive shaft 876 is supported by flange bearing 878 and driven by toothed pulley 880 shown. End of sprocket and wheel shafts are supported by thrust bearing that is independently extended or retracted. Extension and retraction may be driven by linkage, cable with return spring or pneumatic actuators. Each robotic vehicle has four actuated wheels assemblies, each assembly having an outer cylindrical running wheel, mounted to a hollow drive shaft that is slidably mounted to an actuator. Upon actuation, axle and wheel are extendable and retractable between two wheel positions (retracted position and extended position). Referring now to FIGS. 30A through 30D, there are shown isometric views of example vehicle 810. These figures show four states of the robotic vehicle wheels and sprockets: FIG. 34A shows wheels in, sprockets in, FIG. 34B shows Wheels out, sprockets in, FIG. 34C shows Wheels in, sprockets out, FIG. 34D shows Wheels out, sprockets out. All four states are required as will be described with respect to ramps. When passing through a ramp zone without climbing the state is wheels "out" to engage "outer horizontal track". When entering "up ramp" the state is wheels "out" when approaching "ramp zone", once first wheel passes first ramp sprockets are extended "out", once vehicle starts climbing, wheels are retracted "in" to allow the robotic vehicle to fit between the "outer horizontal tracks". When climbing or descending a ramp the state is Wheels "in", sprockets "out". When exiting an "up ramp" and climbs just above track to be exited the state is extended wheels "out", back down ramp onto "outer horizontal track", back up on "horizontal track", retract sprockets "in" to proceed forward. When entering "down ramp" the state is wheels "out" when approaching ramp zone, once first wheel passes first ramp, sprockets are extended "out". When the robotic vehicle backs up on "outer horizontal track" and climbs ramp backward the wheels are retracted "in" and the robotic vehicle proceeds down the ramp. When exiting a "down ramp" and as the robotic vehicle nears level to exit, the wheels are extended "out" to land on "outer horizontal track". Once on the track, sprockets are retracted "in". Once clear of a "ramp zone" the wheels are retracted "in". Referring also to FIGS. 29A through 29C, there are shown views of example alternate embodiment vehicle drive 780 that has parallel shafts as opposed to concentric shafts. Drive 780 has a drive motor with encoder and break 782, first driven shaft with sprocket and bearing 784 and second driven shaft with sprocket and bearing 786.

Direct Put Workstation Embodiment A

Figure 20A:
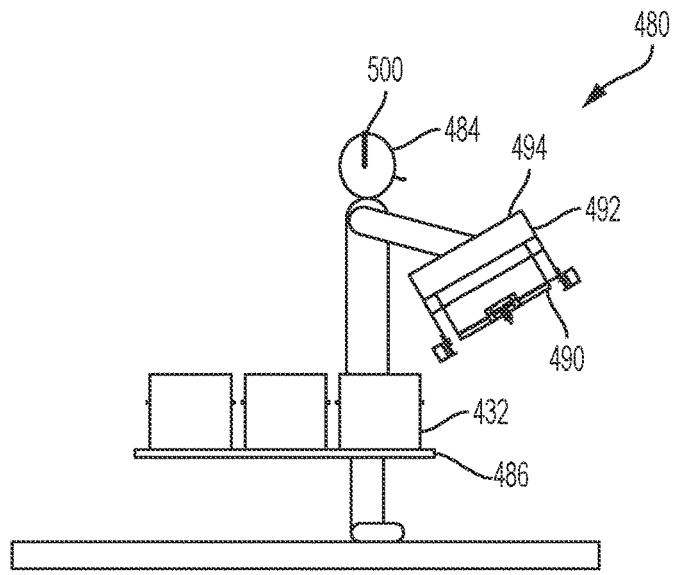
FIG. 20A is an elevation view of an example workstation in accordance with aspects of the disclosed embodiment.
Figure 20B:
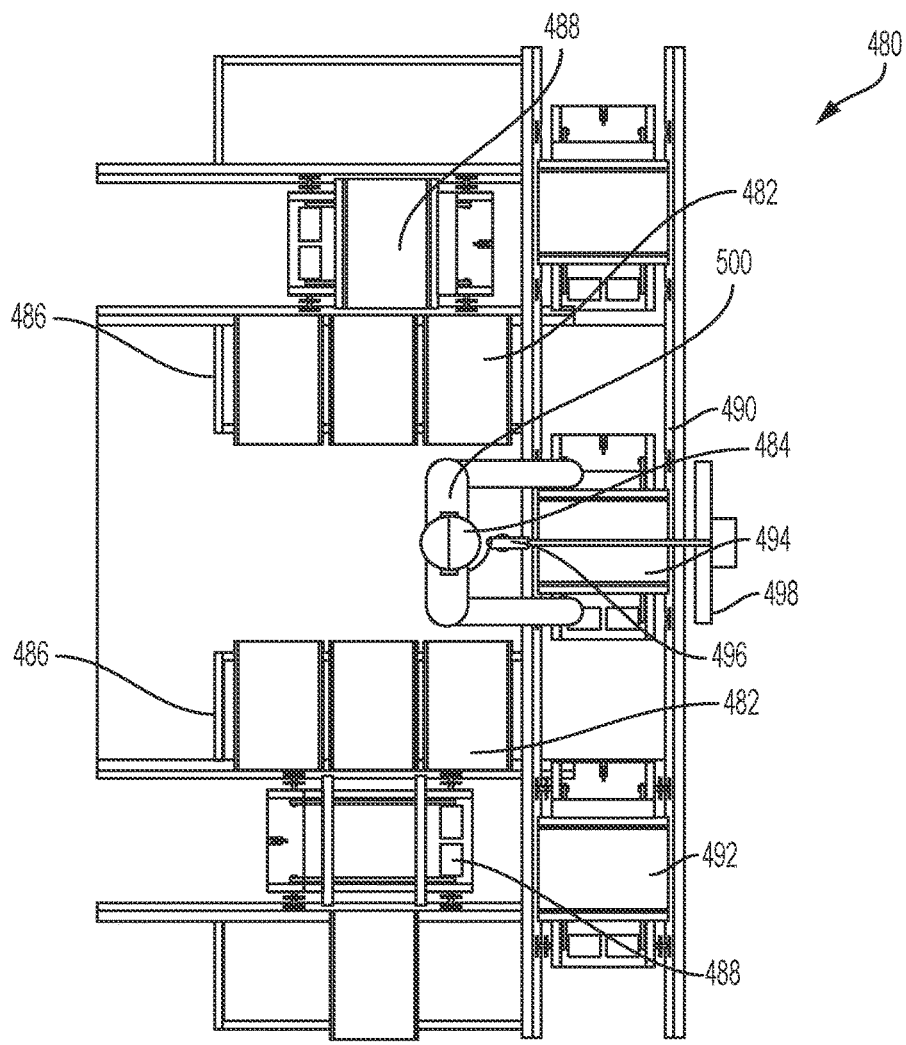
FIG. 20B is a plan view of an example workstation in accordance with aspects of the disclosed embodiment.

Referring now to FIGS. 20A and 20B, there are shown elevation and plan views respectively of an example workstation 480. Direct put workstation 480 is a Picker-to-Tote Multi-order workstation design in which multiple O-Totes 482 being filled concurrently remain stationary on holding racks 486 and picker 484 moves to the target Tote on each put. This embodiment may be simpler than Workstation Embodiment B described below, but it requires more movement on the part of the picker, which may result in a lower throughput.

The workstation subsystem has Tote-holding racks 486. There is one Tote-holding rack on each side of picker 484, immediately next to picker, with rear access by O-Bots 488. Empty O-Totes are placed on Holding Racks by O-Bots, remain there until filled, and are then removed by O-Bots. A P-Bot Tilt-Fixture 490 is shown as a tracked fixture immediately in front of picker 484. Here, P-Bots 492 sequentially drive into fixture 490 from one side, stop in position for picker to remove designated number of eaches from onboard P-Tote, then drive out of fixture from the other side and exit Workstation. The fixture tilts Bot roughly 30° towards picker 484 to make it easier for picker 484 to reach and remove eaches from the onboard P-Tote 494. Tilt-Fixture and possibly queue lane leading into fixture are equipped with charging rail so that Bots can recharge super-capacitors on each trip to a workstation. A Machine-Vision Subsystem ("MVS") 496 is shown mounted directly above the Bot Tilt-Fixture where there is a camera assembly (including illumination as required) that looks down on the P-Tote in pick position, and above each Holding Rack are camera assemblies that look down on the O-Totes on the rack. The cameras are connected to vision-computer that is programmed to follow the movements of the picker's hands and analyze the contents of target Totes both before and after the pick/put transaction in order to validate pick accuracy. Here, pickers may wear gloves that facilitate the process. Target illuminators are shown co-mounted with each camera assembly is a light source, for example, a laser or spotlight that can be aimed at any location within any Tote within the camera's field of view, the purpose of which is to assist the operator in accurately executing the pick/put by illuminating both the location of the target SKU to be picked and the target location within the target O-Tote into which the picked each is to be put. A picker interface is shown where the Workstation Control Computer is able to receive information from and provide information to the picker: 1) Display Screen 498 that shows the remaining number of eaches required to be picked from the target P-Tote, which is decremented with each pick/put cycle; 2) Headset 500 worn by picker, which includes earphone speakers whereby he/she can receive synthesized speech input (and optionally listen to background music) and a microphone whereby he/she can provide input to the computer via its voice-recognition capability. A Workstation Control Computer ("WCC"), manages all processes and activities associated with picking eaches at the workstation. This can be either a "logical" computer running as part of CSS or alternately a separate physical computer that is dedicated to controlling one or more workstations and communicates with the CSS over a network (wired or wireless). The WCC interfaces to picker, Machine-vision subsystem, Target Illuminators, and to P-Bots when they are operating under WCC control; when a P-Bot arrive at entry to workstation queue, CCS passes control of that Bot to WCC.

The workstation process may have the following steps starting with a P-Bot already in Tilt-Fixture and O-Totes on Holding Racks that are repeated recursively until there are no more order-lines to be filled at workstation. WCC activates two Target Illuminators to illuminate both pick and put locations. MVS captures "before" image of P-Tote and target O-Totes. WCC displays on screen both the number of eaches remaining to be picked for current order-line and a graphic showing target O-Tote, and synthesizes voice input of same information through headphones. MVS tracks motion of picker's hands during a pick by means of camera looking down on P-Tote and verifies that picker is picking correct SKU; when hand clears pick zone with picked each: MVS captures "after" image of P-Tote and verifies by comparison with "before" image that at least one each has been removed from P-Tote; WCC decrements the display on screen of number of eaches to be picked; If picked each is final one for current SKU transaction, WCS commands P-Bot to drive off of Tilt-Fixture, the next P-Bot to drive onto Tilt-Fixture, and all other P-Bots in picking queue to advance one Bot Position; the indexing of P-Bots thus occurs while picker is putting into O-Tote, so the picker should never have to wait for the arrival of a P-Bot. MVS tracks motion of picker's hands during a put by means of camera looking down on target O-Tote and verifies that picker puts to correct location in correct O-Tote; when empty hand clears put zone, MVS captures "after" image of P-Tote and verifies by comparison with "before" image that at least one each has been put into O-Tote.

Direct Put Workstation Embodiment B

Figure 21A:
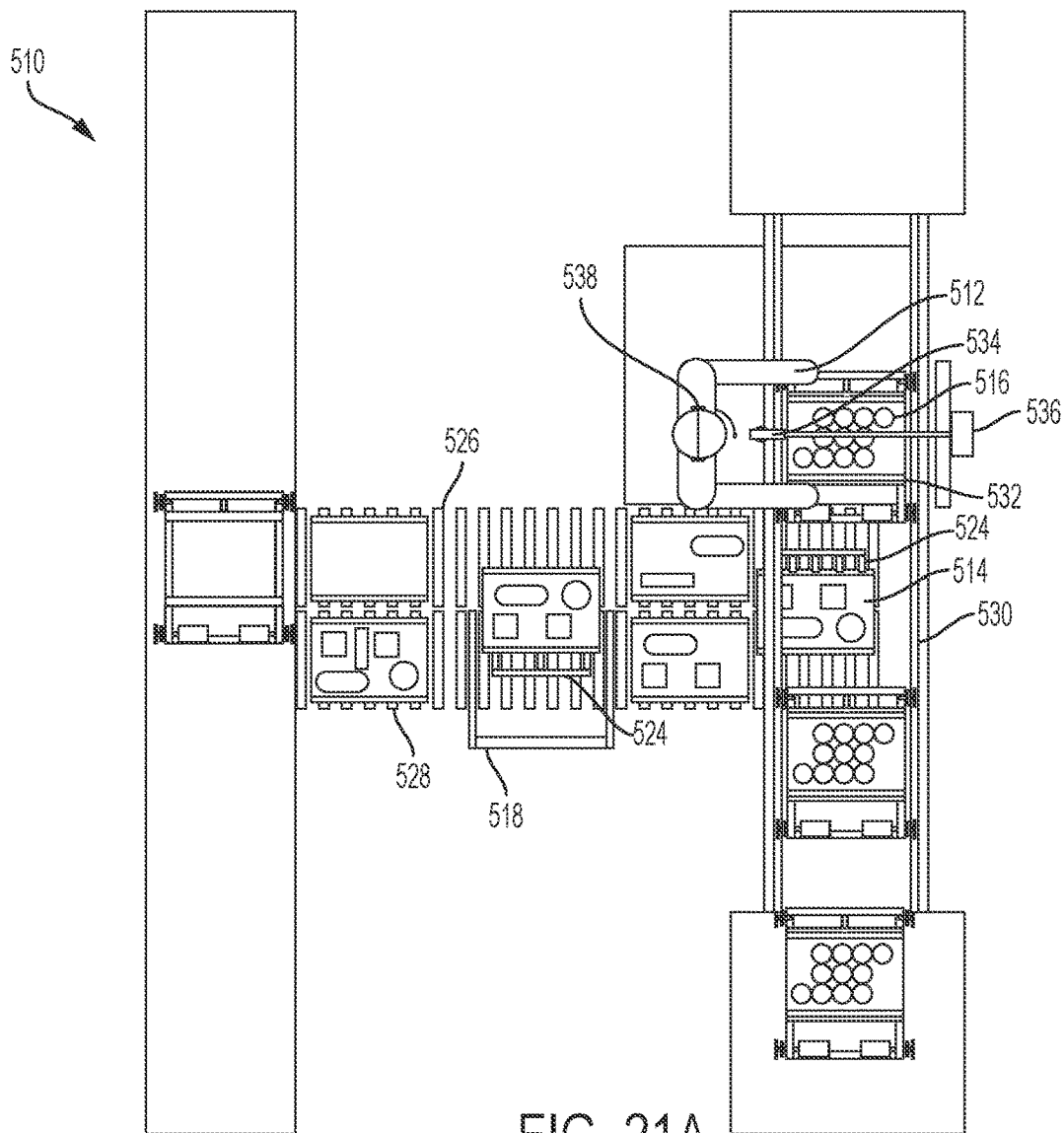
FIG. 21A is a plan view of an example workstation in accordance with aspects of the disclosed embodiment.
Figure 21B:
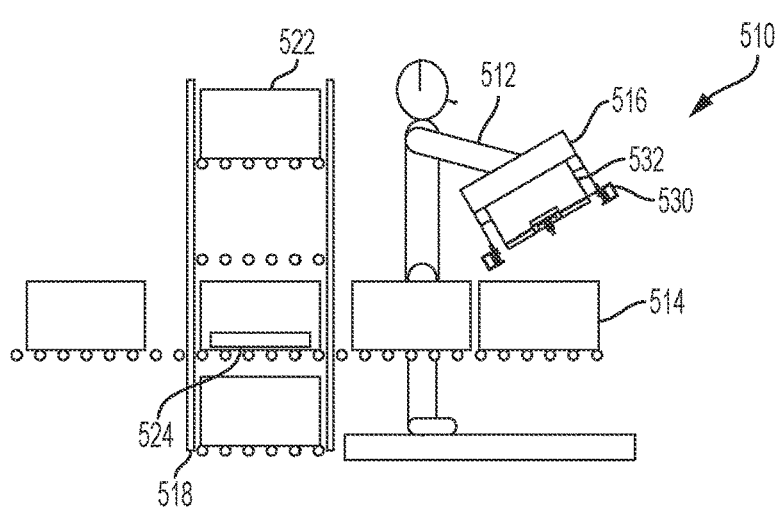
FIG. 21B is an elevation view of an example workstation in accordance with aspects of the disclosed embodiment.

Referring now to FIGS. 21A and 21B, there are shown plan and elevation views respectively of an example Tote-to-Picker Multi-order workstation 510. Tote-to-Picker Multi-order workstation 510 is shown where the picker 512 remains stationary and O-Totes 514 are presented to the picker in a sequence that matches the sequence of arriving P-Totes 516, so that there is always only one target O-Tote in put position. In comparison to Embodiment A, this design has mechanisms that move the O-Totes, but requires significantly less movement on the part of the picker and may enables higher picker throughput.

The workstation subsystem has Tote-Handling Subsystem ("THS") 518 that moves O-Totes into put position in sequence to receive picked eaches from P-Totes, including segmented conveyor 520, a vertical resequencer 522, and two cross-transfers 524. Two lanes of segmented roller conveyor—a "Put Lane" 526 and a "Return Lane" 528 are shown. Put Lane is located right next to picker and consists of four segments that move Totes towards and past picker. "Input segment" is where O-Bots place empty O-Totes, and each new Tote remains on the segment until moving forward to the "Ready Segment". "Ready Segment" holds next O-Tote to receive eaches after all puts into current O-Tote on "Put Segment" have completed. "Put Segment" holds target O-Tote into which picker places picked eaches. "Take-Away Segment" moves O-Totes away from "Put Segment"; each Tote is then immediately pushed by Cross-Transfer-1 onto Return Lane of conveyor. Return Lane is located on opposite side of Put Lane from picker and consists of three logical segments that convey O-Totes in opposite direction to that of Put Lane. "Return Segment" is a logical segment comprising two physical conveyor segments that move O-Totes towards and then onto Resequencer Segment; the first segment receives O-Totes from Put Lane via Tote-Pusher-1 and the second segment acts as a buffer for the Re-Sequencing Segment. "Resequencer Segment" is a logical position in Return Lane that is occupied at different times by any of the physical segments within the Vertical Resequencer. "Output Segment" receives outgoing filled O-Totes from Resequencer Segment and holds for pick-up by O-Bot. Vertical Resequencer is an assembly comprising a motorized frame to which are mounted multiple physical conveyor-segment subassemblies; it moves vertically so that any of its physical conveyor segments can be aligned with the Return Conveyor Lane and serve as the Resequencer Segment. Cross-Transfers are shown where there are two mechanisms that transfer O-Totes between the two conveyor lanes, e.g. by pushing them. Cross-Transfer-1 moves Totes from the Take-Away segment of the Put Lane onto the Return Segment of the Return Lane. Cross-Transfer-2 moves Totes from the Re-Sequencing Segment of the Return Lane onto the Ready Segment of the Put Lane. P-Bot Tilt-Fixture 530 is shown as a tracked fixture immediately in front of picker. P-Bots 532 sequentially drive into fixture from one side, stop in position for picker to remove designated number of eaches from onboard P-Tote, then drive out of fixture from the other side and exit Workstation. Fixture tilts Bot roughly 30° towards picker to make it easier for picker to reach and remove eaches from the onboard P-Tote. Tilt-Fixture and queue lane leading into fixture are equipped with charging rail so that Bots can recharge super-capacitors on each trip to a workstation. Machine-Vision Subsystem ("MVS") 534 is mounted directly above the Bot Tilt-Fixture is a camera assembly (including illumination as required) that looks down on the P-Tote 516 in pick position, and mounted above the Put Segment is a camera assembly that looks down on the target O-Tote in put position. All cameras are connected to vision-computer that is programmed to follow the movements of the picker's hands and analyze the contents of target Totes both before and after the pick/put transaction. Target Illuminators are Co-mounted with each camera assembly is a light source, for example, laser or spotlight that can be aimed at any location within any Tote within the camera's field of view, the purpose of which is to assist the operator in accurately executing the pick/put by illuminating both the location of the target SKU to be picked and the target location within the target O-Tote into which the picked each is to be put. Picker Interface is provided where the Workstation Control Computer is able to receive information from and provide information to the picker: 1) Display Screen 536

The workstation process may have the following steps starting with P-Bot already in Tilt-Fixture and O-Totes within the THS, including a target O-Tote in put position) that are repeated recursively until there are no more order-lines to be filled at workstation. WCC activates two Target Illuminators to illuminate both pick and put locations. MVS captures "before" image of P-Tote and target O-Totes. WCC displays on screen the number of eaches remaining to be picked for current order-line and synthesizes voice input of same information through headphones. MVS tracks motion of picker's hands during a pick by means of camera looking down on P-Tote and verifies that picker is picking correct SKU; when hand clears pick zone with picked each. MVS captures "after" image of P-Tote and verifies by comparison with "before" image that at least one each has been removed from P-Tote. WCC decrements the display on screen of number of eaches to be picked. If this was final pick for the current SKU transaction, WCS commands P-Bot to drive off of Tilt-Fixture, the next P-Bot to drive onto Tilt-Fixture, and all other P-Bots in picking queue to advance one Bot Position; the indexing of P-Bots thus occurs while picker is putting into O-Tote, so the picker should never have to wait for the arrival of a P-Bot. MVS tracks motion of picker's hands during a put by means of camera looking down on target O-Tote and verifies that picker puts to correct location in target O-Tote; when empty hand clears put zone. MVS captures "after" image of P-Tote and verifies by comparison with "before" image that at least one each has been put into O-Tote. If this was the final put for the current target O-Tote on this cycle, i.e. next put is for a different O-Tote, the WCC causes the THS to perform a multi-Tote, multi-step move sequence. Current target O-Tote is moved forward from Put Segment to Take-Away segment, and simultaneously O-Tote on Ready Segment is moved forward to take its place as current target O-Tote on Put Segment. Either Cross-Transfer-2 moves an O-Tote from Resequencer Segment onto Ready Segment, or an empty O-Tote on Input Segment is moved onto Ready Segment. Cross-Transfer-1 moves previous target O-Tote from Take-Away segment across to receiving portion of Return Segment. O-Tote on buffer portion of Return Segment is moved forward onto now-empty Resequencer Segment (and if the Tote has received its last each, its movement continues onto Output Segment, where it awaits pick-up by O-Bot). Previous target O-Tote moves from receiving portion of Return Segment to the buffer portion of that segment. Vertical Resequencer moves vertically as necessary to position one of its conveyor segments as the Resequencer Segment, either a segment the next O-Tote to be placed on the Ready Segment or, if the next ready-Tote is to be the empty O-Tote coming from the Input Segment, an empty segment.

Figure 23A:
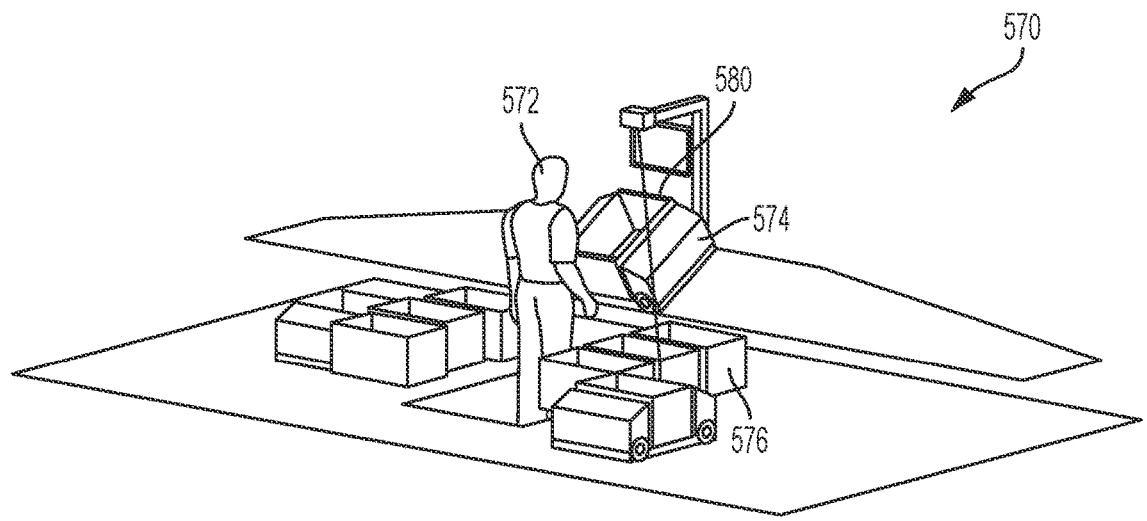
FIG. 23A is an isometric schematic view of an example workstation in accordance with aspects of the disclosed embodiment.
Figure 23B:
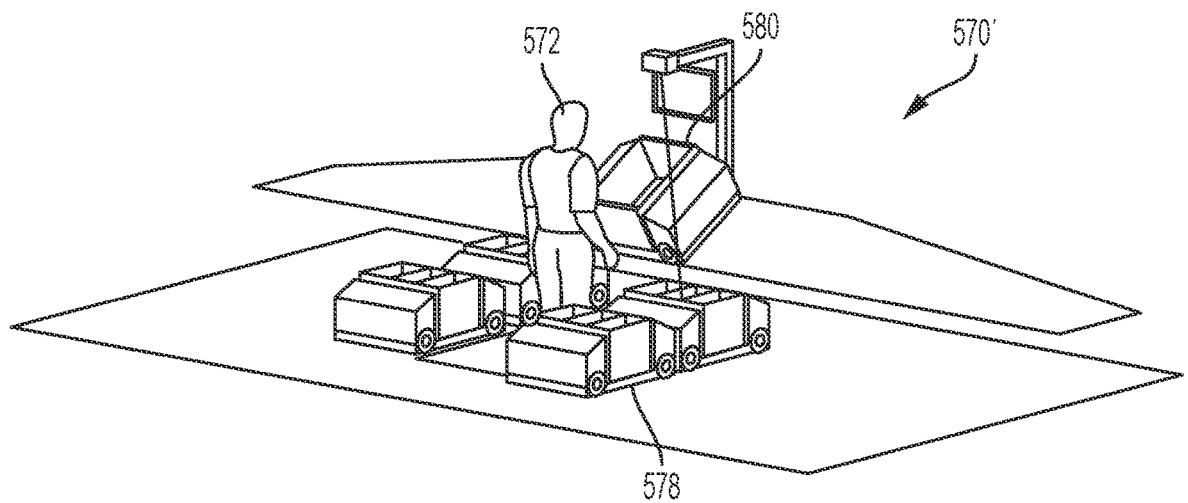
FIG. 23B is an isometric schematic view of an example workstation in accordance with aspects of the disclosed embodiment.
Figure 23C:
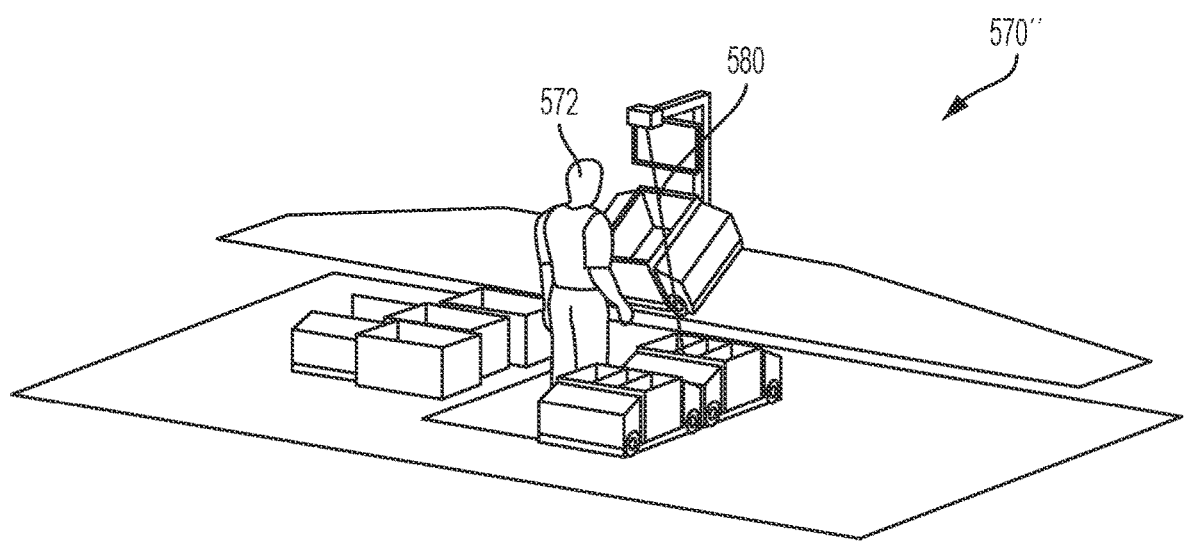
FIG. 23C is an isometric schematic view of an example workstation in accordance with aspects of the disclosed embodiment.

Referring now to FIGS. 23A, 23B and 23C, there are shown isometric schematic views respectively of example workstations 570, 570' and 570". FIG. 23A shows an exemplary Direct Put Workstation where Operator 572 transfers from Product Bot 574 in front of them into Order Totes 576 adjacent to them. Order Totes are deposited and retrieved by Order Bots once Products are deposited. Alternative is for Operator to place Product directly into Order Tote that remains on Order Bot. Matching the Product Bot and Order Tote/Order Bot as the Workstation requires synchronized dispatching. FIG. 23B shows Operator 572 with Each Bots 578 to transfer Products into. This Indirect Put Workstation allows continuous flow of Product Bots and Each Bots in asynchronous operation. The Each Bots travel to the Order Totes locations and deposit the Products. Each Bots may make three or more Order Tote deliveries using their compartments. As an alternative to the Each-Bot, the Operator may place the Product into an Each-Drone that delivers the Product to the Order Tote. Finally, an Each-Drone may automatically pick from the retrieved Product Tote and transport the Product directly to the Order Tote. FIG. 23C shows a mixed direct and indirect put Workstation. Here, robotic vehicles enable Workstations to be flexibly configured and operated on demand. In the preceding, light beams 580 are shown above Operator 572 that directs pick and place locations. Additionally, a high resolution camera with machine vision software is located above the Workstation to ensure that all Operator transfers are correct.

Figure 24A:
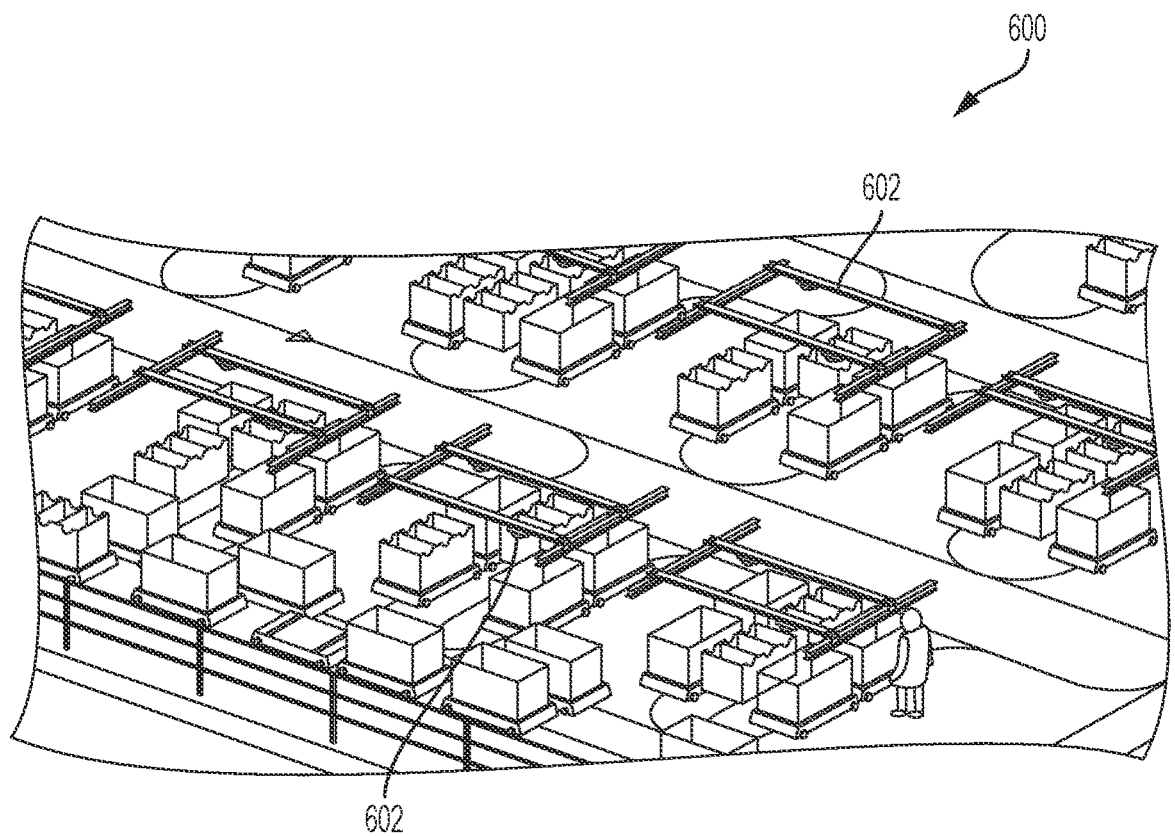
FIG. 24A is an isometric view of example workstations in accordance with aspects of the disclosed embodiment.
Figure 24B:
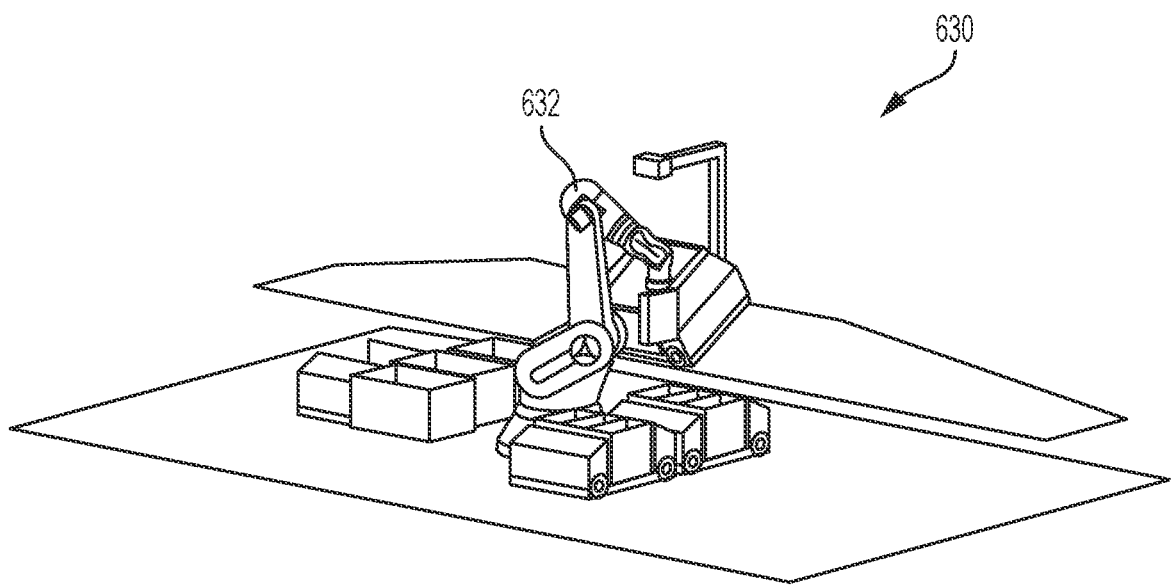
FIG. 24B is an isometric view of example workstations in accordance with aspects of the disclosed embodiment.

Referring now to FIG. 24A there is shown an isometric schematic view of example automated workstation 600. Referring also to FIG. 24B there is shown an isometric schematic view of example automated workstation 630. As an alternate embodiment, human workstations can be replaced with automated Product Bot to Order Tote (Direct Put) or Product Bot to Each Bot (Indirect Put) Workstations. FIG. 24A shows dual gantry system 602 for speed and reliability. Each gantry had multiple grippers, e.g. vacuum, articulated and conforming to enable each picking a wide variety of Products. Alternatively, Workstations can be configured for each types. FIG. 24B shows a 6-axis articulated robot 632 that may be used as an alternative to the gantries shown.

Input/Output "I/O" Interface

The I/O interface is the point of entry for Totes coming into the system (filled P-Totes and empty O-Totes) and the point of exit for outgoing Totes (empty P-Totes and filled O-Totes). T-Bots transport all Totes between the I/O Interface and their origination or destination locations within the system. In one aspect, this is also a subsystem having a plurality of bidirectional belted conveyor spurs. Each spur connects to a single unidirectional input/output conveyor line that connects the system to the rest of the facility within which it operates; incoming Totes flow in on this conveyor line, and outgoing Totes flow out on the same conveyor in the same direction of flow. Each Conveyor Spur further comprises two physical segments of belted conveyor. An inbound segment which holds incoming Totes, located furthest from the input/output conveyor line (and closest to the Transit Deck of the I/O Interface); and an outbound segment, which holds outgoing Totes momentarily before moving them onto the I/O conveyor line. A plurality of Bot Spurs are shown in which T-Bots occupy when executing a Tote-exchange transaction. Each bot spur is constructed using a pair of Bot tracks like those used in ramp modules. The number of Bot Spurs is one less than the number of Conveyor Spurs, and a Bot Spur is positioned between adjacent Conveyor Spurs, so there is a Conveyor Spur accessible to a T-Bot on each side of each Bot Spur, and further each Conveyor Spur except for the outer two can be accessed from two Bot Spurs.

The process of Totes flowing through the I/O interface may have the following steps. Each incoming Tote is transferred from the input/output conveyor line onto an empty Conveyor Spur, initially arriving on the Outbound Segment immediately adjacent to the conveyor line and then being immediately transferred to the Inbound Segment where it awaits pickup by a T-Bot. Each T-Bot arriving at the I/O Interface (with an outgoing Tote onboard) enters an empty Bot Spur adjacent to a Conveyor Spur with a target incoming Tote already waiting on the Inbound Segment. The T-Bot first goes the far end of the Bot Spur, past the waiting inbound Tote, and offloads the outgoing Tote is has onboard onto the Outbound Segment of the Conveyor Spur. The T-Bot then immediately moves in the reverse direction to align with the target incoming Tote, transfers it onboard, departs the Bot Spur and transports the Tote to its destination location (typically a storage location in the TSS, but occasionally a Picking Workstation). The outgoing Tote that the T-Bot has been placed onto the Outbound Segment of the Conveyor Spur is transferred at the first opportunity onto the input/output conveyor line and conveyed away from the system.

Indirect-Put System

With an indirect put system, eaches are transferred from product-Totes not into O-Totes but to robots, called Each-Bots ("E-Bots"); E-Bots are then transported by T-Bots to an Order Loading Structure ("OLS") where they transfer the picked eaches into the target O-Totes. The fundamental benefit of decoupling the pick from the put in this fashion is to eliminate workstation specificity for fulfillment, i.e. any order-line can be picked at any workstation. One consequence is that there is considerably less contention by P-Bots for access to workstations compared to the Direct-Put System, since Bots can take a "path of least resistance", for example by going to the nearest workstation and/or to the workstation with the fewest number of P-Bots in the picking queue. An even more important advantage, though, is that order-completion latency can be dramatically reduced by assigning the multiple order-lines assigned to a given O-Tote to multiple T-Bots for fulfillment in parallel at multiple workstations. It will be possible, then, for the system to fill a large order in a matter of just a few minutes. The primary disadvantages of this embodiment in comparison to Direct-Put is that it requires more capital investment, and packing densities will not be as high, which could increase transportation cost if orders must be delivered by truck to customers.

The system includes the same elements/subsystems as the Direct-Put Embodiment as described above plus two additional ones. "E-Bots", "portable" robots, each of which has an external dimensional envelope identical to an O-Tote so that it can received picked eaches at Picker Workstations just like O-Totes, hold those eaches while during transported by T-Bots, and transfer the picked eaches into target O-Totes; E-bots depend on T-Bots and conveyor for movement. A T-Bot carrying an E-Bot is referred to as an "ET-Bot".

Indirect Put System Components

P-Totes, O-Totes and TSS may be the same as with Direct-Put system described above.

Order-Loading Structure ("OLS")

Order-Loading Structure is a rack structure designed for holding O-Totes for filling by E-Bots and facilitating the transfer of eaches by E-Bots into those O-Totes; in the preferred embodiment the OLS is a special section of the TSS. Operating processes, all of which are controlled directly or indirectly by the CCS may be as follows. Flow of P-Totes to Picking Workstations may be the same as described with the Direct-Put system above. Flow of O-Totes To/From OLS and Shipment to Customer are as follows. Since the OLS is only used for loading O-Totes and not for their intermediate storage, it is kept perpetually filled with O-Totes that are either empty, waiting to be filled, or are in the process of being filled, with the exception of Tote positions intentionally left empty for use in swapping Totes. Filled O-Totes are generally removed immediately once they have received all planned eaches. The CSS initializes the OLS by causing O-Bots to fill it with O-Totes to its maximum planned capacity, leaving a sufficient number of empty Tote positions such that there will always be an empty Tote position reasonably close to any target filled O-Tote where an O-Bot can place an empty O-Tote on the same trip when removing said filled O-Tote. O-Totes are placed on racks only on alternate levels such that directly above each Tote is empty space for an E-Bot to occupy when transferring eaches into the O-Tote. Any empty O-Tote in the OLS can be assigned to receive any designated set of order-lines, so the CCS generally seeks to spread the workload evenly by always selecting an O-Tote on the least-busy loading lane whenever a new O-Tote needs to be activated. Once the filling of an active O-Tote is complete, an O-Bot is assigned to remove the O-Tote from the OLS and transport it either to the I/O Interface for immediate delivery to the customer or into the TS S for intermediate storage. Immediately prior to traveling to the location of the target O-Tote, the O-Bot typically picks up an empty O-Tote either from the I/O Interface or from the TSS and places it into the OLS, effectively replacing the filled O-Tote with an empty O-Tote to await activation. If the removed O-Tote is going into TSS storage, the subsequent shipment of the O-Tote to the customer is the same as with the Direct-Put system described above. If the removed O-Tote is going to the I/O Interface for immediate discharge from the system and delivery to the customer, the Bot Spur to be used for the output is based on the next inbound Tote to be handled by the same T-Bot. For pick at Workstations, P-Bots present P-Totes to human or robotic pickers, who remove one or more eaches from every P-Tote and place in designated E-Bots (described in more detail below). For put at OLS, T-Bot picks up E-Bot containing eaches at workstation and travels to OLS so that E-Bot can transfer eaches into one or more O-Totes. For each such transfer: a. ET-Bot enters an aisle adjacent to the target O-Tote (which may be on either end of the Tote), and one loading-level above the level of the O-Tote. ET-Bot travels to location immediately above target O-Tote and aligns to center the E-Bot on target O-Tote below; b. The T-Bot extends the E-Bot onto the rack so that the Each Handler containing the eaches to be transferred is directly above the target O-Tote; c. The E-Bot then causes the Each Handler to transfer the contained eaches into the target O-Tote. Depending on embodiment of Each Handler, this may be an uncontrolled drop of the eaches or a gentle, controlled drop; and d. After transfer is complete, ET-Bot retracts the E-Bot back onboard and proceeds either to next target O-Tote or back to a workstation to receive more eaches. Picking-Stock Replenishment and P-Tote Recycling occur similar as with the Direct-Put system described above.

The OLS can be a completely separate structure, but may be provided to dedicate specific aisles in the TSS to serve as the OLS, thereby avoiding the need for additional Transit Decks. OLS aisles may be constructed identically to normal storage aisles except that they can be much shorter in length and the shelf is typically not as deep, preferably holding only one Tote between adjacent aisles instead of at least two Totes as with normal Tote storage TSS. The reason for this difference is to give ET-Bots access to both sides of target O-Totes instead of only one side (except Totes on the two outermost shelf-modules), which will significantly reduce potential blocking delays. The term "loading level" is used to refer to each discrete elevation at which Bots can operate, rather than "storage level". O-Bots place O-Totes on alternate levels in the OLS, for example on the odd-numbered loading levels (numbering from bottom to top), and ET-Bots operate on the higher alternate levels, e.g. even-numbered loading levels.

BTS and T-Bots may be the same as with Direct-Put system described above.

E-Bots, Each Handlers & Each Manipulator

Figure 26A:
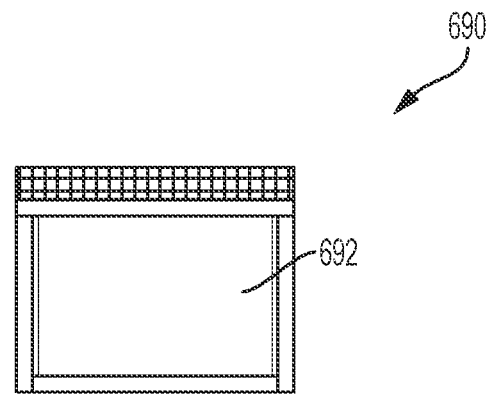
FIG. 26A is an end view of a module in accordance with aspects of the disclosed embodiment.
Figure 26B:
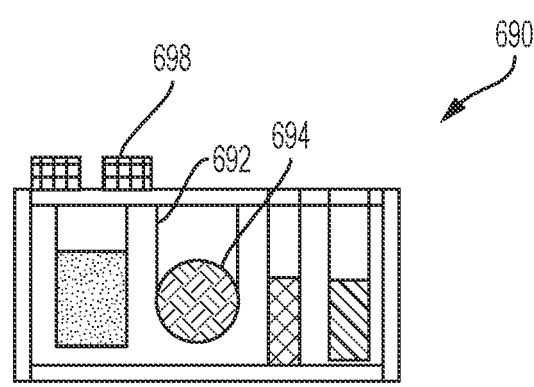
FIG. 26B is a side view of a module in accordance with aspects of the disclosed embodiment.
Figure 26C:
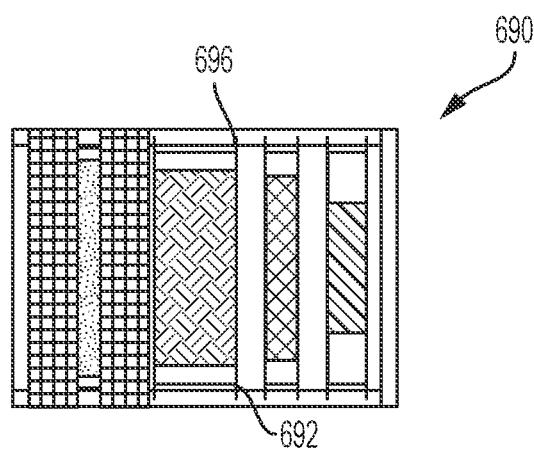
FIG. 26C is a top view of a module in accordance with aspects of the disclosed embodiment.
Figure 27A:
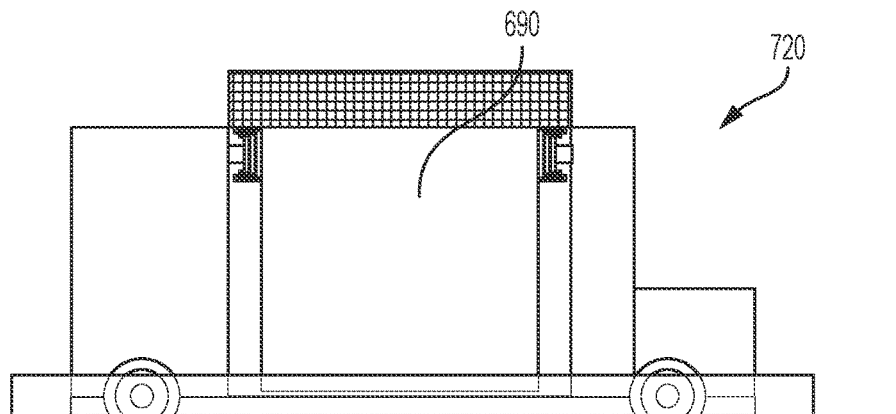
FIG. 27A is a side view of a vehicle in accordance with aspects of the disclosed embodiment.
Figure 27B:
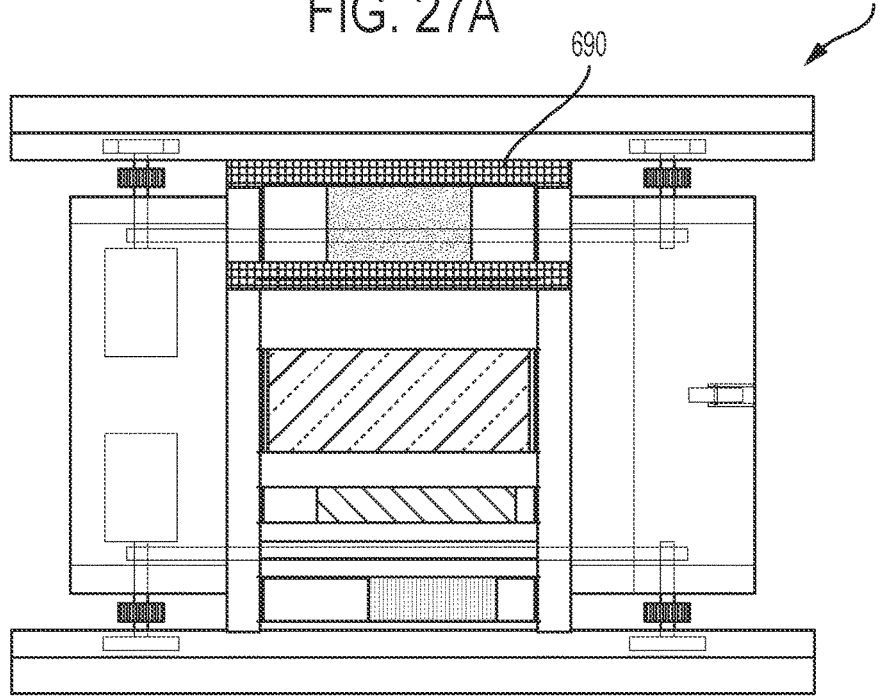
FIG. 27B is a top view of a vehicle in accordance with aspects of the disclosed embodiment.
Figure 27C:
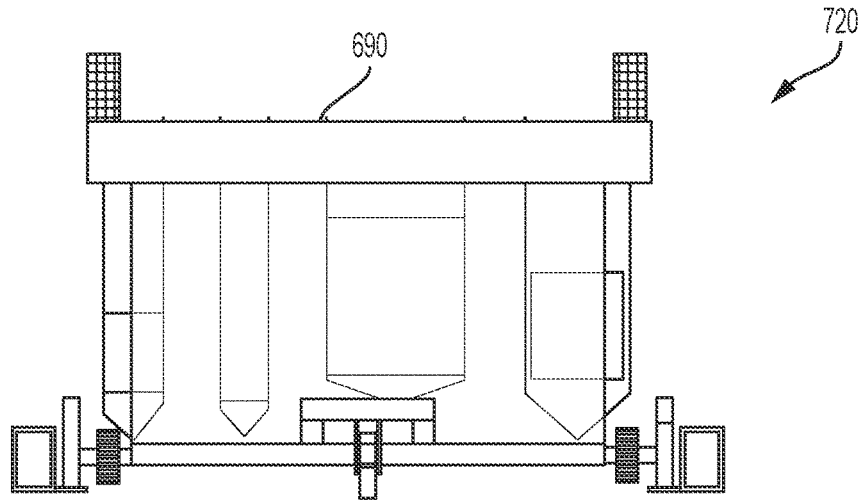
FIG. 27C is an end view of a vehicle in accordance with aspects of the disclosed embodiment.

Referring now to FIGS. 26A, 26B and 26C, there are shown end, side and top views respectively of example Each-Bot "E-Bot" module 690. Referring also to FIGS. 27A, 27B and 27C, there are shown side, top and end views respectively of example vehicle 720 with E-Bot module 690. E-Bots may be an autonomous transfer mechanism, with physical dimensions identical to an O-Tote, which receives eaches, holds them during transport by a T-Bot, and then transfers the eaches into target O-Totes. The E-bot may have a structural frame with same width and length of an O-Tote and height such that the total height of the Bot is the maximum that can operate within a given system. A control microcomputer may be provided that controls operations of the robot, with wireless network interface by means of which it communicates with CCS. Rechargeable batteries that power operation of the robot may be provided. When the E-Bot is not in use, it may be stored in a section of the OLS that provides electrical power to recharge the batteries. An array of sensors necessary to performing its required functions may be provided. A plurality of Each-Handlers 693, each of which receives and holds eaches, and under control of the robot's control microcomputer transfers eaches to O-Totes. All eaches placed into in a given Each-Handler may be of the same product and associated with a single order-line, but multiple Each-Handlers can be used for a single multi-unit order-line if necessary. Two embodiments of Each-Handlers are described.

Fixed-Width Each-Handler

Figure 35A:
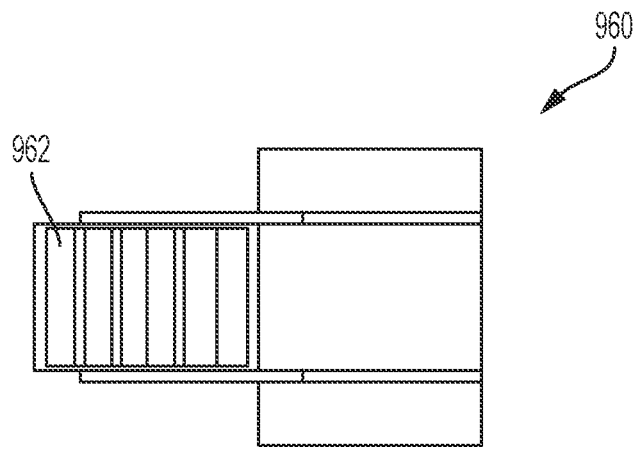
FIG. 35A is a top view of a vehicle in accordance with aspects of the disclosed embodiment.
Figure 35B:
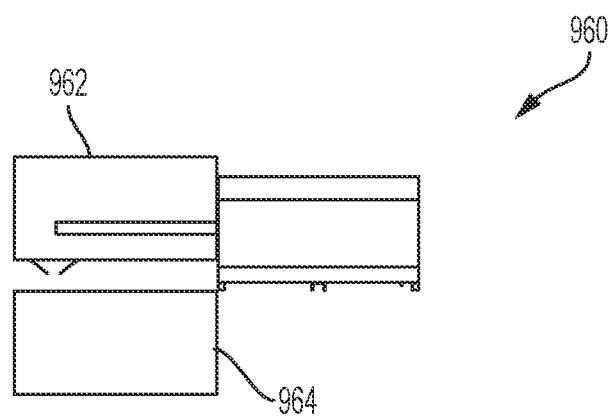
FIG. 35B is a partial side view of a vehicle in accordance with aspects of the disclosed embodiment.
Figure 36A:
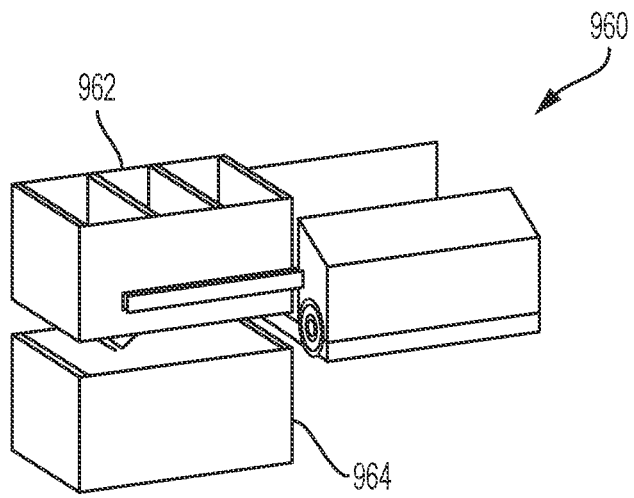
FIG. 36A is an isometric view of a vehicle in accordance with aspects of the disclosed embodiment.
Figure 36B:
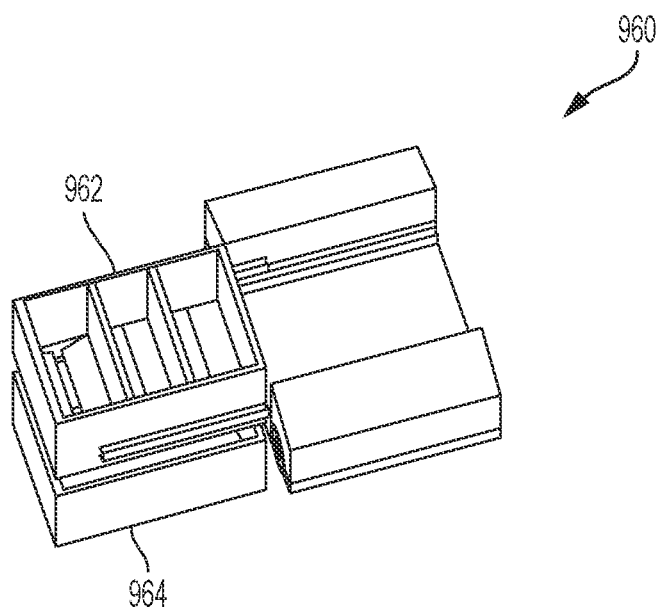
FIG. 36B is an isometric view of a vehicle in accordance with aspects of the disclosed embodiment.

Referring now to FIGS. 35A, 35B, 36A and 36B, there are shown isometric views of example robotic vehicle 960 with fixed width each handlers 963. FIG. 35A shows a plan view of a robotic vehicle serving as an Each Bot. The robotic vehicle has retrieved an Each Module 962 to allow it to transform into an Each Bot. This Each Module 962 has three compartments with actuated bottom hopper doors that enable "eaches" to be deposited into Order Totes 964. FIG. 35B shows a side elevation of Each Bot with Order Tote 964 below. The hopper doors are shown open to allow product to be deposited from Each Module 962 to Order Tote 964. FIG. 36A shows another view of Each Module 962 above Order Tote 964. FIG. 36B shows Each Module 962 with hopper doors visible from above. As opposed to hopper doors, a retractable fabric material may be used to lower the Product into the Order Tote as will be described below. Fixed-width Each-Handler consists of multiple compartments the width of which cannot be changed to conform to eaches placed into it. The floor of each compartment can be opened by an actuator in order to let the contained eaches drop out of the bottom and into the target O-Tote, for example, like bomb bay doors on an airplane. This embodiment is mechanically simple and suitable in applications where the range of item dimensions is sufficiently limited that all eaches can fit into the fixed widths of the Each-Handlers, and where the products being handled are sufficiently non-fragile that dropping eaches from a maximum height greater than the height of an O-Tote will not damage either the dropped each or eaches it strikes inside the O-Tote.

Adjustable-Width Each-Handler

Referring now to FIGS. 26-28, adjustable-width each-handler consists of a plurality of flexible Load Carriers 692 each of which, in combination with a pair of Manipulators, can accommodate a wide variation in the dimensions of eaches, and can perform a gentle transfer of eaches with little or no dropping. The Load-Carrier 692 resembles a hanging file-folder in form. It is constructed from a rectangular Folder Sheet of flexible material, the width of which is less than the width of an O-Tote, said sheet being attached at each end to a rigid Hanging Bar. Each Hanging Bar is actually comprised of two separable segments: a Hangar Segment 694 that is the full width of the E-Bot and provides Load Carrier's hanging means, and a Handle Segment 696 that attaches to and detaches from to the Hangar Segment. The Handle Segment is permanently attached to the Folder Sheet and is the same width as the Folder Sheet. The receiving and carrying function of the Load Carrier is accomplished by bringing the two Hanging Bars together and the ends placed onto opposing sides of the E-Bots frame. The flexible Folder Sheet then folds to form a pouch into which eaches can be placed, in the same way materials can be placed into a hanging file within a drawer.

Each Manipulator

Each Manipulator 698 includes a device for linear motion by which the Manipulator can move back and forth along the length of the E-Bot above the hanging Load Carriers. A device for grasping and handling the Handle Segment of Hanging Bars is shown. A device for rotational motion, such as a motorized roller, attached by cable to the handling device, by means of which the Manipulator can lower and raise a Load Carrier. The two Manipulators act in concert under control of the Control Microcomputer adjust the width the opening of each Load Carrier by performing the following steps as seen in FIGS. 28A-28F: a) Each Manipulator positions itself over one of the Load Carrier's Hanging Bars and grasps the Handle Segment without detaching it from the Hanging Segment; b) One or both Manipulators move linearly along the length of the E-Bot, thereby moving one or both Hanging Bars, reducing the size of the Load Carrier opening by moving towards each other and increasing the opening by moving away from each other. The two Manipulators act in concert under control of the Control Microcomputer transfer the eaches from a Load Carrier to an O-Tote by performing the following steps: a) Each Manipulator positions itself over one of the Load Carrier's Hanging Bars, grasps the Handle Segment and detaches it from the Hanging Segment; b) both manipulators move towards each other enough to create clearance from the Hangar Segments; c) both manipulators activate the rotational-motion means to lower the Load Carrier into the Tote until the bottom is just above the highest object underneath in the Tote; d) then one Manipulator reverses direction of rotation while the other Manipulator continues the rotation in the same direction, and the Manipulators move slowly towards each other. This causes one end of the Folder Sheet to retract upwards and the other to continue moving down, and the eaches contained in the folder will slide along the material of the Folder Sheet and may tumble in place; e) eventually the Manipulators will come together and the Folder Sheet will become fully vertical, and at some point the contained eaches will fall out of the Load Carrier and into the O-Tote; f) at that point the Manipulator handling the lower end of the Load Carrier and the now-empty Load Carrier will be retracted all the way back up to the Manipulators.

Indirect Put Workstation

Figure 22A:
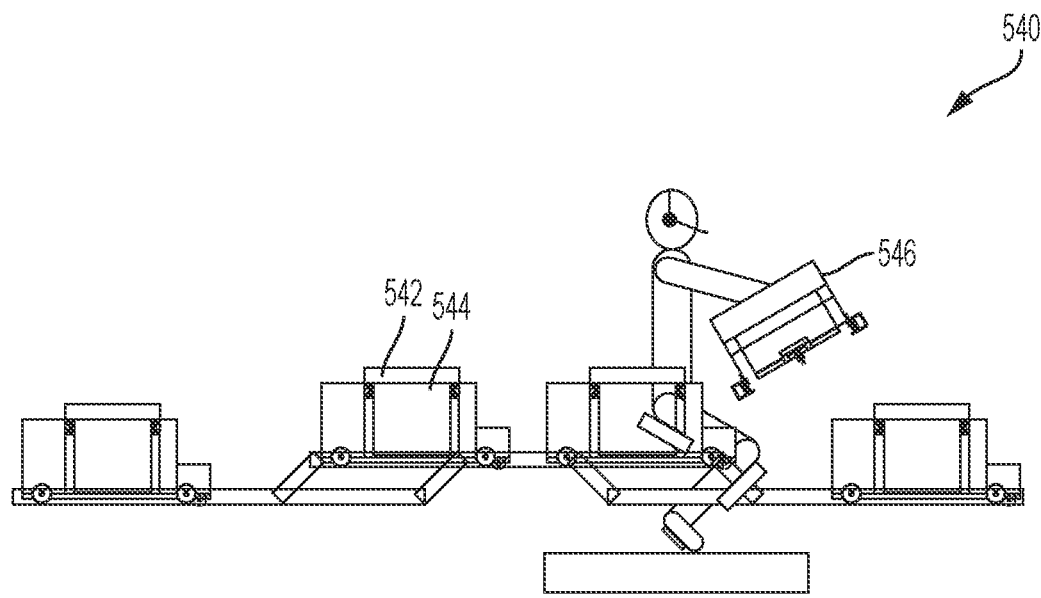
FIG. 22A is an elevation view of an example workstation in accordance with aspects of the disclosed embodiment.
Figure 22B:
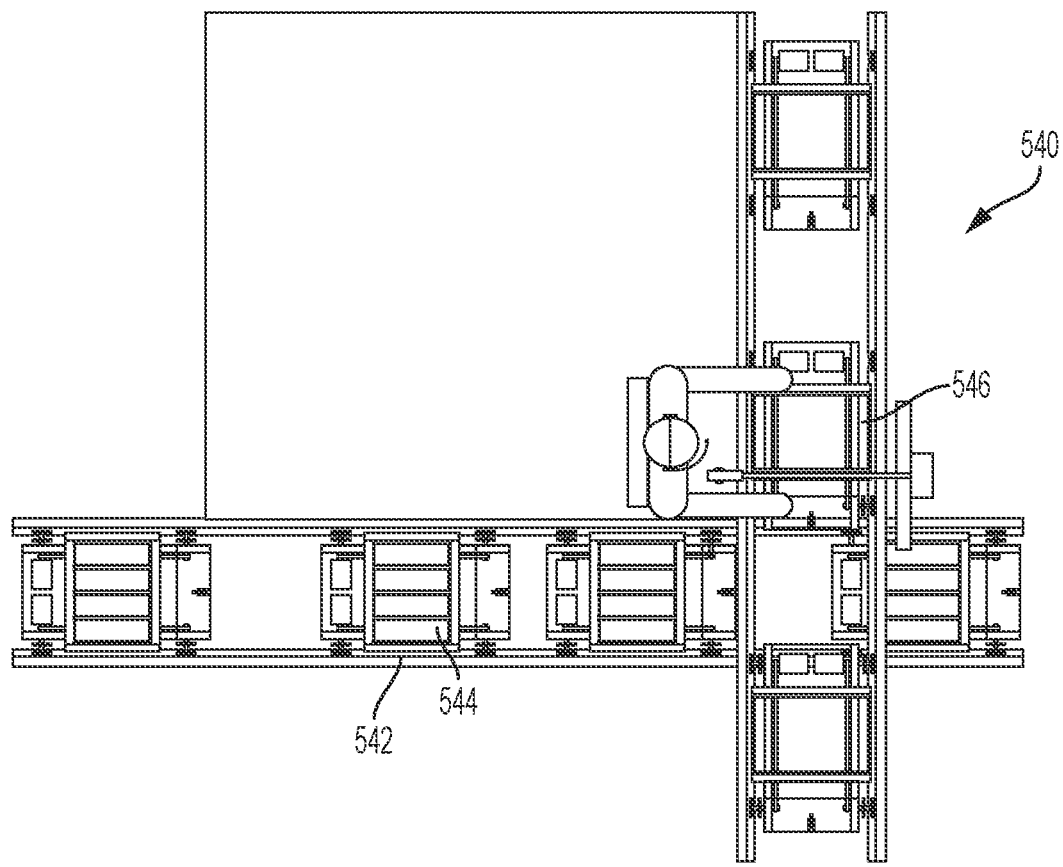
FIG. 22B is a plan view of an example workstation in accordance with aspects of the disclosed embodiment.

Referring now to FIGS. 22A and 22B, there are shown elevation and plan views respectively of an example workstation 540. Either workstation embodiment can be used, for example, direct put workstation A or B, although the Tote-to-picker version B may provide higher picker throughput and may take advantage of the higher P-Bot throughput made possible because of the "any order-line at any workstation" capability. The basic operation of the workstation with either embodiment is essentially the same as with the Direct-Put Embodiment described above, with the following differences related to the fact that E-Bots are not linked to any specific customer orders until eaches are placed into a Load Carrier to fill a specific order-line. The assignment of order-lines to E-Bots and Load Carriers may be essentially arbitrary, so picked eaches will typically be placed into Load Carriers in sequential order, i.e. an E-Bot 542 will have each of its Load Carrier 544 filled one after another from each arriving P-Bot until all Load Carriers are filled and the E-Bot is ready for 546 pickup and transport to the OLS by a T-Bot. In advance of the arrival of each P-Bot at the workstation, the target E-Bot will have been instructed by the CSS to set each Load Carrier opening to a certain width based on the dimensions of the each(es) to be placed into that Load Carrier. The Vertical Resequencer of Workstation Embodiment B may be essentially inactive during picking operation under the Indirect-Put model. Empty E-Bots are placed on the Input Segment of the Put Conveyor Line upon arrival at the workstation and simply advances through that line until all Load Carriers have been filled at the Put Segment, at which point it is transferred to the Return Conveyor line and passes directly through the Resequence Segment to the Output Segment where it awaits pickup by a T-Bot.

I/O Interface may be the same as with Direct-Put system described above.

System Topologies

There are several variations in system topology that can be used for a given system depending primarily on the peak throughput requirements. Going from simplest to most complex these include:

Single-Ended, Bidirectional Flow

Workstations and Bot Transit Structures are located at only one end of the TSS. Since T-Bots enter and exit aisles at only one end, travel within aisles is by definition bidirectional. Since the points of entry and exit at workstation levels are potential bottlenecks, the number of aisles and number of workstation levels are factors in determining the throughput capacity of a system. That is, the more aisles and the more workstation levels there are in a system, the greater the throughput capacity of that system will be. This topology is suitable for applications with low to medium throughput requirements.

Double-Ended, Bidirectional Flow

Workstations and Bot Transit Structures are located at both ends of the TSS with bidirectional travel within aisles. By doubling the number of aisle entry/exit points and the number of workstation levels (assuming they are equal on each side), this topology is suitable for applications with high throughput. It also has the potential for improving bot productivity because travel times can often be optimized by giving priority of assignment to Bots located closest to target SKU locations. This configuration offers a natural path of expansion in applications where volume is growing over time.

Double-Ended, Unidirectional Flow

In applications requiring extremely high throughput, this topology optimizes the flow of Bot traffic by having all Bots travel in the same direction. Bots always enter aisles at one end of the TSS, run the full length of the aisle and exit at the other end of the aisle, creating a circular flow that supports an extremely high rate of throughput. Moreover, at the exit end of the aisle, the movement of T-Bots onto the Transit Deck can be synchronized so Bots are staged at the aisle exits momentarily until a group of them move simultaneously onto the Transit Deck and create a stream of Bots flowing to the workstations located to the side of the TSS. Bots must travel longer distances than with the previous topologies because every trip has a distance of at least twice the length of the aisle, but this flow pattern avoids the massive congestion and deadlocks that can occur with bidirectional travel at extremely high throughput volumes.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. Alternatively, a spirit level that exploits the buoyancy of an air bubble and its tendency to go vertically upwards may be used to test for horizontality by aligning the bubble centrally between two lines of the level gage. Said differently, in accordance with the generally known concept of the flat earth approximation, the earth is notionally a large (effectively infinite) flat surface with a gravitational field at a right angle to the surface. In such a framework, the earth's surface is considered to be horizontal and any line or plane approximately parallel to the earth surface is also considered horizontal. The direction of vertical is considered along a line or plane that is normal or orthogonal to the horizontal plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. An automated storage-and-retrieval system, comprising:
   a multi-level storage structure comprising a plurality of racks separated by aisles, each rack comprising a set of horizontal container supports configured to store containers, which hold objects therein, at a plurality of storage levels within each aisle, and a set of inclined or vertical tracks disposed between and connecting levels of the multi-level storage structure;
   a first set of vertical load bearing features on a first inclined or vertical track of the set of inclined or vertical tracks; and
   a second set of vertical load bearing features on a second inclined or vertical track of the set of inclined or vertical tracks spaced from the first set of vertical load bearing features across an aisle of the aisles, the first and second sets of vertical load bearing features facing each other across the aisle along a third axis perpendicular to a first axis;
   a mobile robot configured to transport a selected one of the containers to and from the multilevel storage structure, the mobile robot comprising:
      a caster wheel;
      a first traction drive and a second traction drive, the first traction drive comprises a first motor and a first wheel driven by the first motor, and the second traction drive comprises a second motor and a second wheel driven by the second motor, wherein the first and second wheels and the caster wheel are configured to contact a common horizontal surface supporting the mobile robot permitting steering and configured to turn the robot using the first wheel and the second wheel while on the horizontal surface with the first traction drive controlled to drive fore or aft the first wheel and the second traction drive controlled to drive fore and/or aft the second wheel while operating on the horizontal surface including enabling the mobile robot to move across the horizontal surface; and a first sprocket or pinion on a first side of the mobile robot, and a second sprocket or pinion on a second side of the mobile robot opposite the first side, the first and second sprockets or pinions having a retracted position and an extended position;

the first and second sprockets or pinions having axes of rotation parallel to the first axis and configured to selectively engage at two positions of the set of inclined or vertical tracks of the multi-level storage structure while in the extended position, and propel the mobile robot along a second axis along the inclined or vertical tracks of the multi-level storage structure;

first and second passive followers having axes of rotation parallel to the first axis, the first and second passive followers configured to engage the first and second tracks of the set of inclined or vertical tracks;

wherein the first and second sprockets or pinions are configured to engage the first and second sets of vertical load bearing features by moving oppositely of each other along the third axis.

2. The automated storage-and-retrieval system of claim 1, wherein the vertical load bearing features comprise teeth of a rack gear.

3. The automated storage-and-retrieval system of claim 1, wherein the vertical load bearing features comprise a chain.

4. The automated storage-and-retrieval system of claim 1, further comprising a workstation configured to allow a picker to transfer one or more objects to and/or from individual ones of the containers at the workstation.

5. The automated storage-and-retrieval system of claim 1, wherein the mobile robot selectively engages the set of inclined or vertical tracks by moving the first and second sprockets or pinions from a non-engaging position to an engaging position, wherein the non-engaging position is the retracted position, and the engaging position is the extended position.

6. The automated storage-and-retrieval system of claim 5, wherein the set of inclined or vertical tracks are positioned adjacent to a set of horizontal tracks, and wherein the mobile robot extends the first and second wheels and retracts the first and second sprockets or pinions when traveling on the set of horizontal tracks, and extends the first and second sprockets or pinions and retracts the first and second wheels when traveling on the set of inclined or vertical tracks.

7. The automated storage-and-retrieval system of claim 6, wherein the mobile robot further comprises a third wheel positioned on the first side of the mobile robot and a fourth wheel positioned on the second side of the mobile robot, wherein the third and fourth wheels each have an axis of rotation parallel to the third axis; and wherein the third and fourth wheels are configured to contact the set of horizontal tracks when the first and second wheels travel along the set of horizontal tracks with the first, second, third and fourth wheels supporting the mobile robot while the caster wheel hangs free.

8. The automated storage-and-retrieval system of claim 7, wherein the third wheel and fourth wheel do not contact the common horizontal surface while the first and second wheels and the caster wheel are contacting the common horizontal surface supporting the mobile robot.

9. The automated storage-and-retrieval system of claim 1, wherein the first and second passive followers engage the first and second tracks on a same side of the first and second tracks as the vertical load bearing features.

10. The automated storage-and-retrieval system of claim 1, wherein the first and second passive followers engage the vertical load bearing features.

11. The automated storage-and-retrieval system of claim 1, wherein the mobile robot further comprises a first counter wheel that engages the first inclined or vertical track enhancing engagement of the first sprocket or pinion with the first set of vertical load bearing features.

12. The automated storage-and-retrieval system of claim 11, wherein the mobile robot further comprises a second counter wheel that engages the second inclined or vertical track enhancing engagement of the second sprocket or pinion with the second set of vertical load bearing features.

13. An automated storage-and-retrieval system, comprising:

a multi-level storage structure comprising a plurality of racks separated by aisles, each rack comprising a set of container supports configured to store containers, which hold objects therein, at a plurality of storage levels within each aisle, and at least first and second sets of inclined or vertical tracks disposed between and connecting levels of the multi-level storage structure;

a first set of vertical load bearing features on a first inclined or vertical track of the first set of inclined or vertical tracks;

a second set of vertical load bearing features on a second inclined or vertical track of the first set of inclined or vertical tracks spaced from the first set of vertical load bearing features across an aisle of the aisles, the first and second sets of vertical load bearing features facing each other across the aisle along a third axis perpendicular to a first axis;

a third set of vertical load bearing features on a third inclined or vertical track of the second set of inclined or vertical tracks;

a fourth set of vertical load bearing features on a fourth inclined or vertical track of the second set of inclined or vertical tracks spaced from the third set of vertical load bearing features across the aisle, the third and fourth sets of vertical load bearing features facing each other across the aisle; and a mobile robot configured to transport a selected one of the containers to and from the multilevel storage structure, the mobile robot comprising:

a caster wheel;

a first traction drive and a second traction drive, one each on first and second sides of the mobile robot, the first traction drive comprises a first motor and a first wheel driven by the first motor, and the second traction drive comprises a second motor and a second wheel driven by the second motor, wherein the first and second wheels are configured to move the mobile robot along the first axis, and the first and second wheels and the caster wheel are configured to contact a common horizontal surface permitting steering and configured to turn the robot using the first wheel and the second wheel while on the horizontal surface with the first traction drive controlled to drive fore or aft the first wheel and the second traction drive controlled to drive fore or aft the second wheel while operating on the horizontal surface;

first and second sprockets or pinions on the first side of the mobile robot each having a retracted position and an extended position;

third and fourth sprockets or pinions on the second side of the mobile robot each having a retracted and extended position, the first and third sprockets or pinions configured to engage the first set of inclined or vertical tracks at two positions to support the mobile robot during travel along a second axis of the first set of inclined or vertical tracks, and the second and fourth sprockets or pinions configured to engage the second set of inclined or vertical tracks at two positions to support the mobile robot during travel along the second set of inclined or vertical tracks, and the first, second, third and fourth sprockets or pinions configured with axes of rotation parallel to the first axis;

first and second passive followers having axes of rotation parallel to the first axis, the first and second passive followers configured to engage the first and second tracks of the first set of inclined or vertical tracks;

wherein the first and second sprockets or pinions are configured to respectively engage the first and second sets of vertical load bearing features by moving oppositely of each other along the third axis.

14. The automated storage-and-retrieval system of claim 13, further comprising a workstation configured to allow a picker to transfer one or more objects to and/or from individual ones of the containers at the workstation.

15. The automated storage-and-retrieval system of claim 14, further comprising at least one horizontal transit deck on which the mobile robot travels between the workstation and the multi-level storage structure.

16. The automated storage-and-retrieval system of claim 13, the mobile robot further comprising an onboard control computer system for controlling locomotion of the mobile robot.

17. An automated storage-and-retrieval system, comprising:
a multi-level storage structure comprising a plurality of racks separated by aisles, each rack comprising a set of horizontal container supports configured to store containers, which hold objects therein, at a plurality of storage levels within each aisle, and a set of inclined or vertical tracks disposed between and connecting levels of the multi-level storage structure;
a first set of vertical load bearing features on a first inclined or vertical track of the set of inclined or vertical tracks; and
a second set of vertical load bearing features on a second inclined or vertical track of the set of inclined or vertical tracks spaced from the first set of vertical load bearing features across an aisle of the aisles, the first and second sets of vertical load bearing features facing each other across the aisle along a third axis perpendicular to a first axis;
a mobile robot configured to transport a selected one of the containers to and from the multilevel storage structure, the mobile robot comprising:
a caster wheel;
a first traction drive and a second traction drive, the first traction drive comprises a first motor and a first wheel driven by the first motor, and the second traction drive comprises a second motor and a second wheel driven by the second motor, wherein the first and second wheels and the caster wheel are configured to contact a common horizontal surface supporting the mobile robot permitting steering and configured to turn the robot using the first wheel and the second wheel while on the horizontal surface with the first traction drive controlled to drive fore or aft the first wheel and the second traction drive controlled to drive fore and/or aft the second wheel while operating on the horizontal surface including enabling the mobile robot to move across the horizontal surface; and
a first sprocket or pinion on a first side of the mobile robot, and a second sprocket or pinion on a second side of the mobile robot opposite the first side, the first and second sprockets or pinions having a retracted position and an extended position;
the first and second sprockets or pinions having axes of rotation parallel to the first axis and configured to selectively engage at two positions of the set of inclined or vertical tracks of the multi-level storage structure while in the extended position, and propel the mobile robot along a second axis along the inclined or vertical tracks of the multi-level storage structure;
first and second passive followers having axes of rotation parallel to the first axis, the first and second passive followers configured to engage the first and second tracks of the set of inclined or vertical tracks;
wherein the first and second sprockets or pinions are configured to engage the first and second sets of vertical load bearing features by moving oppositely of each other along the third axis:
wherein the mobile robot further comprises a third wheel positioned on the first side of the mobile robot and a fourth wheel positioned on the second side of the mobile robot, wherein the third wheel and the fourth wheel each has an axis of rotation parallel to the third axis, and wherein the third wheel and fourth wheel do not contact the common horizontal surface while the first and second wheels and the caster wheel are contacting the common horizontal surface supporting the mobile robot.

18. The automated storage-and-retrieval system of claim 17, wherein the caster wheel is positioned center-mounted on the mobile robot.

* * * * *

UNITED STATES PATENT AND TRADEMARK OFFICE
CERTIFICATE OF CORRECTION

| | | |
|---|---|---|
| PATENT NO. | : 12,006,149 B2 | Page 1 of 1 |
| APPLICATION NO. | : 17/843124 | |
| DATED | : June 11, 2024 | |
| INVENTOR(S) | : John G. Lert, Jr. et al. | |

It is certified that error appears in the above-identified patent and that said Letters Patent is hereby corrected as shown below:

On the Title Page

On Page 5, item [56], Column 2, Line 30, delete "47st" and insert -- 47th --, therefor.

In the Claims

In Column 47, Line 43, Claim 16, delete "the" and insert -- wherein the --, therefor.

In Column 48, Line 45, Claim 17, delete "axis:" and insert -- axis; --, therefor.

Signed and Sealed this
Seventeenth Day of September, 2024

Katherine Kelly Vidal
*Director of the United States Patent and Trademark Office*